(12) United States Patent
Khan

(10) Patent No.: US 12,069,021 B2
(45) Date of Patent: Aug. 20, 2024

(54) EMAIL SENDER AND REPLY-TO AUTHENTICATION TO PREVENT INTERCEPTION OF EMAIL REPLIES

(71) Applicant: Zafar Khan, Redondo, CA (US)

(72) Inventor: Zafar Khan, Redondo, CA (US)

(*) Notice: Subject to any disclaimer, the term of this patent is extended or adjusted under 35 U.S.C. 154(b) by 105 days.

(21) Appl. No.: 17/659,479

(22) Filed: Apr. 15, 2022

(65) Prior Publication Data
US 2022/0321518 A1 Oct. 6, 2022

Related U.S. Application Data

(60) Continuation-in-part of application No. 17/025,955, filed on Sep. 18, 2020, now Pat. No. 11,336,610, which is a division of application No. 15/469,388, filed on Mar. 24, 2017, now abandoned.

(60) Provisional application No. 62/317,263, filed on Apr. 1, 2016, provisional application No. 62/313,672, filed on Mar. 25, 2016.

(51) Int. Cl.
| | |
|---|---|
| *H04L 51/23* | (2022.01) |
| *G06Q 10/107* | (2023.01) |
| *H04L 9/40* | (2022.01) |
| *H04L 51/212* | (2022.01) |

(52) U.S. Cl.
CPC .......... *H04L 51/23* (2022.05); *G06Q 10/107* (2013.01); *H04L 51/212* (2022.05); *H04L 63/0442* (2013.01); *H04L 63/08* (2013.01); *H04L 63/1483* (2013.01)

(58) Field of Classification Search
CPC ..... H04L 51/30; H04L 51/12; H04L 63/1483; G06Q 10/107
See application file for complete search history.

(56) References Cited

U.S. PATENT DOCUMENTS

| | | | |
|---|---|---|---|
| 9,398,042 B1* | 7/2016 | Dodke | H04L 63/1433 |
| 2005/0120118 A1* | 6/2005 | Thibadeau | G06Q 10/107 |
| | | | 709/228 |
| 2005/0278430 A1* | 12/2005 | Cato | H04L 51/212 |
| | | | 709/206 |
| 2008/0244691 A1* | 10/2008 | Hilerio | H04L 63/20 |
| | | | 726/1 |
| 2012/0089686 A1* | 4/2012 | Meister | H04L 51/212 |
| | | | 709/206 |
| 2013/0060863 A1* | 3/2013 | D'Eri | H04L 51/212 |
| | | | 709/206 |
| 2014/0165137 A1* | 6/2014 | Balinsky | G06F 21/6245 |
| | | | 726/1 |
| 2014/0280651 A1* | 9/2014 | Krugman | H04L 51/214 |
| | | | 709/206 |
| 2016/0142429 A1* | 5/2016 | Renteria | H04L 63/1416 |
| | | | 726/23 |
| 2016/0142449 A1* | 5/2016 | Krugman | H04L 65/1083 |
| | | | 709/219 |
| 2016/0285810 A1* | 9/2016 | Bai | H04L 51/216 |
| 2019/0020687 A1* | 1/2019 | Noon | G06F 21/604 |

(Continued)

*Primary Examiner* — Douglas B Blair
(74) *Attorney, Agent, or Firm* — Fitzgerald IP Law; John K Fitzgerald, Esq.

(57) ABSTRACT

An electronic messaging system that provides for assessing the risk score associated with a message and its recipients in the moment after the send process has been initiated and before the transmission begins, to provide for alerts to be generated when the system detects that a recipient message address is of high risk.

16 Claims, 26 Drawing Sheets

(56) References Cited

U.S. PATENT DOCUMENTS

| | | | |
|---|---|---|---|
| 2020/0204587 A1* | 6/2020 | Hunt | G06F 21/128 |
| 2022/0279015 A1* | 9/2022 | Sambamoorthy | H04L 51/212 |
| 2023/0205906 A1* | 6/2023 | Walters | H04L 63/0245 |
| | | | 726/30 |
| 2023/0237195 A1* | 7/2023 | Noon | G06F 21/6254 |
| | | | 726/4 |

* cited by examiner

"Friendly Name" <emailaddress>

View in a received email

| "Friendly Name" | "Email Address" |

T: "Zafar Khan" zkh__@rp__.com

Subject: RE: Request for November 19, 2015

We need to know the details of whom we are paying. Account name What is this for? Need invoice or supporting docs as well.
LZ

EMAIL SENDER AND REPLY-TO AUTHENTICATION TO PREVENT INTERCEPTION OF EMAIL REPLIES

CROSS-REFERENCE TO RELATED APPLICATIONS

This application is a continuation in part of U.S. application Ser. No. 17/025,955, filed Sep. 18, 2020, entitled "EMAIL SENDER AND REPLY-TO AUTHENTICATION TO PREVENT INTERCEPTION OF EMAIL REPLIES", which is a divisional application of U.S. application Ser. No. 15/469,388, filed Mar. 24, 2017, entitled "EMAIL SENDER AND REPLY-TO AUTHENTICATION TO PREVENT INTERCEPTION OF EMAIL REPLIES", and claims the benefit of priority to the earlier filed U.S. Provisional Application No. 62/313,672, filed on Mar. 25, 2016, entitled "EMAIL SENDER AND REPLY-TO AUTHENTICATION", and U.S. Provisional Application No. 62/317,263, filed on Apr. 1, 2016, entitled "EMAIL SENDER AND REPLY-TO AUTHENTICATION TO PREVENT INTERCEPTION OF EMAIL REPLIES", which are incorporated reference herein in their entireties.

FIELD OF THE INVENTION

This invention relates to electronic messaging security within the category of anti-phishing, and the sub-category of anti-whaling, in terms of protecting the recipient of an electronic message from inadvertent routing of a reply message to an imposter of the named sender, using the invention's automated sender authentication and alert system.

BACKGROUND OF THE INVENTION

Mail assumed electronic format in 1965 and was given the name "Email". Email started as a way for multiple users of a time-sharing mainframe computer to communicate with each other. Email was quickly extended to become 'network email', allowing users to pass messages between different computers by at least 1966. Email today has become a communications tool that is simple enough for individuals to use regardless of their level of technical knowledge or understanding of how email works.

Today, email (defined herein to include of today's variety of electronic messaging protocols such as SMS and MMS) is often relied up for important communications among people and used to instruct people to do things. When people today receive an email from a sender, they often do not question the authenticity of the sender or content received.

A normal email user knows how to receive, view, read, reply-to, forward, and send email. More advanced email users may configure their email program to automatically filter email to be placed in certain folders, or mark email with various levels of importance.

Some of these email users may install third party programs to assist them in dealing with the various known and common security threats associated with email. Users (senders of email and/or recipients) or email system administrators may add software at the email server, email gateways, or email user interface (commonly referred to as "Email Client"). These add-on software programs may scan email to detect, block, and/or highlight malicious software programs hidden within the email messages (commonly referred to as "virus"), unsolicited marketing email (commonly referred to as "spam"), masked hypertext links in messages received that re-direct to imposter websites (commonly referred to as "phishing"), among others.

Phishing is an example of social engineering techniques used to deceive users. The term "phishing" is defined as an attempt to acquire sensitive information, such as, for example, usernames, passwords, and credit card details (and sometimes, indirectly, money and the like), often for malicious reasons, by masquerading as a trustworthy entity in an electronic communication. The word is a neologism created as a homophone of fishing due to the similarity of using a bait in an attempt to catch a victim. Communications purporting to be from popular social web sites, auction sites, banks, online payment processors or IT administrators are commonly used to lure unsuspecting victims, and may also contain links to websites that are infected with malware.

Phishing is typically carried out by email spoofing (the creation of email messages with a forged sender address sent from an imposter email system), and it often directs users to enter details at a fake website whose look and feel are almost identical to the legitimate one.

Within the general category of phishing, an emerging sub category is called "whaling". Whaling is a specific kind of malicious hacking that involves using external sources to hunt for data that can be used by the Internet criminal to collect information about targets who are high-ranking bankers, executives or others in powerful positions or job titles. Often the Internet criminal will use advanced human resource recruiting tools such as advanced Linked-in access to gather information about the target users (recipients of the fake email) and the sender of whom they wish to imposter.

Today, one of the prevalent targets of whaling attacks are consumers in the home buying process, where these consumers are sent instructions to send payment to Internet criminals masquerading as the authentic escrow agent for the home purchase. The consumer is tricked into sending the down payment to the imposter bank account.

Internet criminals who engage in whaling often describe these efforts as "reeling in a big fish," applying a familiar metaphor to the process of scouring technologies for loopholes and opportunities for data theft. In gambling, for example, the term "whales" is used to describe high-stakes rollers who are given special VIP treatment.

Those who are engaged in whaling may, for example, hack into specific networks where these powerful individuals work or store sensitive data. They may also set up keylogging or other malware on a work station associated with one of these executives. There are many ways that Internet criminals can pursue whaling.

As with any phishing endeavor, the goal of whaling is to trick someone into disclosing personal or corporate information through social engineering, or more commonly today with whaling, convince the email recipient to send money using electronic funds transfer for a payment that they believe is legitimate. Techniques often use email spoofing and content spoofing efforts. For example, the Internet criminal may send his or her target an email that appears as if it's from a trusted source or lure the target to a website that has been created especially for the attack, or to trick the target to transfer money to the Internet criminal. Whaling emails and websites are highly customized and personalized, often incorporating the target's name, job title or other relevant information gleaned from a variety of sources.

Due to their focused nature, whaling attacks are often harder to detect than standard phishing attacks. Security administrators generally attempt to prevent successful "whaling expeditions" by encouraging corporate management staff to undergo information security awareness training. However, such training is often ineffective in reducing the occurrence of personal data due to a carefully constructed whaling attack.

Another technical solution commonly employed is to place software at the email server receiving inbound email and to scan those messages for hypertext links (HTTP and HTTPS) and verify if those links are associated with known fake websites, or if the underlying link display name includes a website URL address that is differing from the URL route-to address in the underlying hypertext link schema.

However, there are no solutions described that mitigate the particular type of whaling attack from which the various embodiments of the present disclosure protects. This type of attack exploits standard Internet electronic messaging protocols associated with the Reply-To message header field, which will be referred hereafter as "Reply-To Whaling".

Internet protocols for email, as defined in RFC0822, Standard for ARPA Internet Text Messages, provide for a reply-to address to be included as a header in any email sent. Section (4) MESSAGE SPECIFICATION, (4.3.1) RETURN-PATH, describes the protocol for reply-to message headers.

This field is added by the final transport system that delivers the message to its recipient. The field is intended to contain definitive information about the address and route back to the message's originator. The "Reply-To" field is added by the originator and serves to direct replies, whereas the "Return-Path" field is used to identify a path back to the originator.

Internet protocols for email, as defined in RFC5322, Standard for Internet Message Format Section 3.6.2., Originator Fields, also applies. The relevant sections of RFC5322 Section 3.6.2 describe that the originator fields of a message consist of the 1) From field, 2) the sender field (when applicable), and 3) optionally the reply-to field. The From field consists of the field name "From" and a comma separated list of one or more mailbox specifications. If the From field contains more than one mailbox specification in the mailbox list, then the Sender field, containing the field name "Sender" and a single mailbox specification, MUST appear in the message. In either case, an optional Reply-to field MAY also be included, which contains the field name "Reply-To" and a comma-separated list of one or more addresses:

from ="From:" mailbox-list CRLF
sender="Sender:" mailbox CRLF
reply-to ="Reply-To:" address-list CRLF The originator fields indicate the mailbox(es) of the source of the message. The "From:" field specifies the author(s) of the message, that is, the mailbox(es) of the person(s) or system(s) responsible for the writing of the message. The "Sender:" field specifies the mailbox of the agent responsible for the actual transmission of the message. For example, if a secretary sends a message for another person, the mailbox of the secretary appears in the "Sender:" field and the mailbox of the actual author would appear in the "From:" field. If the originator of the message can be indicated by a single mailbox and the author and transmitter are identical, the "Sender:" field SHOULD NOT be used. Otherwise, both fields SHOULD appear. The transmitter information is always present.

The absence of the "Sender:" field is sometimes mistakenly taken to mean that the agent responsible for transmission of the message has not been specified. This absence merely means that the transmitter is identical to the author and is therefore not redundantly placed into the "Sender:" field.

The originator fields also provide the information required when replying to a message. When the "Reply-To:" field is present, it indicates the address(es) to which the author of the message suggests that replies be sent. In the absence of the "Reply-To:" field, replies SHOULD by default be sent to the mailbox(es) specified in the "From:" field unless otherwise specified by the person composing the reply. In all cases, the "From:" field SHOULD NOT contain any mailbox that does not belong to the author(s) of the message.

Due to the Internet protocols for email, as defined in RFC5322 Standard for Internet Message Format and RFC0822 Standard for ARPA Internet Text Messages, and in particular Section (4.4.3) REPLY-TO/RESENT-REPLY-TO, the reply-to header is used by Internet criminals in certain types of whaling attacks.

This REPLY-TO field provides a general mechanism for indicating any mailbox(es) to which responses are to be sent. The RFC0822 Section 4.4.3 describes three typical uses for this feature.

In the first case, the author(s) may not have regular machine-based mail-boxes and therefore wish(es) to indicate an alternate machine address. In the second case, an author may wish additional persons to be made aware of, or responsible for, replies. A somewhat different use may be of some help to "text message teleconferencing" groups equipped with automatic distribution services: include the address of that service in the "Reply-To" field of all messages submitted to the teleconference; then participants can "reply" to conference submissions to guarantee the correct distribution of any submission of their own.

The "Return-Path" field is added by the mail transport service, at the time of final deliver. It is intended to identify a path back to the originator of the message. The "Reply-To" field is added by the message originator and is intended to direct replies.

In most email sent today, either this REPLY-TO field is empty, or it contains the original sender email address. The RFC0822, Section (4.4.4) AUTOMATIC USE OF FROM/SENDER/REPLY-TO, describes the hierarchy of how email should operate considering the REPLY-TO header field. For systems which automatically generate address lists for replies to messages, the following recommendations are made: (a) The "Sender" field mailbox should be sent notices of any problems in transport or delivery of the original messages; if there is no "Sender" field, then the "From" field mailbox should be used; (b)t The "Sender" field mailbox should NEVER be used automatically, in a recipient's reply message; (c) if the "Reply-To" field exists, then the reply should go to the addresses indicated in that field and not to the address(es) indicated in the "From" field; (d) if there is a "From" field, but no "Reply-To" field, the reply should be sent to the address(es) indicated in the "From" field.

There are software programs to protect against a Whaling attack that a Recipient can be educated to use to verify that the message originated at the location of the Sender and is an authentic message from the Sender, such as public key infrastructure digital certificates and email encryption. These require sender and recipient software installation and recipient user education.

The Sender Policy Framework (SPF) is a simple email-validation system designed to detect email spoofing by providing a mechanism to allow receiving mail exchangers to check that incoming mail from a domain comes from a host authorized by that domain's administrators. However, SPF will not detect Reply-To Whaling schemes.

There are also software programs that can detect if a hypertext link in an email is an authentic hypertext link (the underlying URL is the same as the display name URL). However, these software programs do not address the above mentioned exploitation of the Reply-To header field as described in RFC0822.

What is needed to protect individuals that do not have a high level of technical understanding yet may have a high level of accounting knowledge and general trust of a known person of authority who may instruct the individual (known administrator who has access to transfer money) is a means for the individual to be automatically alerted as to whether there is the possibility of an exploitation of the Reply-To header field as defined in RFC0822 for the purpose of whaling which could result in financial transfers made by the administrator who has access to transfer money to the Internet criminal's account.

Persons skilled in the art of email and other types of messaging systems that operate on and through a network, such as the Internet, understand that there is a need to improve the functioning of such email and messaging systems by providing a system that can detect and mitigate fraudulent identity based attacks on the integrity of those systems. Thus, there has been a need to solve a problem inherent in the email and messaging systems operating in a network environment due the addressing protocols of those systems.

Another need that has been observed is to be able to devise the sentiment of a sender of a message from the content and other attributes of the message. Measuring the sentiment of messages or intent of message originators derived from the data associated with their message can be used to improve management of employees or an organization by means of providing (a) real-time insights that trigger an action or insight in the flow of a message composition, sending, receiving, or replying process ("In-the-moment Insights"), or (b) Repository Insights that may be used to trigger an action on a schedule or influence an action ("Repository Insights").

Using sentiment analysis or other tools to translate information in or associated with messages permits the insights and actions to change dynamically as the emotion of the user or teams of users or emotional context of the messages or other data that are in communications with the user change.

From a security perspective, a reason for In-the-moment Insights is for managers to create the opportunity for messaging users to be alerted about actions that they are about to take before they take them, such as being alerted that they are just about to reply to email sent from an impostor—after they click reply but before they send; in the process of replying or sending before replied or sent.

From a human resource managerial perspective, a reason for In-the-moment Insights is for managers to create the opportunity for messaging users to be alerted that the message that they are about to send may offend the recipient, based on known factors related to the recipient messaging address, based on the content structure of the sender's message, or based on these factors in addition to emotional context determined from sentiment analysis content. The messaging users can be alerted after they compose a message but before the send processes; in the process of sending before sent.

From a security perspective, a reason for Repository Insights is for managers to understand which employees are more susceptible to being fooled by certain types of phishing (e.g., Business Email Compromise) attacks; to identify for management which employees should be more aggressively trained or to procure more technical tools to help guide these more susceptible users from being lured by impostor email designed to lure those with certain types of sentiment.

For example, staff that are more emotionally sensitive and generally more caring or empathetic are more likely to fall prey to Business Email Compromise email impostor tricks. Why? Many of the impostor email of the Business Email Compromise type is written with context or design to lure staff using crafted (and proven successful) email prose that appeals to those who want to be there to assist above and beyond. These impostor emails appear to come from the staff's boss or bosses' boss, apologizing for intruding but asking for "a favor". It is often a simple ask; but that is the opening volley, the hook is in. Managers could know via use of messaging sentiment analysis about who on their staff is more susceptible to responding to "a favor" request, and for these people, trigger different actions or training regiments. For these people, if they are asked to do a "favor"—like send some money for a reasonable invoice, or urgently send funds for a business transaction, or even to buy gift cards for or on behalf of the boss (but really sending invoice payment, funds transfer, or gift cards to the impostor), these more sensitive and empathetic staff more likely are tricked into taking an action based on the impostor's request, as it is in their nature to be trusting and helpful to others when they express they are in a bind. These are the Business Email Compromise (BEC) attacker primary targets.

From a human resource managerial perspective, a reason for Repository Insights is for managers to better understand which employees are more susceptible to succeeding or failing in certain types of roles. For example, tracking changes in the sentiment of a salesperson over time from their messaging content may provide indicators as to whether they have the drive to go get new business or are the type to wait for new business to find them; or whether a salesperson that was previously successful is in a slump due to mental anguish of some kind.

This invention fulfills these needs, and others, by allowing managers to determine the sentiments of a message originator from the content and attributes of the messages the originator has produced. Other features and advantages of the present disclosure will become apparent from the following detailed description, taken in conjunction with the accompanying drawings, which illustrate, by way of example, the principles of the disclosure.

SUMMARY OF THE INVENTION

The following format conventions and definitions will be useful in understanding the description of the various aspects and embodiments of the present disclosure.

The format of electronic messaging header fields for email, for the "From" and "Reply-To" fields of the received message into a recipient's Inbox are typically of the form:
Schema: "Friendly Name"<emailaddress>
Example: "John Smith"<john@gmail.com>
Consider further the following definitions:
N=Friendly Name, or Name
A=Email Address, or Address
$N_F$="From" email header "Friendly Name" on email intended to be received into target recipient inbox.
$A_F$="From" email header "Email Address" on email intended to be received into target recipient inbox.
$N_R$="Reply-To" email header "Friendly Name" on email intended to be received into target recipient inbox.

$A_R$="Reply-To" email header "Email Address" on email intended to be received into target recipient inbox.

All references to email header and to "Email Header . . . on Received Email into Recipient Inbox" means the email header on the email message received into the recipient's inbox, and not any new email headers that may be added to a message after one initiates a reply or message forward. For further clarity, the message headers to parse, as noted below, are those in the original received email into the recipient's inbox and not those new headers that may be placed in a reply or forwarded message after the recipient may click the reply or forward buttons. Reference to the REPLY action could be the REPLY or REPLY-ALL action.

Further, the term email may be construed as electronic message. The term Email header may be construed as transport message headers, email headers, electronic message headers, mail headers, and other similar headers or address fields associated with any electronic communications transport protocol.

In its most general aspect, the present disclosure includes an electronic messaging system, including an emailing system that reviews content of inbound messages, verifies elements of header fields, and initiates an action if elements of header fields do not match, those elements being $A_F \neq A_R$. In another aspect, the initiated action is an alert message. In another aspect, the initiated action is moving the message to a different folder. In yet another aspect, the initiated action is sending an alert to both the email address in the TO and FROM email header fields. In another aspect, the emailing system parses content of inbound message headers after the recipient clicks the REPLY button. In another aspect, the emailing system parses content of inbound message headers after the recipient clicks the REPLY-ALL button. In another aspect, the emailing system parses content of inbound message headers after the recipient clicks the FORWARD button. In another aspect, the emailing system reviews, parses or verifies content of outbound message headers after the recipient has replied or forwarded the original received email.

In another general aspect, the present disclosure includes an electronic messaging system, including an emailing system that reviews, parses, or verifies content of inbound message elements of header fields, and initiates an action if elements of header fields match or do not match, those elements being $N_F = N_R$ and $A_F \neq A_R$. In another aspect, the initiated action is an alert message. In another aspect, the initiated action is moving the message to a different folder. In yet another aspect, the initiated action is sending an alert to both the email address in the TO and FROM email header fields. In another aspect, the emailing system reviews, parses or verifies content of inbound message headers after the recipient clicks the REPLY button. In another aspect, the emailing system reviews, parses or verifies content of inbound message headers after the recipient clicks the REPLY-ALL button. In another aspect, the emailing system reviews, parses or verifies content of inbound message headers after the recipient clicks the FORWARD button. In another aspect, the emailing system reviews, parses or verifies content of outbound message headers after the recipient has replied or forwarded the original received email.

In an alternative aspect, the present disclosure includes an email client programmed by software commands to review content of inbound messages, parse or verify elements of header fields, and initiate an action if elements of header fields do not match, those elements verified being $A_F \neq A_R$. In another aspect, the initiated action is an alert message. In another aspect, the initiated action is moving the message to a different folder. In another aspect, the initiated action is sending an alert to both the email address in the TO and FROM email header fields. In another aspect, the emailing system reviews, parses or verifies content of inbound message headers after the recipient clicks the REPLY button. In another aspect, the emailing system reviews, parses or verifies content of inbound message headers after the recipient clicks the REPLY-ALL button. In another aspect, the emailing system reviews, parses or verifies content of inbound message headers after the recipient clicks the FORWARD button. In another aspect, the emailing system reviews, parses or verifies content of outbound message headers after the recipient has replied or forwarded the original received email.

In an alternative aspect, the present disclosure includes an email client programmed using software commands that reviews content of inbound messages, parses or verifies elements of header fields, and initiates an action if elements of header fields match or do not match, those elements verified being $N_F = N_R$ and $A_F \neq A_R$. In another aspect, the initiated action is an alert message. In another aspect, the initiated action is moving the message to a different folder. In another aspect, the initiated action is sending an alert to both the email address in the TO and FROM email header fields. In another aspect, the emailing system reviews, parses or verifies content of inbound message headers after the recipient clicks the REPLY button. In another aspect, the emailing system reviews, parses or verifies content of inbound message headers after the recipient clicks the REPLY-ALL button. In another aspect, the emailing system reviews, parses or verifies content of inbound message headers after the recipient clicks the FORWARD button. In another aspect, the emailing system reviews, parses or verifies content of outbound message headers after the recipient has replied or forwarded the original received email.

In yet another aspect, the present disclosure includes an emailing system with a server separate from the sender that reviews content of inbound messages on the server, and executes the following commands: if $A_R \neq$ Null (empty field) then go to step 2, otherwise process the message in a normal manner; 2. If $N_F = N_R$ and $A_F \neq A_R$, then go to step 3, otherwise process the message in a normal manner, 3. Perform special action on the message. In one aspect, the initiated action is an alert message. In another aspect, where the initiated action is moving the message to a different folder. In another aspect, the initiated action is sending an alert to both the email address in the TO and FROM email header fields. In still another aspect, examples of special actions are to mark the message with an alert or other marking and then process the message by sending it to the recipient, quarantine the message, put the message into a special folder, add a header to the message, delete the message, send a separate message to the From message header email address and the To message header email address, or other actions other than or in addition to normal message sending. In another aspect, the emailing system reviews, parses or verifies content of inbound message headers after the recipient clicks the REPLY button. In another aspect, the emailing system reviews, parses or verifies content of inbound message headers after the recipient clicks the REPLY-ALL button. In another aspect, the emailing system reviews, parses or verifies content of inbound message headers after the recipient clicks the FORWARD button. In another aspect, the emailing system reviews, parses or verifies content of outbound message headers after the recipient has replied or forwarded the original received email.

In still another aspect, the present disclosure includes an email client programmed using software commands that reviews content of inbound messages, parses or verifies elements of header fields, and initiates an action if elements of header fields do not match, those elements verified being $A_F \neq A_R$. In another aspect, the initiated action is an alert message. In another aspect, the initiated action is moving the message to a different folder. In yet another aspect, the initiated action is sending an alert to both the email address in the TO and FROM email header fields. In still another aspect, examples of special actions are to mark the message with an alert or other marking and then process the message by sending it to the recipient, quarantine the message, put the message into a special folder, add a header to the message, delete the message, send a separate message to the From message header email address or the To message header email address, or both, or other actions other than or in addition to normal message sending. In another aspect, the initiated action is sending an alert to both the email address in the TO and FROM email header fields. In another aspect, the emailing system reviews, parses or verifies content of inbound message headers after the recipient clicks the REPLY button. In another aspect, the emailing system reviews, parses or verifies content of inbound message headers after the recipient clicks the REPLY-ALL button. In another aspect, the emailing system reviews, parses or verifies content of inbound message headers after the recipient clicks the FORWARD button. In another aspect, the emailing system reviews, parses or verifies content of outbound message headers after the recipient has replied or forwarded the original received email.

In yet another aspect, the present disclosure includes an email client programmed using software commands that reviews content of inbound messages after the email client user initiates a reply to a received message, verifies elements of header fields, and initiates an action if elements of header fields do not match, those elements verified being $A_F \neq A_R$. In another aspect, examples of special actions are to mark the message with an alert or other marking and then process the message by sending it to the recipient, quarantine the message, put the message into a special folder, add a header to the message, delete the message, send a separate message to the From message header email address and the To message header email address, or other actions other than or in addition to normal message sending.

In still another aspect, the present disclosure includes a system that includes an email client programmed using software commands that reviews content of inbound messages after the email client user initiates an action to a received message, the software verifying elements of header fields, and initiating an action if elements of header fields match or do not match, those elements verified being $N_F = N_R$ and $A_F \neq A_R$. In another aspect, examples of the end user initiated action are opening the message, replying to the message, forwarding the message or viewing the message.

In yet another aspect, the disclosure includes an emailing system with a server separate from the sender that reviews content of inbound messages on the server, and if $A_R \neq$ Null (empty field) and if $N_F = N_R$ and if $A_F \neq A_R$, perform a special action on the message, otherwise process message in normal manner. In one aspect, the initiated action is an alert message. In another aspect, the initiated action is moving the message to a different folder. In yet another aspect, the initiated action is sending an alert to both the email address in the TO and FROM email header fields. In still another aspect, where examples of special actions are to mark the message with an alert or other marking and then process the message by sending it to the recipient, quarantine the message, put the message into a special folder, add a header to the message, delete the message, send a separate message to the From message header email address and the To message header email address, or other actions other than or in addition to normal message sending.

In still another aspect, the present disclosure includes an mail system including hardware and software executing programming commands that reviews content of inbound messages, and if $A_R \neq$ Null (empty field) and if $N_F = N_R$ and if $A_F \neq A_R$, perform a special action on the message, otherwise process message in normal manner.

In yet another aspect, the present disclosure includes an email system including hardware and software executing programming commands that reviews content of inbound messages, and if $A_F \neq A_R$ then perform a special action on the message, otherwise process message in normal manner. In one aspect, the initiated action is an alert message. In another aspect, the initiated action is moving the message to a different folder. In still another aspect, the initiated action is sending an alert to both the email address in the TO and FROM email header fields.

In yet another aspect, the present disclosure includes an email system including hardware and software executing programming commands that reviews content of outbound messages after a reply or forward of the original inbound received message but before delivery of the reply or forward to its addressed recipient; and if on the original inbound received email before the reply or forward, $A_F \neq A_R$ or if $A_R \neq$ Null (empty field) and if $N_F = N_R$ and if $A_F \neq A_R$, or if $N_F = N_R$ and if $A_F \neq A_R$, then perform a special action on the message, otherwise process message in normal manner. In one aspect, the initiated action is an alert message. In another aspect, the initiated action is moving the message to a different folder. In still another aspect, the initiated action is sending an alert to both the email address in the TO and FROM email header fields.

In yet another aspect, the present disclosure includes an emailing system having a server including hardware and software executing programming commands, the server being separate from the sender that reviews content of inbound messages on the server, and if $A_F \neq A_R$, performs a special action on the message, otherwise process message in normal manner. The system has the initiated action be displaying an alert message. The system may also have the initiated action be moving the message to a different folder. The system may further have the initiated action be sending an alert to both the email address in the TO and FROM email header fields. In yet another aspect, the review of message header could be the following: if $A_R \neq$ Null (empty field) and if $N_F = N_R$ and if $A_F \neq A_R$, or if $N_F = N_R$ and if $A_F \neq A_R$.

In yet another aspect, the present disclosure includes an emailing system including hardware and software executing programming commands that includes an email client responsive to programming commands, the email client reviews content of inbound messages after the email client user initiates an action to a received message, the software verifying elements of header fields, and the system initiating an action if elements of header fields match or do not match, those elements verified being $A_F \neq A_R$. The system may further have the user initiated action be clicking a REPLY button in the email client user interface. The system may further have the system initiated action be displaying an alert message. The system may further have the system initiated action be moving the message to a different folder. The system may further have the system initiated action be sending an alert to both the email address in the TO and FROM email header fields.

In yet another aspect, the present disclosure includes an emailing system including hardware and software executing programming commands that includes an email client that reviews content of inbound messages after the email client user initiates an action to a received message, the software verifying elements of header fields, and software initiating an action if elements of header fields match or do not match, those elements verified being if $A_R \neq$ Null (empty field) then go to step 2, otherwise process message in normal manner; 2. If $N_F = N_R$ and $A_F \neq A_R$, then go to step 3, otherwise process message in normal manner, 3. Perform action on the message. The system may further have the user initiated action be clicking a REPLY button in the email client user interface. The system may further have a system initiated action be displaying an alert message. The system may further have a system initiated action be moving the message to a different folder. The system may further have a system initiated action be sending an alert to both the email address in the TO and FROM email header fields. The system may further have a system initiated action be sending an alert to both the email address in the TO and FROM email header fields.

In still another aspect, the present disclosure includes an emailing system comprising: a processer programmed using programming commands to review content of inbound messages, verify elements of the email header fields of the inbound message, and to initiate an action if the elements of the header fields match or do not match; wherein the elements being analyzed are $N_F = N_R$ and $A_F \neq A_R$. In one alternative aspect, the initiated action is an alert message. In another alternative aspect, the initiated action is moving the message to a different folder resident in a memory associated with processor. In yet another alternative aspect, the initiated action is sending an alert to both an email address in a TO and a FROM email header field of the inbound message.

In yet another aspect, the present disclosure includes an emailing system, comprising: a server separate from a sender email client, the server programmed using programming commands to review content of inbound messages to the server, the programming commands of the server configured to execute the following commands: if $A_R \neq$ Null (empty field) and If $N_F = N_R$ and $A_F \neq A_R$, perform a special action on the message, otherwise process the inbound message in a normal manner. In one alternative aspect, the special action is an alert message. In another alternative aspect, the special action is moving the message to a different folder. In still another alternative the special action is sending an alert to both the email address in the TO and FROM email header fields of the inbound message. In yet another alternative aspect, the special action may be marking the message with an alert or other marking and then processing the inbound message by sending it to the recipient of the inbound message, quarantining the message, putting the inbound message into a special folder, adding a header to the inbound message, deleting the inbound message, sending a separate message to the From header email address of and the To message header email address of the inbound message, or other actions other than or in addition to normal message sending.

In still yet another aspect, the present disclosure includes a system including an email client comprising: a processor disposed in the email client, the processor programmed with programming commands to review content of inbound messages after an end user of the email client initiates an action to a received inbound message, and to verify elements of the received inbound message header fields, and to initiate an action if the elements of the header fields match or do not match; wherein the elements verified are $N_F = N_R$ and $A_F \neq A_R$. In one alternative aspect, the initiated action is one or more actions are selected from the group of actions consisting of opening the message, replying to the message, replying-all to the message, forwarding the message, and viewing the message.

In still another aspect, the present disclosure includes an emailing system having a server separate from a sender, comprising: a processor programmed using programming commands to review content of an inbound message received by the server, the processor programmed to determine if $A_R \neq$ Null (empty field) and if $N_F = N_R$ and if $A_F \neq A_R$, the processor being further programmed using programming commands to perform a special action on the message, otherwise the processor is programmed to process the inbound message in normal manner. In another alternative aspect, the special action is an alert message. In still another aspect, the special action is moving the message to a different folder. In still another alternative aspect, the special action is sending an alert to both the email address in the TO and FROM email header fields of the inbound message. In yet another alternative aspect, the special action is one or more of actions selected from the group of actions consisting of marking the inbound message with an alert or other marking and then processing the inbound message by sending it to the recipient, quarantining the inbound message, putting the inbound message into a special folder, adding a header to the inbound message, deleting the inbound message, sending a separate message to the From message header email address and the To message header email address of the inbound message, or any other actions other than or in addition to normal message sending.

In another aspect, the present disclosure includes an email system, comprising: a processor programmed using programming commands to review content of headers of inbound messages, and if the processor determines that $A_R \neq$ Null (empty field) and if $N_F = N_R$ and if $A_F \neq A_R$, the processor is programmed to perform a special action on the inbound message, otherwise the processor is programmed to process the inbound message in a normal manner.

In yet another aspect, the present disclosure includes an email system comprising: a processor programmed using programming commands to review content of headers of inbound messages, and if the processor determines that $A_F \neq A_R$, the processor is programmed to perform a special action on the inbound message, otherwise the processor is programmed to process the inbound message in a normal manner. In one alternative aspect, the special action is an alert message. In another alternative aspect, the special action is moving the message to a different folder. In yet another aspect, the special action is sending an alert to both the email address in the TO and FROM email header fields.

In still another aspect, the present disclosure includes an emailing system with a server separate from a sender, comprising: a processor programmed by programming commands to review content of an inbound message on the server, and if the processor determines that $A_F \neq A_R$, the processor is programmed to perform a special action on the inbound message, otherwise the processor is programmed to process the inbound message in a normal manner. In one alternative aspect, the special action is an alert message. In another alternative aspect, the special action is moving the message to a different folder stored in a memory associated with the processor. In yet another aspect, initiated action is sending an alert to either the email address in the TO or FROM email header fields of the inbound message, or to send the alert to the email address of both the To and From email header fields of the inbound message.

In another aspect, the present disclosure includes a system having an email client, comprising: a processor disposed in the email client, the processor programmed with programming commands to review content of inbound messages after an end user of the email client initiates an action to a received inbound message, and to verify elements of the received inbound message header fields, and to initiate an action if the elements of the header fields match or do not match; wherein the elements verified are $A_F \neq A_R$. In one alternative aspect, action is clicking a REPLY button, a REPLY-ALL button, or a FORWARD button in a user interface of the email client. In another aspect, the action is displaying an alert message. In another aspect, the action is moving the message to a different folder stored in a memory associated with the processor. In yet another aspect, the action is sending an alert to both the email addresses in the TO and FROM email header fields of the inbound message.

In still another aspect, the present disclosure includes a system having an email client, comprising: a processor disposed in the email client, the processor programmed using programming commands to review content of an inbound message after the user of the email client initiates an action to the inbound message, the programming commands of the processor configured to determine if $A_R \neq$ Null (empty field) and If $N_F = N_R$ and $A_F \neq A_R$, perform a special action on the message, otherwise process the inbound message in a normal manner. In one aspect, the user initiated action is clicking a REPLY button in the email client user interface. In another aspect, the special action is displaying an alert message. In still another aspect, the special action is moving the message to a different folder stored in a memory associated with the processor. In yet another alternative aspect, the special action is sending an alert to both the email address in the TO and FROM email header fields. In still another alternative aspect, the special action is sending an alert to both the email address in the TO and FROM email header fields of the inbound message.

In another aspect, the present disclosure includes an emailing system having a server disposed on an outbound message path toward an email address contained in an originally received reply-to message header address, the server being separate from a recipient having the reply-to email address, comprising: a processor associated with the server, the processor programmed using programming commands to review content of an inbound message received by the server, the processor programmed to determine if $A_R \neq$ Null (empty field) and if $N_F = N_R$ and if $A_F \neq A_R$, the processor being further programmed using programming commands to perform a special action on the message, otherwise the processor is programmed to process the inbound message in normal manner.

In yet another aspect, the present disclosure includes an emailing system with a server disposed on an outbound message path, the server separate from a forward recipient, comprising: a processor associated with the server, the processor programmed using programming commands to review content of a message received on the server from an original recipient of the message, the message having been forwarded by the original recipient to a forward recipient, the processor also being programmed to analyze message headers of the received message, and if $A_R \neq$ Null (empty field) and if $N_F = N_R$ and $A_F \neq A_R$, the processor being further programmed using programming commands to perform a special action on the message, otherwise the processor is programmed to process the inbound message in normal manner.

In another aspect, the present discloses describes a system for determining a risk of sending a message to a recipient, comprising: a processor programmed using hardware and software commands to provide for composing and sending electronic messages, the processor also programmed to: at the moment after the initiation of the sending of an electronic message and before the message transmission, connect to a network, send a query to external sources of information, receive the queried information, analyze the received information and information related to the electronic message, determine if an alert should be transmitted to a sender, and display the alert to the sender. In one other aspect, the external information source is a web page. In another aspect, the external information source is a database. In yet another aspect, the external information is related to an age of a domain of a recipient address from within the message. In still another aspect, the external information is related to indices of text combinations and emotional scores.

In yet another aspect, the disclosure describes a system determining a risk of sending a message to a recipient based on an evaluation of the address of each recipient of the message, comprising: a processor programmed using hardware and software commands to provide for replying to, composing and sending electronic messages, the processor also programmed, before the reply or forward transmission initiates, to compare the addresses of the intended recipient or recipients with a pre-defined database on a local device or a server separate from the sender, (a) the sending company domain (domain of the sender) and (b) the first and last names of key executives in the sending company, with (c) the Friendly Name of the received email message header and (d) the received address domain from the FROM address in the received message header, if (a) is not equal to (d) and (b) equals (c) then the processor is programmed to verify if the content associated with the values (a) to (d) matches those values in a stored table, and if so, to continue with the reply without any message dialog; if not, then the processor is programmed to present a message dialog to the sender in the moment when the reply has initially initiated and before the reply compose pane is displayed to the sender. In another aspect, if the sender activates the button to continue the reply, then the processor, programmed using hardware and/or software commands, adds the combination of data associated with the content of each value into a table such as a "Verified Replies" database. In yet another aspect, wherein in the moment of the send, the processor performs all domain scraping and analysis logic to ensure the system completes the analysis in a fraction of a second. In still another aspect, a hierarchy of performing extra analysis for messages determined to be sensitive in nature because they are determined to contain sensitive, private, or high value content. In yet another aspect, a hierarchy of performing extra analysis for messages that are determined to involve sensitive people who may be more emotionally susceptible to making errors or being lured by impostors. In yet another aspect, performing extra analysis includes at least one action selected from the group of actions consisting of displaying a full recipient email address, performing other recipient domain risk analysis, transforming the message to encrypt, track, prove delivery of the message, and transforming the message format or transmission path display.

Other features and advantages of the present disclosure will become apparent from the following detailed description, taken in conjunction with the accompanying drawings, which illustrate, by way of example, the principles of the disclosure.

BRIEF DESCRIPTION OF THE DRAWINGS

The disclosure will now be described in relation to the accompanying drawings in which.

DETAILED DESCRIPTION OF THE EMBODIMENTS

Figure 1:
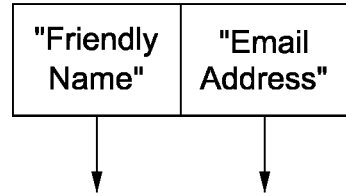
FIG. 1 is a graphic illustrating the From and Reply-To message header format of an email.

Certain embodiments as disclosed herein provide an application framework for creating, managing, customizing, and operating systems and methods related to protecting an email user from "whaling" phishing. In one embodiment, the system comprises an application server, a database, a remote server, and a client device. In another embodiment, the whaling protection system may be a plug-in program or service that is resident on a client computer or terminal, cell phone, tablet, and the like. This plug-in may be hardware or software that programmed to carry out the various steps and/or algorithms necessary to provide the user with the advantages of the various embodiments of the disclosure.

Moreover, the systems and methods of the present disclosure may be configured to operate in a server environment, wherein the client communicates with the server and/or network gateway through a network, such as the Internet to obtain the advantages of the various embodiments of the disclosure.

As will be described hereinafter in greater detail, the various embodiments of the present disclosure relate to a system and method for detecting if a reply to an email will be transmitted to an unintended recipient in the viewpoint of the individual replying. For purposes of explanation, specific nomenclature is set forth to provide a thorough understanding of the present disclosure. Description of specific applications and methods are provided only as examples. Various modifications to the embodiments will be readily apparent to those skilled in the art and the general principles defined herein may be applied to other embodiments and applications without departing from the spirit and scope of the disclosure. Thus the present disclosure is not intended to be limited to the embodiments shown, but is to be accorded the widest scope consistent with the principles and steps disclosed herein.

In the following description, numerous specific details are set forth in order to provide a thorough understanding of the present disclosure. It will be apparent, however, to one of ordinary skill in the art, that the present disclosure may be practiced without these specific details. In other instances, well known components or methods have not been described in detail but rather in a block diagram, or a schematic, in order to avoid unnecessarily obscuring the present disclosure. Further specific numeric references such as "first," may be made. However, the specific numeric reference should not be interpreted as a literal sequential order but rather interpreted that the "first" is different than a "second." Thus, the specific details set forth are merely exemplary. The specific details may be varied from and still be contemplated to be within the spirit and scope of the present disclosure.

Further, while the disclosure uses the term server, this may in practice be a network of servers on one or more physical devices, or be part of a server function or configuration, or be a computer or computing device.

Throughout the description reference will be made to various software programs and hardware components, servers, computers, computing devices (machine-readable medium) that provide and carryout the features and functions of the various embodiments of the present disclosure. It will be understood that the methods and processes of the various embodiments of the disclosure, while running on typical hardware components, control those components in such a manner that the components carry out the specialized processes of hardware that has been specifically constructed to carry out those processes. Moreover, using the methods and processes of the various embodiments of the disclosure result in an improvement to transmission of emails through a network (such as, for example, the Internet) in that they provide for detection of Whaling phishing attacks and mitigation of losses of valuable and private information belonging to a victim of such attacks.

Software programs may be embedded onto a machine-readable medium. A machine-readable medium includes any mechanism that provides, stores or transmits information in a form readable by a machine, such as, for example, a computer, server or other such device. For example, a machine-readable medium may include read only memory (ROM); random access memory (RAM); magnetic disk storage media; optical storage media; flash memory devices; digital video disc (DVD); EPROMs; EEPROMs; flash memory; magnetic or optical cards; or any type of media suitable for storing electronic instructions.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both. It should be contemplated that the order of operation of the algorithm could be different than the one written herein.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or "inputting" or "parsing" or "reviewing" or "matching" or "verifies" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

In an embodiment, the logic consists of electronic circuits that follow the rules of Boolean Logic, software that contain patterns of instructions, or any combination of both.

Example systems and methods may be better appreciated with reference to flow diagrams. While for purposes of simplicity of explanation, the illustrated methods are shown and describes as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional blocks not illustrated.

The various embodiments of the disclosure described below, for example, can be software commands installed into common email client user interfaces such as Microsoft Outlook, Microsoft Outlook Online, Google® Gmail®, among others. Other embodiments may be implemented using servers such as Apache, Sendmail, Qmail, Openwave Messsaging, Zimbra, Sun, Microsoft® Exchange®, or similar with message transport server functions.

In the case of implementing the embodiments of the disclosure in Google Gmail, the Google Chrome Browser framework for Chrome Browser Extensions may be used. These Extensions allow one to add the functionality of the embodiments of the disclosure to Chrome without diving deeply into native code using familiar web development methods such as HTML, CSS, and JavaScript. Using this method, upon the end user selecting a User Interface (UI) element of the web based Google Gmail program viewed using a Chrome Browser, the UI element will call a browser action, which triggers the running of software commands implementing one or more of the embodiments of the disclosure. For example, opening an email in the Google Gmail program Inbox viewed using a Chrome Browser and clicking the REPLY button in the UI, triggers the an embodiment of the disclosure to examine the described message headers, matches the described header elements, and depending on the result, triggering a follow-on action. The various embodiments of the disclosure may be implemented as a Chrome Browser Extension and installed by end users, such as, for example, Google itself, or a third party, as a zipped bundle of files—HTML, CSS, JavaScript, images, and other elements needed to add the desired functionality to the Google Chrome browser. In this instance, the Extension are essentially web pages, and they can use all the APIs that the browser provides to web pages, from XMLHttpRequest to JSON to HTML5. The Extension can interact with web pages or servers using content scripts or cross-origin XMLHttpRequests.

In the case of implementing the various embodiments of the disclosure in Microsoft Outlook, one example would be to write the software embodying the various embodiments using the Dot-Net framework to create a Microsoft Outlook COM-Add-in or a Microsoft Office Add-in using the Microsoft JavaScript API for Office and HTML5 that enables one to create web applications that interact with the object models in Office host applications. In this manner, an embodiment of the disclosure runs as an application that references the office.js library, which is a script loader. The office.js library loads the object models that are applicable to the Office application that is running the add-in. One can use these JavaScript object models, HTML5, and Com-Add-In APIs, depending on Microsoft Versions.

Alternatively, the Microsoft.Office.WebExtension namespace (which by default is referenced using the alias Office in code) contains objects that can be used to construct scripts embodying the disclosure that interact with the UI element that triggers the running of the scripts. For example, opening an email in the Microsoft Outlook email client program Inbox and clicking the REPLY button in the UI can trigger an embodiment of the disclosure by, for example, examining the described message headers, matching the described header elements, and depending on the result, triggering the described follow-on action. The Microsoft Add-In that contains the embodiment of the disclosure can be installed by end users for example, by Microsoft itself, or by a third party.

In mobile messaging environments the various embodiments of the disclosure will operate similarly in programming languages such as, for example, if messaging on devices using Android operating system, programmed using Java, and if messaging on devices using iOS operating system, programmed using objective-c/Swift, and the like.

One embodiment of the disclosure described below, for example, can be implemented using programming commands installed into common Mail Transport Agent software that is installed on a mail server, email security appliance or email security gateway that is configured to receive inbound email traffic. These programming commands, depending on the version software of Mail Transport Agent and the operating system of the servers, can be written using a variety of programming tools and programming languages or frameworks such as Microsoft's Dot-Net framework, Linux, Unix or the like. The scripts embodying the disclosure can be written as programming commands that operate on messages that are inside a process of the Mail Transport Agent, mail server, email security appliance or email security gateway, such that the commands are operating as part of a process within these email management functions or as stand-alone applications.

Other embodiments of the disclosure described may use similar email client, computing device, or server implementations.

FIG. 1 is a graphical representative illustrates the content and format inserted into the electronic message header fields for the fields of a received email. As can be seen, these fields, "From", "Sender", "Reply-To", have two components. These two components are what is commonly referred to as the "Friendly Name" and the "Email Address". The schema of these two parts of these header fields is the following:
  Schema: "Friendly Name"<emailaddress>
  Example: "John Smith"<john@gmail.com>

The following abbreviations, consistent with RFC5322 and RFC0822, in addition to the definitions set forth above, are used in this description of the various embodiments of the disclosure and in the diagrams:

"From" Email Header Field on the Received Message into the Inbox;

"Sender" Email Header Field on the Received Message into the Inbox (Note, the "Sender" Email Header Field is different from the Envelope Address also known as the Return-Path Header Field);

"Reply-To" Email Header Field on the Received Message into the Inbox;

The following further terminology is used:

"Known person of authority" may equate to an Authentic Sender "Friendly Name" or Authentic Sender "Email Address;"

"Known administrator who has access to transfer money" may equate to Intended Recipient "Friendly Name" or Intended Recipient "Email Address"; and Internet criminal may equate to an Imposter "Email Address" (which would be placed in the Reply-To message header field).

As discussed previously, Internet criminals exploit the "From" and "Reply-To" email message header fields by using Internet-based research or with non-public information sources and account hacking to identify a target recipient name, job title, and email address, and a sender name, job title, and email address. The Internet criminal often targets a sender known to the recipient as having the authority to direct the recipient to transfer money.

With this information, the Internet criminal exploits the standard internet message format and internet message transmission protocols of RFC5322 and RFC0822 to send the email from Internet criminal's own computer or automated criminal email sending system, with the From header field "friendly name" and From header field "email address" being the "known person of authority", and the Recipient header field "friendly name" and Recipient header field "email address" being the "known administrator who has access to transfer money upon receipt of instructions from the person of authority", and the Reply-To header field "friendly name" being the name of the known person of authority, and uniquely, the Reply-To header field "email address" being the email address of an email account separate from the known person of authority and instead, being one accessible to the Internet criminal.

This causes the email to appear to the recipient as if sent from the known person of authority, and when the recipient replies, the "friendly name" name that displays is that of the known person of authority, and secondary to the Reply-To "friendly name" displayed is the Reply-To "email address" of the Internet criminal and not the email address of the known person of authority. The Internet criminal typically uses as the Reply-To email address an address that looks at a glance to be one that is not out of the ordinary, such as ipadmail@mail.com.

Using the email headers defined by RFC0822 and RFC5322 in the above manner, the replies are directed to the Internet criminal's email account mailbox via normal Internet protocol message sending as the address noted in the Reply-To field (i.e. ipadmail@mail.com).

Figure 2:
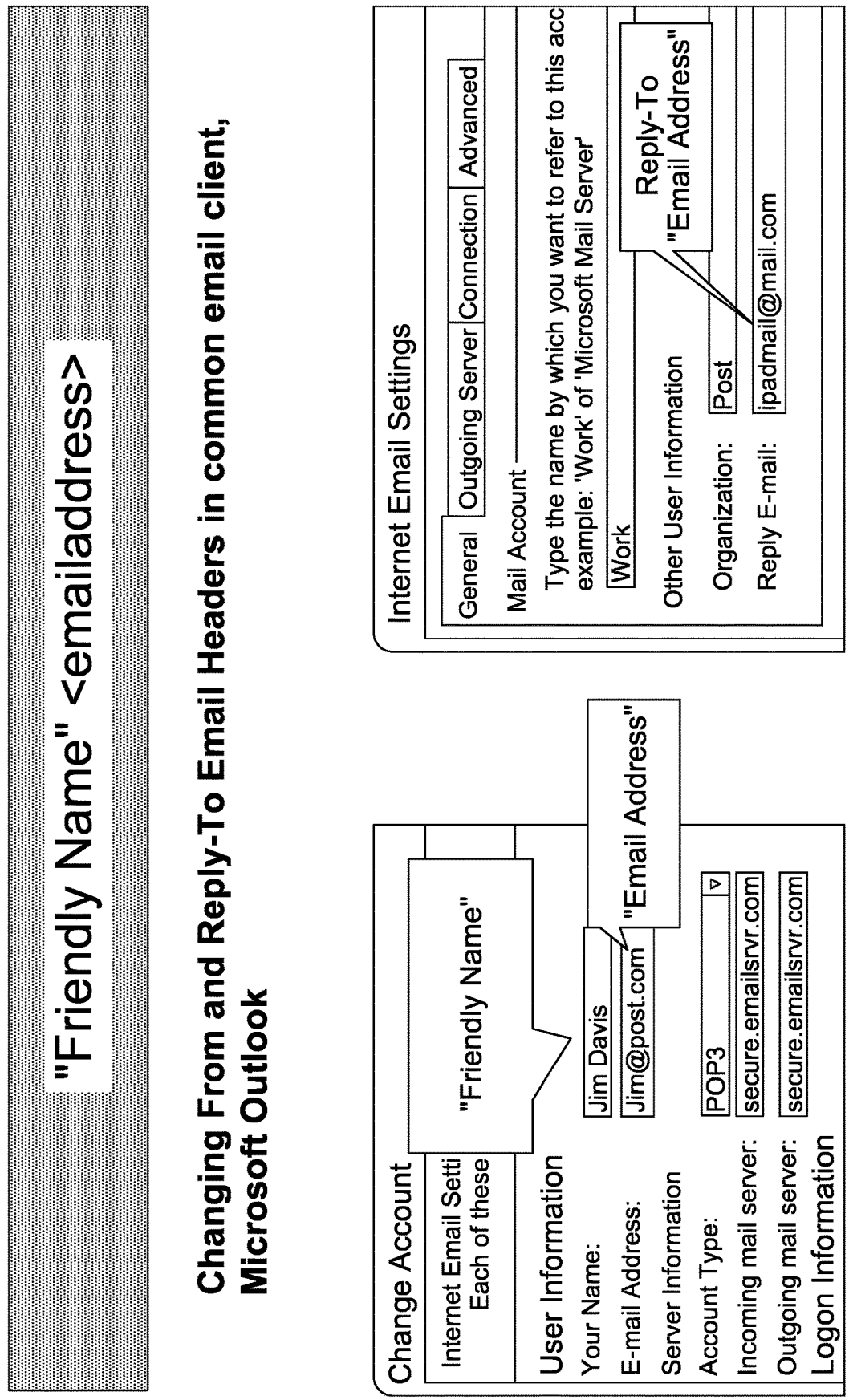
FIG. 2 is a graphic illustrating how a user may change Email Address Format for fields such as the From and Reply-To headers in a Common Email Client.

FIG. 2 is a graphical representation showing how the Friendly Name and Email Address may be changed for the From and Reply-To email headers in a common email client, such as, for example, Microsoft Outlook. Thus an Internet Criminal may send an email with From and Reply-To headers that appear to a recipient of the email that they are replying to a Friendly Name, when in fact the reply is being directed to the Internet Criminal.

Figure 3:
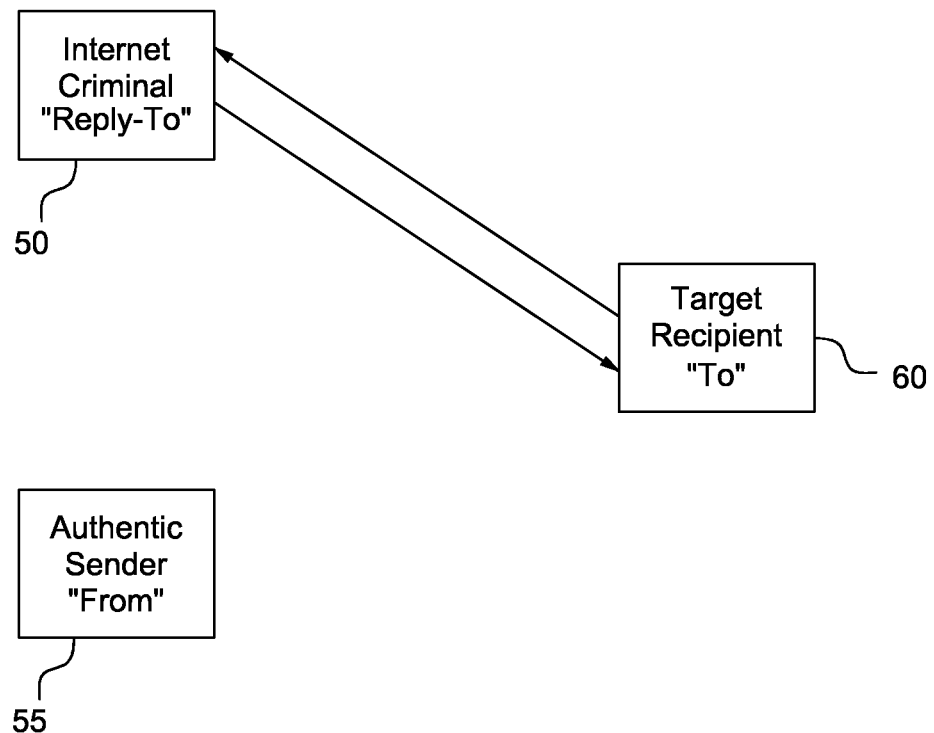
FIG. 3 is a diagram illustrating the email flow in a whaling attack where the Reply-To field has been changed so that a response from the email by a Target Recipient is sent to the altered Reply-To address instead of being directed to an Authentic Sender.

FIG. 3 is a graphical representation of the email information flow during a Whaling phishing attack. In this type of attack, an email is sent by an Internet Criminal 50 to an unsuspecting Target recipient 60. The received email has an Authentic Sender 55 listed in the From header, while the Internet Criminal has entered his own email address into the Reply-To header. Thus the recipient 60 receives the email, and if he or she wishes to respond to the email, presses the "Reply" button on their email client and sends a reply not to the Authentic Sender 55, but instead to the Internet Criminal 50.

Figure 4:
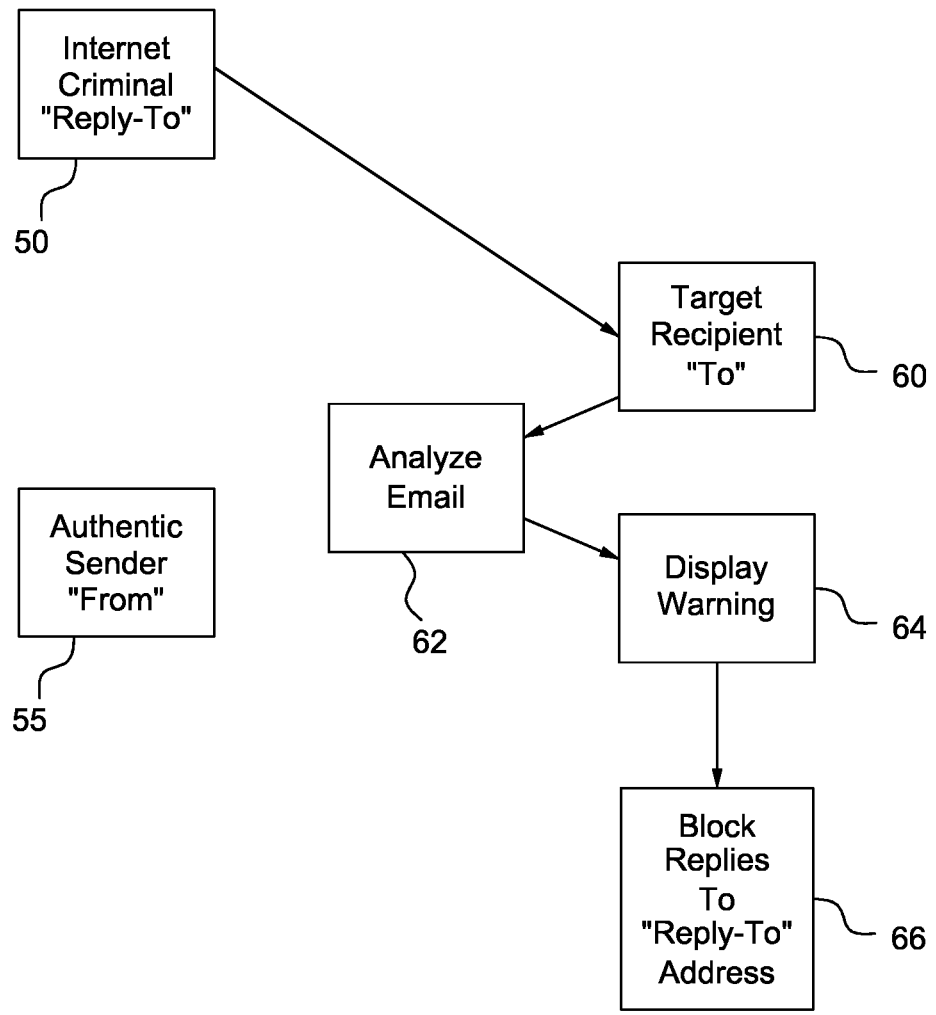
FIG. 4 is a diagram illustrating the email flow in a whaling attack wherein an embodiment of the present disclosure is employed by the Target Recipient to analyze the email message, detect the spoofed Reply-To field, provide a warning to the Target Recipient, and prevent email flow back to the Internet Criminal Reply-To address.

FIG. 4 is a graphical representation of the email information flow where the Target recipient's email client has a first exemplary embodiment of the disclosure implemented on the email client. As before, an email is sent by an Internet Criminal 50 to an unsuspecting Target recipient 60. The received email has an Authentic Sender 55 listed in the From header, while the Internet Criminal has entered his own email address into the Reply-To header. In this case, however, when the recipient presses the Reply or Reply To All button on his or her email client, the embodiment of the disclosure implemented on his or her email client intercepts the command from the Reply or Reply to All button and analyzes the received email. In this case, the email is determined to be fraudulent, and a warning 64 is displayed to the recipient and blocks 66 the desired "reply" from being sent to the Internet Criminal.

Figure 5:
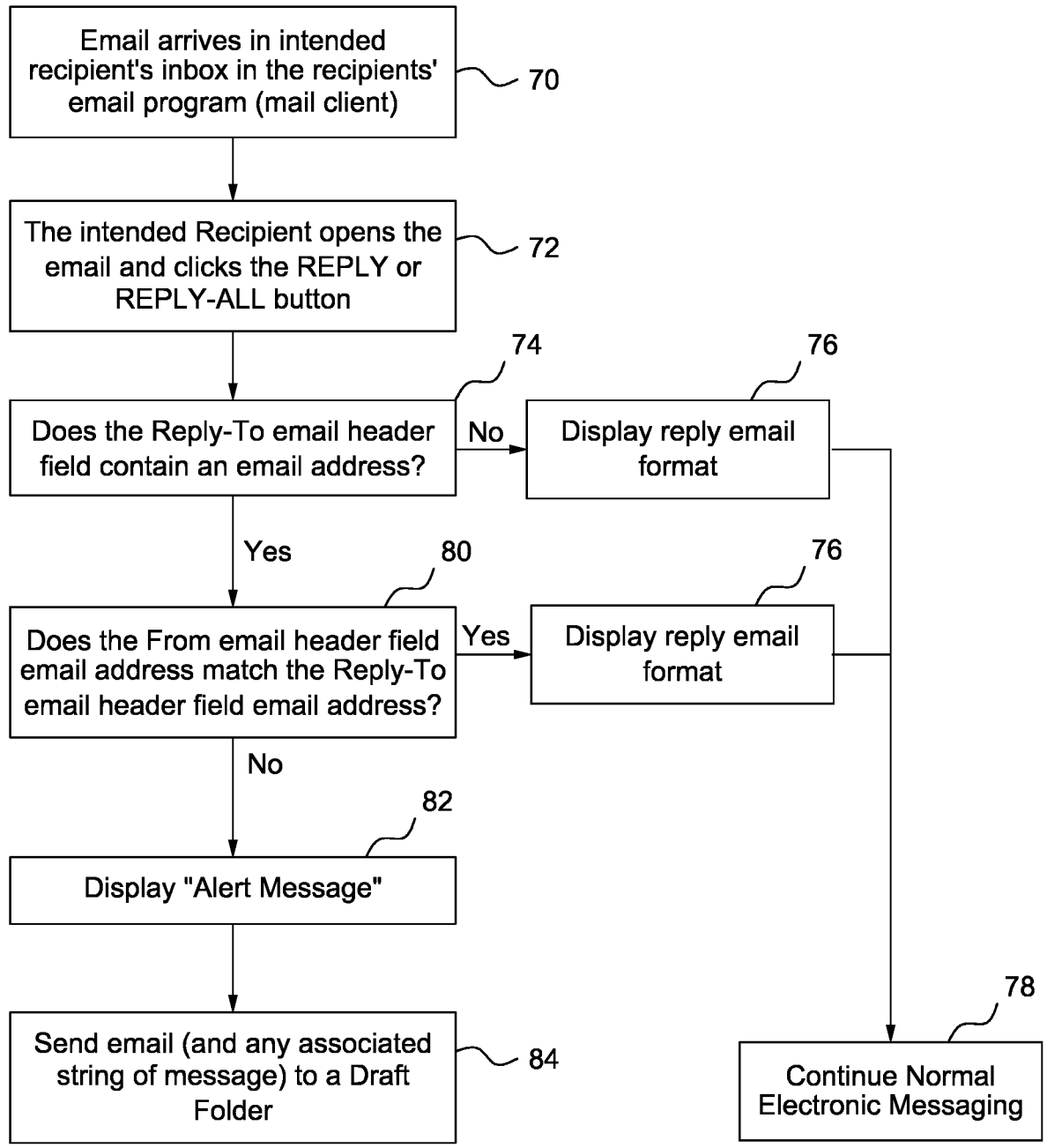
FIG. 5 is a flow diagram illustrating the processes carried out by a an embodiment of the disclosure.

FIG. 5 is a block diagram illustration the flow of the first exemplary embodiment of the disclosure discussed above. In this embodiment, the fraudulent email arrives in the target recipient's email inbox of the recipient's email client in box 70. If the target recipient opens the email and then clicks on the Reply or Reply-All buttons of the email client in box 72, the command to compose a reply message is intercepted by the programming commands of the first embodiment of the disclosure, and they analyzed to determine if the Reply-To email header field of the message contains an email address in box 74. If the Reply-To email header field does not contain an email address, the programming commands of the first embodiment of the disclosure terminate and the email client displays a typical reply email message format to the recipient in box 76 and the process continues with normal electronic messaging in box 78.

If the Reply-To email header field does contain an email address in box 74, then in box 80, the email headers are further analyzed to determine if the email address contained in the From email header field matches the email address contained in the Reply-To email header field. If the email addresses of the From field and the Reply-To fields match, then the process is terminated and the typical reply email format is displayed to the recipient in box 76.

If the From email address does not match the Reply-To email address, an alert message is displayed to the recipient in box 82, and the received email, along with any other messages associated with the received message, such as, for example, a string of other email messages or attachments, is sent to a quarantine or draft folder of the recipient's mail client in box 84.

Various warning messages may be provided to the recipient when a fraudulent email message is received. For example the alert message may be: "Caution: Your reply email will be routed to someone other than the displayed original email sender. This could cause your message to be routed to an unknown third party. Would you like to continue with your reply? A Yes/No button may also be provided to the recipient, allowing the recipient to bypass the blocking of the reply to the fraudulent message if desired if "Yes" is selected, or if "No" is selected, move the message reply and its message string (associated messages) in the draft folder (or other folder) of the mail client, and add a second alert message that states, for example: "The message in question has been moved to the Quarantine or Draft (or other) folder for the recipient to further review."

Figure 6:
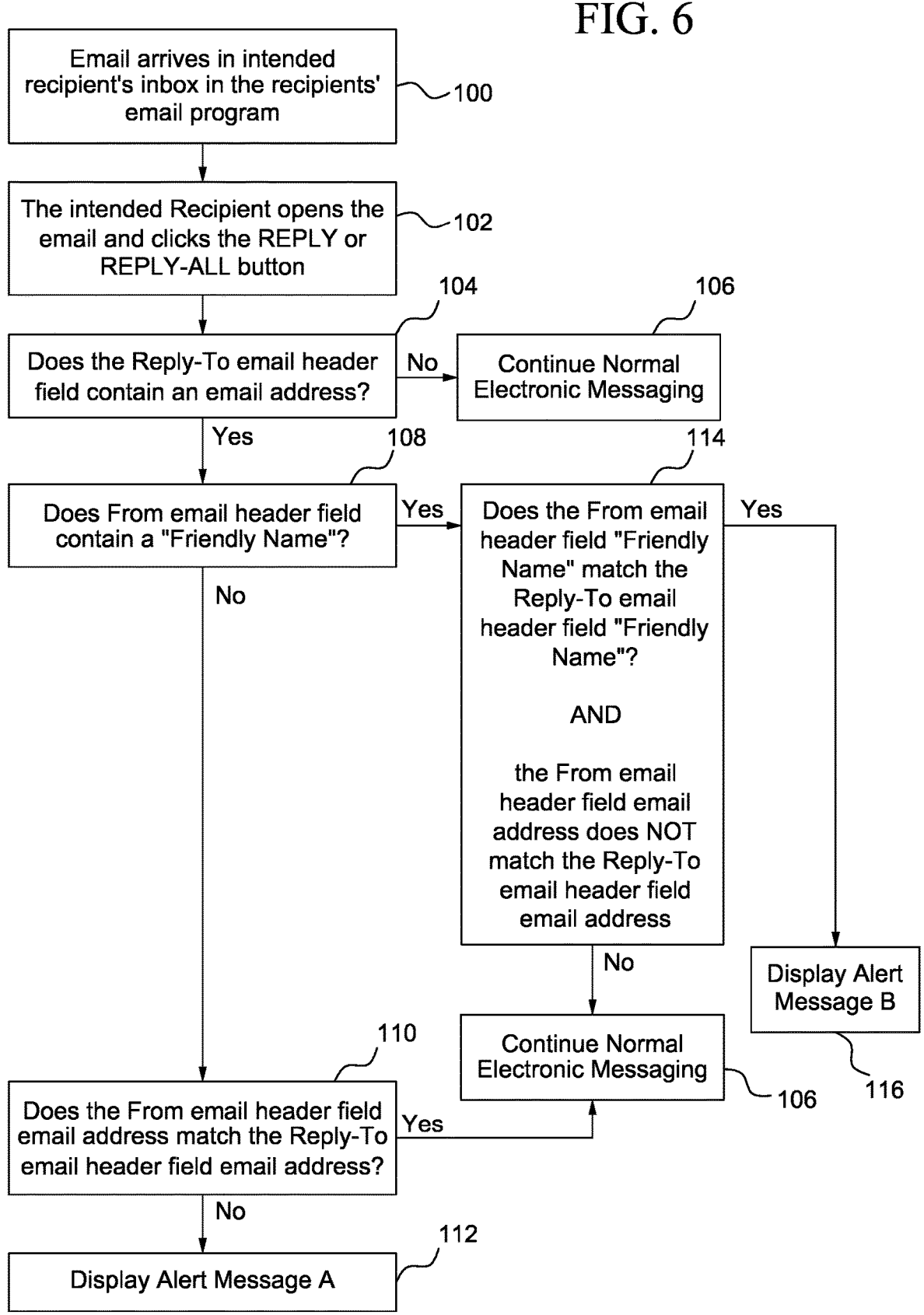
FIG. 6 is a flow diagram illustrating exemplary processes carried out by an embodiment of the disclosure.

FIG. 6 is a flow chart illustrating the processes carried out by a second embodiment of the disclosure. In this embodiment, the recipient desires a higher level of risk mitigation to avoid responding to a fraudulent received email message.

In this embodiment, the fraudulent email arrives in the target recipient's email inbox of the recipient's email client in box 100. If the target recipient opens the email and then clicks on the Reply or Reply-All buttons of the email client in box 102, the command to compose a reply message is intercepted by the programming commands of the first embodiment of the disclosure, and they analyzed to determine if the Reply-To email header field of the message contains an email address in box 104. If the Reply-To email header field does not contain an email address, the programming commands of the second embodiment of the disclosure terminate and the email client displays a typical reply email message format to the recipient, and then continues with normal electronic messaging in box 106.

If the Reply-To email header field does contain an email address in box 104, then in box 108, the email headers are further analyzed to determine if the email address contained in the From email header field contains a "Friendly Name". If the From email address in the From email header field is a "Friendly Name" and matches a "Friendly Name" contained in the Reply-To email header, and the email address contained in the From email header field does not match the email address contained in the Reply-To email header field in box 114, the logic set forth in box 114 is true, and alert message B is displayed to the recipient. On the other hand, if the logic set forth in box 114 is false, then the email client displays a typical reply email message format to the recipient and then continues with normal electronic messaging in box 106.

If the From email header field does not contain a "Friendly Name" as determined in box 108, the process then determines if the email address contained in the From email header field matches the email address contained in the Reply-To email header field in box 110. If the email addresses of the From field and the Reply-To fields match, then the process terminates and continues normal electronic messaging in box 106. If they do not match, alert message A is displayed to the recipient.

Various warning messages may be provided to the recipient when a fraudulent email message is received. For example the contents of alert message A may be: "Caution: Your reply email will be routed to someone other than the displayed original email sender. This could cause your message to be routed to an unknown third party. Would you like to continue with your reply?" A Yes/No button may also be provided to the recipient, allowing the recipient to bypass the blocking of the reply to the fraudulent message if desired if "Yes" is selected, or if "No" is selected, move the message reply and its message string (associated messages) in the draft folder (or other folder) of the mail client, and add a second alert message that states, for example: "The message in question has been moved to the Quarantine or Draft (or other) folder for the recipient to further review."

Similarly, the contents of alert message B may be: be: "Caution: Your reply email will be routed to someone other than the displayed original email sender. This could cause your message to be routed to an unknown third party. Would you like to continue with your reply?" A Yes/No button may also be provided to the recipient, allowing the recipient to bypass the blocking of the reply to the fraudulent message if desired if "Yes" is selected, or if "No" is selected, move the message reply and its message string (associated messages) in the draft folder (or other folder) of the mail client, and add a second alert message that states, for example: "The message in question has been moved to the Quarantine or Draft (or other) folder for the recipient to further review."

Where the user wants a higher level of risk mitigation automated with actions taken before the sent message from the Internet criminal reaches that target recipient, software embodying a third embodiment of the disclosure may be installed on a server separate from the sender that receives email before reaching the target recipient email box.

Figure 7:
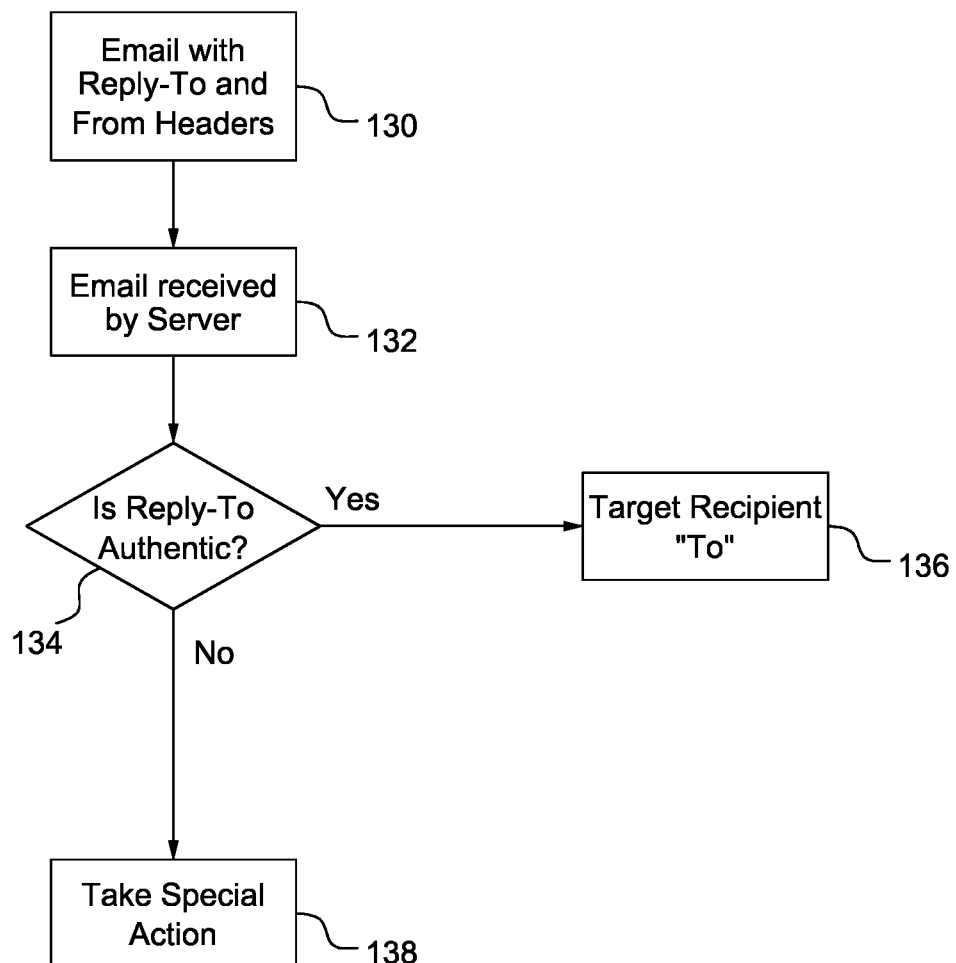
FIG. 7 is a diagram illustrating the email flow in a whaling attack wherein another embodiment of the disclosure is employed by a server separate from the sender receives an email from a sender, the email having a fraudulent Reply-To address, to analyze the email and take an action on the email dependent on whether the email is from an authentic sender or not.

FIG. 7 is a graphic representation of email flow in the case where an email appears to come from an authentic sender, but in actuality comes from an Internet Criminal. Here, an email is sent from the Internet Criminal with Authentic Sender "From" information, and with the Internet Criminal's "Reply-To" information to a target recipient in box 130. The email is intercepted by a server that is located remote from the sender's email client in box 132. The server, operated by programming commands embodying the third embodiment of the disclosure, analyzes the header information of the email at box 134. If the server determines that the email is not fraudulent, the email is passed by the server to the target recipient at box 136. If the server determines that the email is fraudulent, the server does not send the email to the recipient, but instead takes special action on the email, such as quarantining the email in a data base for further analysis or other action.

Figure 8:
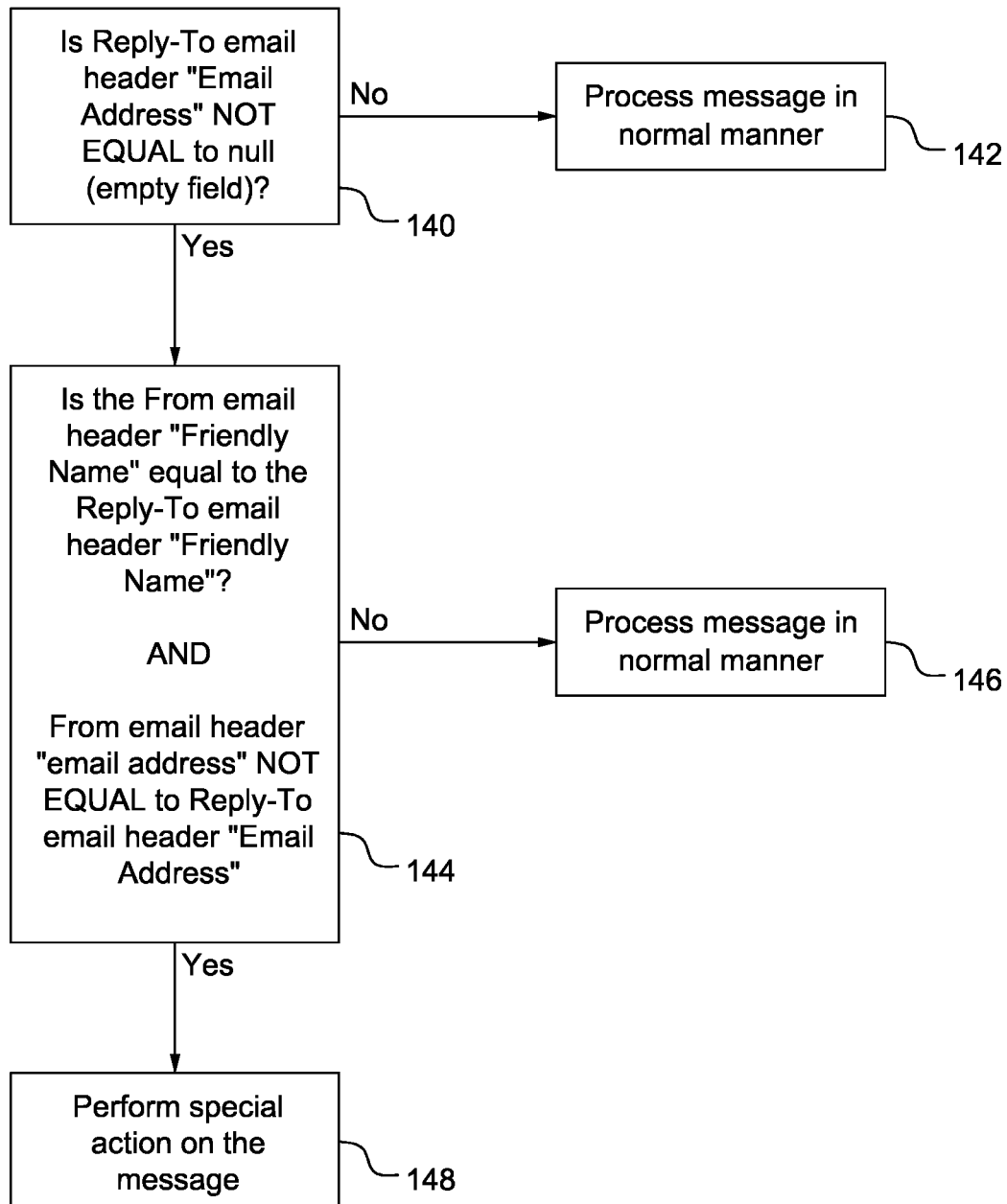
FIG. 8 is a flow diagram the processes carried out by an embodiment of the disclosure.

FIG. 8 is a flow chart illustrating the various methods, processes, and logic carried out by the third embodiment of the disclosure. As stated previously, these methods, processes, and logic are embodiment in software and hardware that comprise a server that is located remotely from a sender's (whether authentic or criminal) email client.

When an email is received at the server, the server analyzes the email in box 140 to determine if email address in the Reply-To header is empty (a null field). If Reply-To header is empty, the email is processed in a normal manner in box 142 and transmitted to the indicated recipient of the email.

If there is an email address in the Reply-To email header, the email is further analyzed in box 144 to determine if the email is fraudulent. As set forth in box 144, if the From email header contains a "Friendly Name" and is the same as the contents of the Reply-To email header, and if the email address contained in the From email header is not the same as the email address contained in the Reply-To email header, the server determines that the email may be fraudulent, and performs a special action, such as that mentioned above, on the message. If the logical result of the logic contained in box 144 is determined to be false, then the message is determined to be an actual, non-fraudulent, message, and is transmitted to the indicated recipient of the message in box 146. Special actions that may be taken by the server are, for example, marking the message with an alert or other marking and then processing the message by sending it to the recipient, quarantining the message, putting the message into a special folder, adding a header to the message, deleting the message, sending a separate message to the From message header email address and the To message header email address, or taking other actions other than or in addition to normal message sending.

An additional example of a possible special action may to transmit the message that has been determined to possibly fraudulent to the indicated recipient containing an alert message, such as, for example, "Warning: It is very likely that your reply email will be routed to someone other than the displayed email sender. This could cause your message to be routed to an unknown third party. We recommend that you investigate further before replying and that you contact your IT administrator with this message. Would you like to continue with your reply? [Yes/No button]". If "Yes" is selected, then the email message reply email format is displayed. In "No" is selected, then one possible action would be to move the message reply and its message string (associated messages) into a quarantine folder of a draft folder of the mail client, and add a second alert message that states, for example, "The message in question has been moved to the Quarantine (or Drafts) folder for the user to further review."

In a fourth embodiment of the disclosure, the software embodying the fourth embodiment of the disclosure running on a recipient's mail client may verify that the Reply-To email header "Friendly Name" on an email transmitted to the target recipient is actually in the recipient's contact list.

Figure 9:
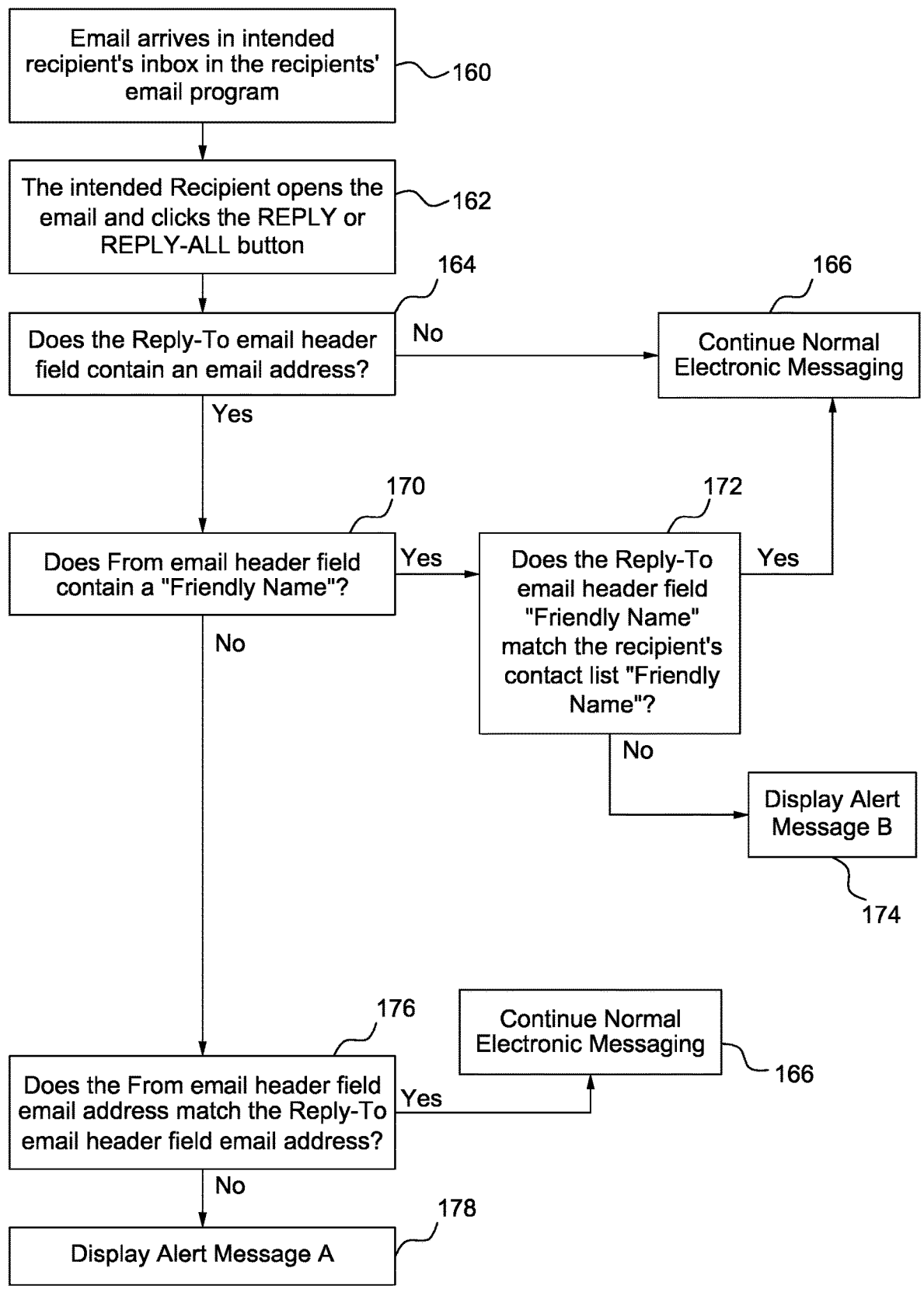
FIG. 9 is a flow diagram the processes carried out by an embodiment of the disclosure.

FIG. 9 is a flow chart illustrating an the various methods, processes, and logic carried out by the fourth embodiment of the disclosure. As stated previously, these methods, processes, and logic are embodiment in software and hardware that runs on a recipient's email client.

In the fourth embodiment, the fraudulent email arrives in the target recipient's email inbox of the recipient's email client in box 160. If the target recipient opens the email and then clicks on the Reply or Reply-All buttons of the email client in box 162, the command to compose a reply message is intercepted by the programming commands of the first embodiment of the disclosure, and they analyzed to determine if the Reply-To email header field of the message contains an email address in box 164. If the Reply-To email header field does not contain an email address, the programming commands of the fourth embodiment of the disclosure terminate and the email client displays a typical reply email message format to the recipient, and then continues with normal electronic messaging in box 166.

If the Reply-To email header field does contain an email address in box 164, then in box 170, the email headers are further analyzed to determine if the email address contained in the From email header field contains a "Friendly Name". If the From email address in the From email header field is a "Friendly Name". If the From email header field contains a "Friendly Name" in box 170, the processes determines whether the Reply-To email header field "Friendly Name" is contained in an entry in the recipient's contact list in box 172, If the contents of the Reply-To email header field is contained in the recipient's contact list, then the process terminates and the reply email format is displayed to the recipient and normal electronic message processing continues in box 166. If the contents of the Reply-To email header is not contained in the recipient's contact list, Alert Message B is displayed to the recipient in box 174.

If the From email header field does not contain a "Friendly Name" as determined in box 170, the process then determines if the email address contained in the From email header field matches the email address contained in the Reply-To email header field in box 176. If the email addresses of the From field and the Reply-To fields match, then the process terminates and continues normal electronic messaging in box 166. If they do not match, alert message A is displayed to the recipient in box 178.

In all of the embodiments of the disclosure described above, the programming commands embodying the various embodiments of the disclosure may start at different points in the process of managing the email at the recipient; for example, the process may start when the email arrives at the recipient email server, email account, inbox, reply before the message displays, reply after the message displays, reply-send, reply-outbox or elsewhere.

In a further embodiment, the programming commands embodying the various embodiments of the disclosure noted above may operate when an email first enters the intended recipient's email inbox, when they first open the email in their inbox, when they click reply or reply-all, when they click forward as noted above, at time intervals, or as the user clicks the send button after composing a reply message.

In a further embodiment, the programming commands embodying the various embodiments of the disclosure noted above may run on a server that is on the inbound message path to the intended recipient, or on the outbound message path after the intended recipient has replied and before the message reaches the Internet mail transport agent for Internet processing. In these emblements, there may be a process for an administrator, or recipient to review messages that triggered an Alert message.

In a further embodiment, there may be a variety of caution and warning messages provided by the programming commands embodying the various embodiments of the disclosure, or other functions that occur instead of displaying caution or warning messages, such as, for example, deleting the message, quarantining the message, moving the message to a special folder, or displaying an alert or warning or another indication in the message visible to the intended recipient. The ability to continue sending when an Alert message appears could be blocked or frozen pending an action by the recipient.

In further embodiments, when the programming commands embodying the various embodiments of the disclosure may trigger the caution or warning message, a message could be transmitted to the "From" Email Header "Email Address" that indicates that the individual associated with the "From" Email Header "Email Address" may be part of an Internet Imposter Scheme and should contact their IT Administrator with regards to the Message. Additionally, the message in question could be attached to this message in a message file format for further investigation.

It is contemplated that various modifications may be made to the rules and scenarios described above, including, for example, using In-Reply-To and other more obscure address and header fields to affect the processes described, and the disclosure should limited therefore.

The first and second embodiments of the disclosure described above, for example, can be written using programming commands installed into common email client user interfaces such as Microsoft Outlook, Microsoft Outlook Online, Google Gmail, among others.

For example, in the case of installing an embodiment of the disclosure into Google Gmail, the programming commands may be written using the Google Chrome Browser framework for Chrome Browser Extensions. These Extensions allow one to add the programming commands embodying the various embodiments of the disclosure to Chrome without diving deeply into native code using familiar web development methods of: HTML, CSS, and JavaScript. Using this method, upon the end user selecting a User Interface (UI) element of the web based Google Gmail program viewed using a Chrome Browser, the UI element will call a browser action, which triggers the running of the programming commands embodying the various embodiments of the disclosure. For example, opening an email in the Google Gmail program Inbox viewed using a Chrome Browser and clicking the REPLY button in the UI, can trigger the programming commands embodying the various embodiments of the disclosure for examining the described message headers, matching the described header elements, and depending on the result triggering the described follow-on action. Programming in this example would be done as a Chrome Browser Extension and installed by end users for example, by Google itself, or by a third party, as a zipped bundle of files—HTML, CSS, JavaScript, images, and other elements needed that add the described functionality to the Google Chrome browser. In this instance, the Extension are essentially web pages, and they can use all the APIs that the browser provides to web pages, from XMLHttpRequest to JSON to HTML5. The Extension can interact with web pages or servers using content scripts or cross-origin XMLHttpRequests.

In the case of installing the various embodiments of the disclosure into Microsoft Outlook, one example would be to write the programming commands noted in the described embodiments, using the Dot-Net framework to create a Microsoft Outlook COM-Add-in or a Microsoft Office Add-in using the Microsoft JavaScript API for Office that enables one to create web applications that interact with the object models in Office host applications. The various embodiments of the disclosure run as an application that references the office.js library, which is a script loader. The office.js library loads the object models that are applicable to the Office application that is running the add-in. One can use these JavaScript object models and Com-Add-In APIs, depending on Microsoft Versions. Alternatively, the Microsoft.Office.WebExtension namespace (which by default is referenced using the alias Office in code) contains objects that can be used to write the disclosure scripts that interact with the UI element that triggers the running of the commands. For example, opening an email in the Microsoft Outlook email client program Inbox and clicking the REPLY button in the UI, can trigger various embodiments of the disclosure to examine the described message headers, match the described header elements, and depending on the result, trigger the described follow-on action. The Microsoft Add-In that contains the various embodiments of the disclosure commands may be installed by end users for example, by Microsoft itself, or by a third party.

Another embodiment of the disclosure, for example, can be written using programming commands installed into common Mail Transport Agent software that is installed on a mail server, email security appliance or email security gateway that is configured to receive inbound email traffic. These programming commands, depending on the version software of Mail Transport Agent and the operating system of the servers, could be written using a variety of programming tools and programming languages, or frameworks such as Microsoft's Dot-Net framework. The scrips embodying the various embodiments of the disclosure can be written as software commands that operate on messages that are inside a process of the Mail Transport Agent, mail server, email security appliance or email security gateway, such that the commands are operating as part of a process within these email management functions.

Figure 10:
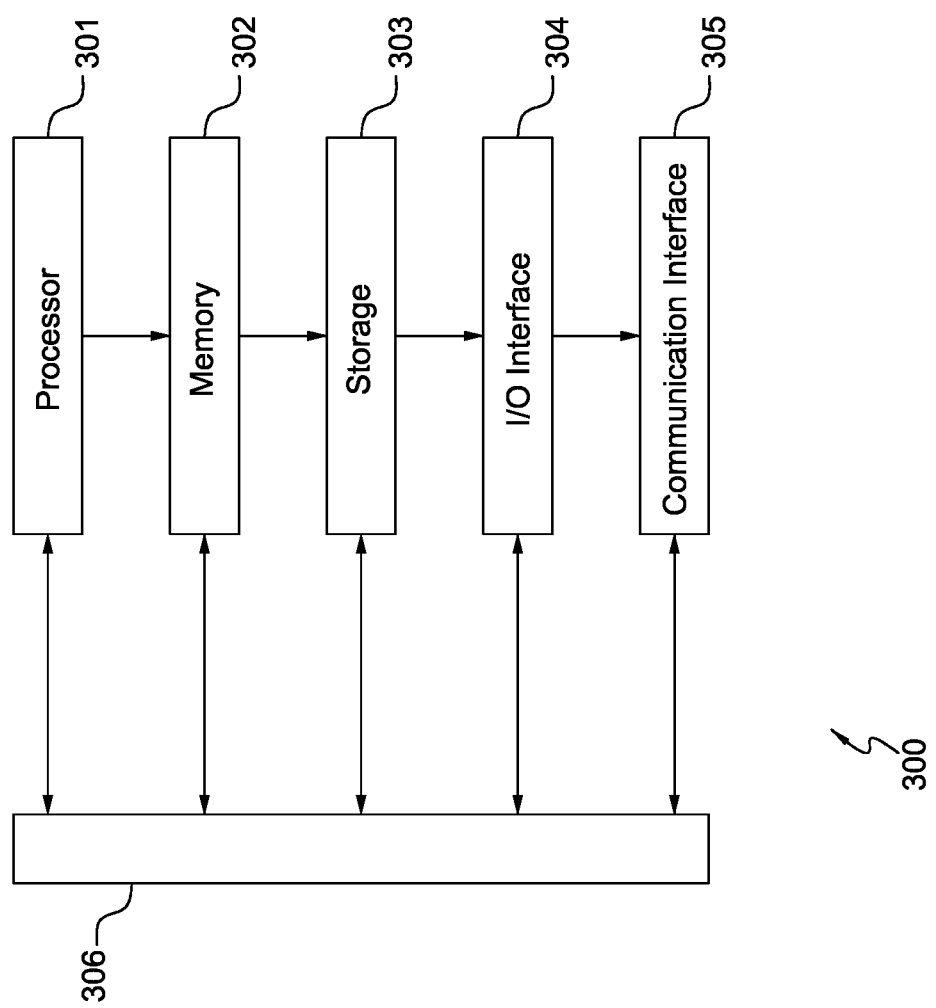
FIG. 10 is graphical representation of representative components and processes of a server system used to carry out various embodiments of the present disclosure.

FIG. 10 is graphic representation of an exemplary computer system 300 which may be used with the various embodiments of the present disclosure, which may be, for example, a server or a client computer system. Computer system 300 may take any suitable form, including but not limited to, an embedded computer system, a system-on-chip (SOC), a single-board computer system (SBC) (such as, for example, a computer-on-module (COM) or system-on-module (SOM)), a laptop or notebook computer system, a smart phone, a personal digital assistant (PDA), a server, a tablet computer system, a kiosk, a terminal, a mainframe, a mesh of computer systems, etc. Computer system 300 may be a combination of multiple forms. Computer system 300 may include one or more computer systems 300, be unitary or distributed, span multiple locations, span multiple systems, or reside in a cloud (which may include one or more cloud components in one or more networks).

In one embodiment, computer system 300 may include one or more processors 301, memory 302, storage 303, an input/output (I/O) interface 304, a communication interface 305, and a bus 306. Although this disclosure describes and illustrates a particular computer system having a particular number of particular components in a particular arrangement, this disclosure contemplates other forms of computer systems having any suitable number of components in any suitable arrangement.

In one embodiment, processor 301 includes hardware for executing instructions, such as those making up software. Herein, reference to software may encompass one or more applications, byte code, one or more computer programs, one or more executable module or API, one or more instructions, logic, machine code, one or more scripts, or source code, and or the like, where appropriate. As an example and not by way of limitation, to execute instructions, processor 301 may retrieve the instructions from an internal register, an internal cache, memory 302 or storage 303; decode and execute them; and then write one or more results to an internal register, an internal cache, memory 302, or storage 303. In one embodiment, processor 301 may include one or more internal caches for data, instructions, or addresses. Memory 303 may be random access memory (RAM), static RAM, dynamic RAM or any other suitable memory. Storage 305 may be a hard drive, a floppy disk drive, flash memory, an optical disk, magnetic tape, or any other form of storage device that can store data (including instructions for execution by a processor).

In one embodiment, storage 303 may be mass storage for data or instructions which may include, but not limited to, a HDD, solid state drive, disk drive, flash memory, optical disc (such as a DVD, CD, Blu-ray, and the like), magneto optical disc, magnetic tape, or any other hardware device which stores computer readable media, data and/or combinations thereof. Storage 303 may be be internal or external to computer system 300.

In one embodiment, input/output (I/O) interface 304 includes hardware, software, or both for providing one or more interfaces for communication between computer system 300 and one or more I/O devices. Computer system 300 may have one or more of these I/O devices, where appropriate. As an example but not by way of limitation, an I/O device may include one or more mouses, keyboards, keypads, cameras, microphones, monitors, displays, printers, scanners, speakers, cameras, touch screens, trackball, trackpad, biometric input device or sensor, or the like.

In still another embodiment, a communication interface 305 includes hardware, software, or both providing one or more interfaces for communication between one or more computer systems or one or more networks. Communication interface 305 may include a network interface controller (NIC) or a network adapter for communicating with an Ethernet or other wired-based network or a wireless NIC or wireless adapter for communications with a wireless network, such as a Wi-Fi network. In one embodiment, bus 306 includes any hardware, software, or both, coupling components of a computer system 300 to each other.

Figure 11:
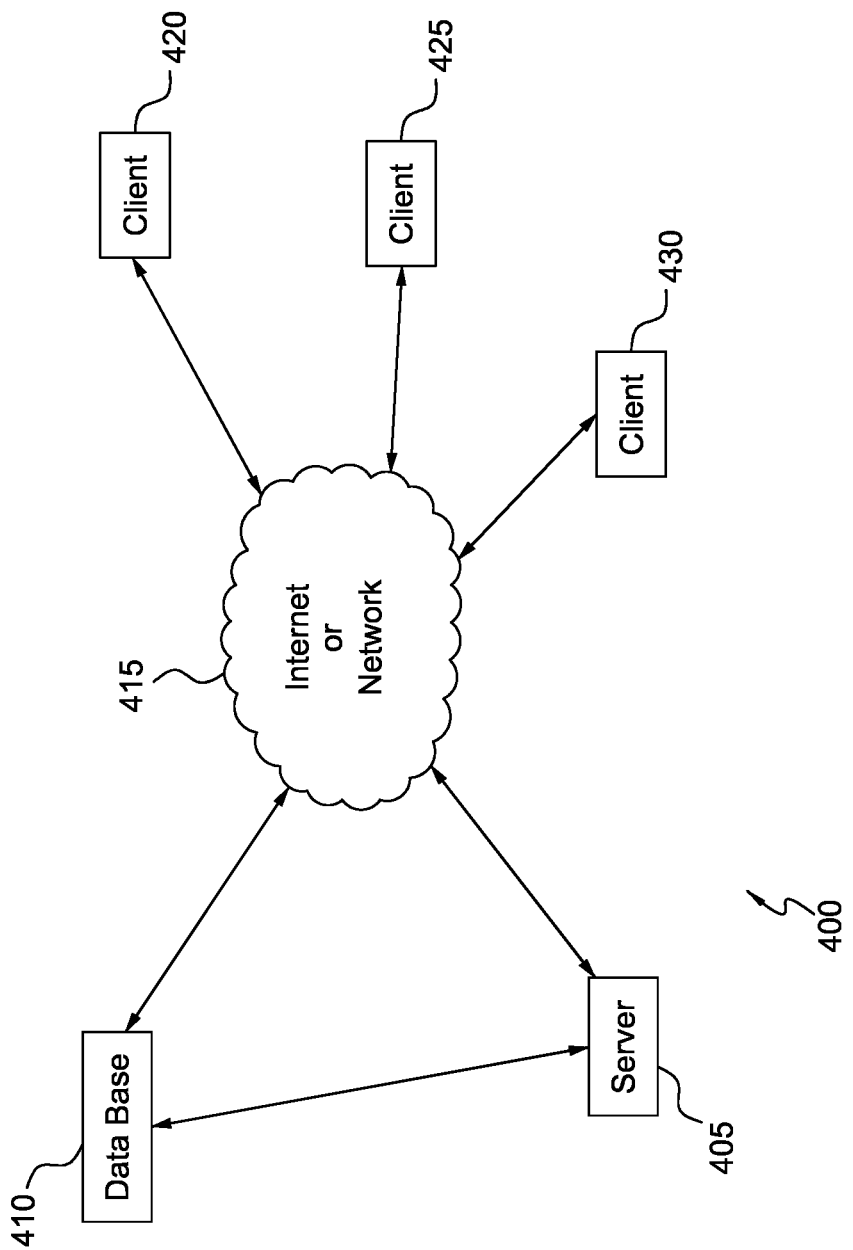
FIG. 11 is a graphical representation of a system incorporating various embodiments of the present disclosure and depicts various computers, terminals, servers and networks on which the various embodiments of the present disclosure are carried out.

FIG. 11 is a graphical representation of an exemplary network 400 that may be used to facilitate the various embodiments of the present disclosure. Server 405 is operated by a structured settlement services organization, and typically includes at least one processor, input and output equipment or devices, memory, storage, and a communication interface as discussed above with regards to FIG. 10. The server also operates under the control of specialized software programming commands that are designed to carry out the various processes described above.

A data storage device 410, which may be separate from the server, but not necessarily, may be accessible to the server 405, and may be used for storing date related to information and any other data related to operation of the various embodiments of the system and method described above. The data storage device 410 may directly connected to the server, or it may be accessible to the server through a network or the Internet, The data storage device may also be a virtual storage device or memory located in the Cloud. Application to be executed on the client devices, or at the server level, may also be stored in, and accessed from, the Cloud.

Server 405 may communicate with a network 415, which may be, for example, a local area network (LAN) or a wide area network (WAN) or the Internet and the World Wide Web. The server may communicate through the network 415 with clients 420, 425, and 630. Client device(s) will include processors and other ancillary equipment as described above.

Those skilled in the art will understand that the connections between server 405, data storage 410, network 415, client devices 420, 425, and 430 may be hard wired, or they may be wireless. As stated above, client device may be any device capable of operably connecting the network and accessing a web page or account hosted by server 405.

Figure 12:
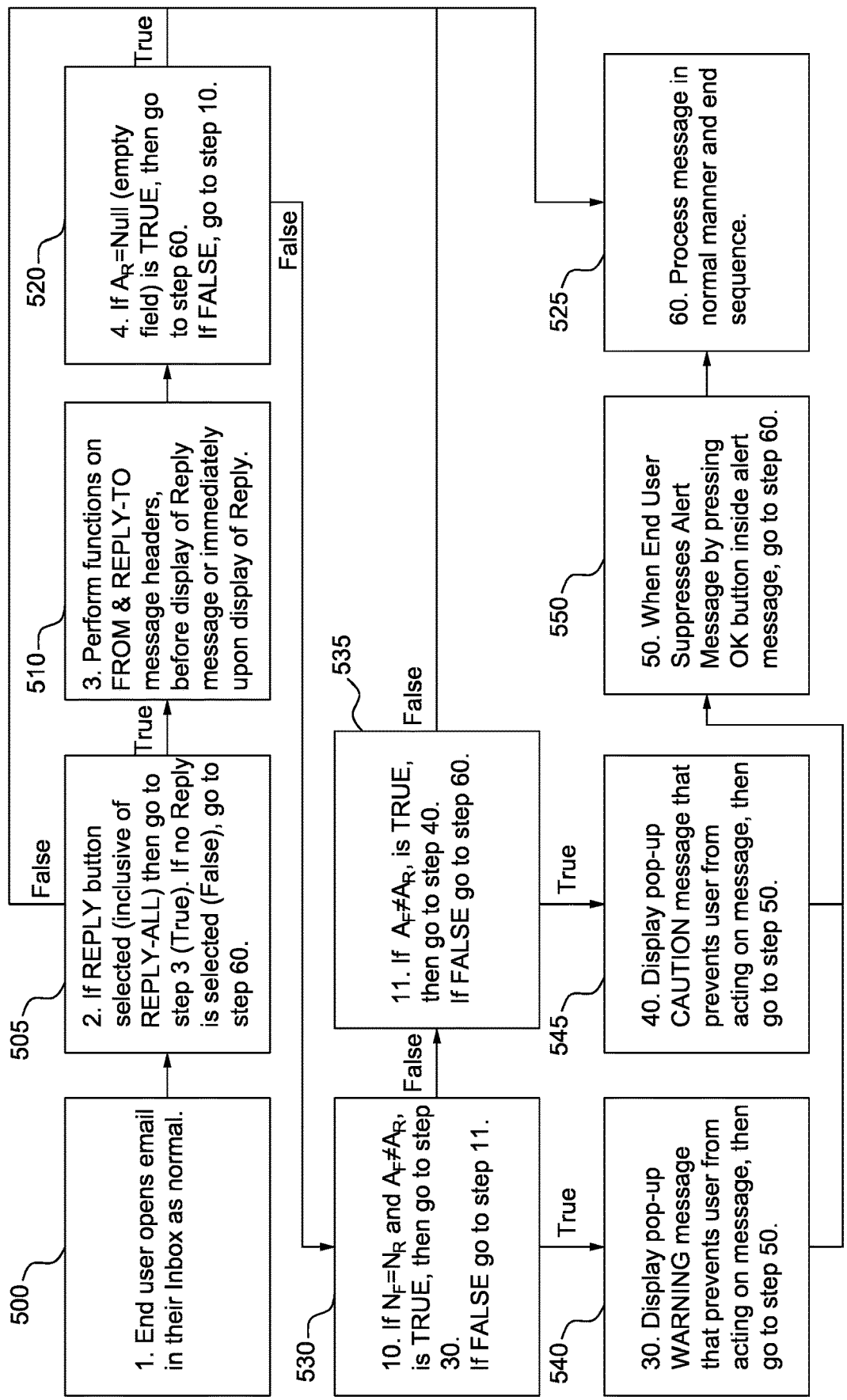
FIG. 12 is a flow diagram of an embodiment of the disclosure having a trigger being selecting a REPLY or REPLY-ALL buttons in an email user interface and having two levels of actions.

FIG. 12 is a flow chart illustrating an alternative to an embodiment of the disclosure described above that are directed to when a recipient activates the "Reply" or "Reply All" function of his or her email client upon opening a received email.

In box 500, the End user opens an email in their Inbox as normal. If the Reply button or Reply-All button is selected by the recipient in box 505, then the software commands embodying the second embodiment of disclosure are applied in box 510 to the FROM and REPLY-TO message headers, before display of a Reply message or immediately upon display of Reply message. If the recipient does not desire to send a reply, then the email is processed in the normal manner sequence in box 525.

If the Reply or Reply-All buttons are activated, the process determines if the Reply-To email header "Email Address" is empty in box 520. If the result of the logic is true, the process terminates and the message is processed in the normal manner and sequence. If the result of the logic is false, the process compares, in box 530, to determine if the contents of the From email header "Friend Name" is equal to the contents of the Reply-To email header "Friendly Name" and if the contents of the From email header "Email Address" is not equal to the contents of the Reply-To email header "email Address", and if the logic is false, then the process determines whether the contents of the From email header "Email Address" is not equal to the contents of the Reply-To email header "Email Address" in box 535; and if that logic is false, the process terminates and the message is process in a normal manner and sequence in box 525. If the logic in box 535 is true, the process displays a Caution message that prevents the recipient from acting on the message in box 545. The Caution message may include an "OK" button, which, when activated by the recipient, causes the process to branch to box 550 where the Caution message is suppressed, terminates the process, and then processes the message in a normal manner and sequence in box 525.

Returning now to box 530, if the logic of the comparison in box 530 is true, that is, that the contents of the From email header "Friend Name" is equal to the contents of the Reply-To email header "Friendly Name" and if the contents of the From email header "Email Address" is not equal to the contents of the Reply-To email header "email Address", the process branches to box 540. In box 540, the process displays a Warning message that prevents the recipient from acting on the message. As above, the Warning message may include an "OK" button, which, when activated by the recipient, causes the process to branch to box 550 where the Warning message is suppressed, terminates the process, and then processes the message in a normal manner and sequence in box 525.

The text of the Whaling Alert messages discussed above can be configured in a configuration file associated with the programming commands of the various embodiments of the disclosure, thus allowing the alert messages to be adapted to a particular use or client requirement. For example, the text of Warning Alert Message for Whaling Alert Replies as described in box 540 may be: "Warning: Your reply email will be routed to someone other than the displayed email sender. This will very likely cause your message to be routed to an unknown third party that may have malicious intent. We strongly recommend that you investigate further before replying, call the person in the "from" address field to verify if they sent the original message, and notify your IT administrator that you may be the victim of a "Whaling" class of Phishing attack. Click OK to continue."

Similarly, the text of the Caution Alert described in box 545 may be: "Caution: Your reply email will be routed to someone other than the displayed original email sender. This could cause your message to be routed to an unknown third party. You should verify if the person in the "from" address in fact sent you the original message. If you proceed with your reply, do so with caution. Click OK to continue."

In an embodiment of the disclosure, the text of the messages may be established through a user interface such as, for example, providing a TAB on the user interface, which, when opened by a user, displays an option with a checkbox named, for example, "Anti-Whaling Phishing Alerts". The option may set ON by default, or it may add a further option for adding a customized alert message.

Figure 13:
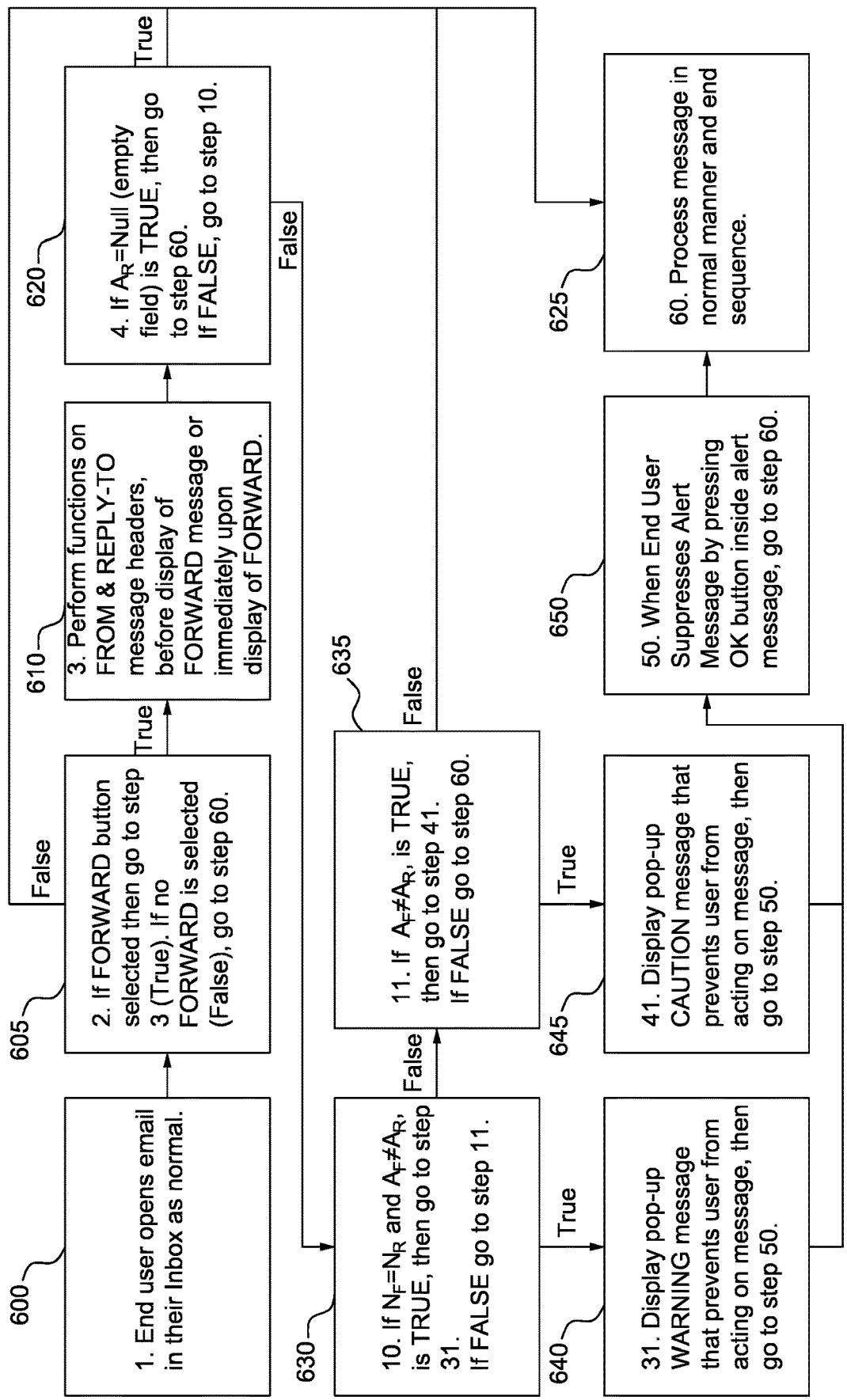
FIG. 13 is a flow diagram of an embodiment of the disclosure having a trigger being selecting the FORWARD button in the email user interface and having two levels of actions.

FIG. 13 is a flow chart illustrating an alternative to an embodiment of the disclosure described above that are directed to when a recipient activates the "Forward" function of his or her email client upon opening a received email.

In box 600, the End user opens an email in their Inbox as normal. If the Forward button is selected by the recipient in box 605, then the software commands embodying the second embodiment of disclosure are applied in box 610 to the FROM and REPLY-TO message headers, before display of a Forward message or immediately upon display of a Forward message. If the recipient does not desire to forward the message in box 605, then the email is processed in the normal manner sequence in box 625.

If the Forward button is activated, the process determines if the Reply-To email header "Email Address" is empty in box 620. If the result of the logic is true, the process terminates and the message is processed in the normal manner and sequence in box 625. If the result of the logic is false, the process tests, in box 630, to determine if the contents of the From email header "Friend Name" is equal to the contents of the Reply-To email header "Friendly Name" and if the contents of the From email header "Email Address" is not equal to the contents of the Reply-To email header "email Address", and if the logic is false, then the process determines whether the contents of the From email header "Email Address" is not equal to the contents of the Reply-To email header "Email Address" in box 635; and if that logic is false, the process terminates and the message is process in a normal manner and sequence in box 625. If the logic in box 635 is true, the process displays a Caution message that prevents the recipient from acting on the message in box 645. The Caution message may include an "OK" button, which, when activated by the recipient, causes the process to branch to box 650 where the Caution message is suppressed, terminates the process, and then processes the message in a normal manner and sequence in box 625.

Returning now to box 630, if the logic of the comparison in box 630 is true, that is, that the contents of the From email header "Friend Name" is equal to the contents of the Reply-To email header "Friendly Name" and if the contents of the From email header "Email Address" is not equal to the contents of the Reply-To email header "email Address", the process branches to box 640. In box 640, the process displays a Warning message that prevents the recipient from acting on the message. As above, the Warning message may include an "OK" button, which, when activated by the recipient, causes the process to branch to box 650 where the Warning message is suppressed, terminates the process, and then processes the message in a normal manner and sequence in box 625.

Similar to the Reply case discussed above, the text of the Whaling Alert messages used in the Forward case can be configured in a configuration file associated with the programming commands of the various embodiments of the disclosure, thus allowing the alert messages to be adapted to a particular use or client requirement. For example, the text of the Warning Alert Message for Whaling Alert Forwards may be: "Warning: You are forwarding an email that was likely not sent from the sender whose name appears in the "from" field. This will very likely cause the recipient of your forwarded message to erroneously think that the message you are forwarding is authentic and from the named sender, when in fact it is likely not an authentic email. We strongly recommend that you investigate further before forwarding this message, call the person in the "from" address field to verify if they sent the original message, and notify your IT administrator that you may be the victim of a "Whaling" class of Phishing attack. Click OK to continue."

Similarly, the text of the Caution Alert Message for Whaling Alert Forwards may be: "Caution: You are forwarding an email that may not have been sent from the sender whose name appears in the "from" field. This may cause the recipient of your forwarded message to erroneously think that the message you are forwarding is authentic and from the named sender, when in fact it may not be an authentic email. You should verify if the person in the "from" address in fact sent you the original message. If you proceed with your reply, do so with caution. Click OK to continue."

Figure 14:
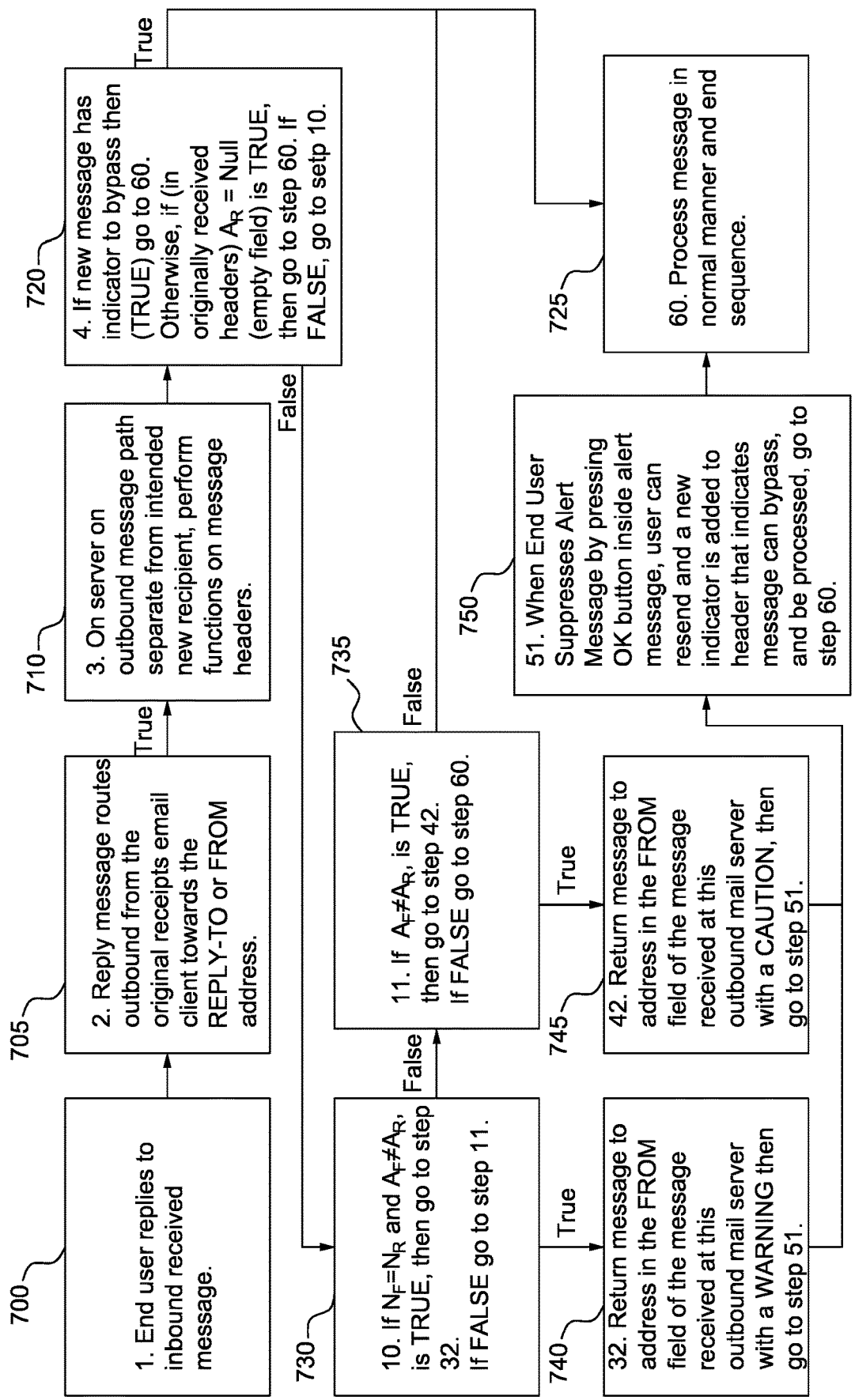
FIG. 14: is a flow diagram of an embodiment of the disclosure having a trigger being a review and parsing of headers of originally received inbound messages on an outbound message path toward the originally received reply-to message header address, on a server separate from the reply-to recipient.

FIG. 14 is a flow chart illustrating an embodiment of the disclosure having a trigger being a review and parsing of headers of originally received inbound messages on an outbound message path toward the originally received Reply-To message header address, on a server separate from the reply-to recipient.

In box 700, the End user replies to an inbound email received in their Inbox. The reply message routes outbound from the original recipient's email towards the Reply-To or From address in box 705. When the reply message is received by a server that is remote from the recipient of the reply message, the server, utilizing programming commands embodying various embodiments of the disclosure, analyzes the message headers in box 710. If the reply message possess a unique BYPASS indicator known to have been applied by an authorized outbound processing server, the receiving server understands that the BYPASS indicator was applied by the recipient to instruct the receiving server to bypass further review of the message due to the target recipient (who sent the reply) overriding a previously issued alert associated with the message in box 720, and the process then branches to box 725, where the message is processed in a normal manner and sequence and transmitted on to the intended recipient of the reply. Alternately if the If the Reply-To email header "Email Address" is empty in box 720, the process then branches to box 725, where the message is processed in a normal manner and sequence and transmitted on to the intended recipient of the reply.

If the result of the logic in box 720 is false, the process determines, in box 730, if the contents of the From email header "Friend Name" is equal to the contents of the Reply-To email header "Friendly Name" and if the contents of the From email header "Email Address" is not equal to the contents of the Reply-To email header "email Address", then the process determines whether the contents of the From email header "Email Address" is not equal to the contents of the Reply-To email header "Email Address" in box 735; and if that logic is false, the process terminates and the message is process in a normal manner and sequence in box 725.

If the logic in box 735 is true, the process returns the message to the address in the From field of the message received at the server, with a Caution message in box 745. The Caution message may include an "OK" button, which, when activated by the recipient, causes the process to branch to box 750 where the Caution message is suppressed, the user may resend the message and a new indicator is added to the header of the outgoing message indicating that message can bypass further review, and then processes the message in a normal manner and sequence in box 725.

Returning now to box 730, if the logic of the comparison in box 730 is true, that is, that the contents of the From email header "Friend Name" is equal to the contents of the Reply-To email header "Friendly Name" and if the contents of the From email header "Email Address" is not equal to the contents of the Reply-To email header "email Address", the process branches to box 740. In box 740, the process returns the message to the address in the From field of the message received at the server, and may include a Warning alert message with the returned message. When the returned message is displayed to the sender of the Reply message, the Warning message may also include an "OK" button, which, when activated by the recipient in box 750, suppressing the message. The user may then resend the message and a new indicator is added to the header of the outgoing message indicating that message can bypass further review, and then processes the message in a normal manner and sequence in box 725.

Figure 15:
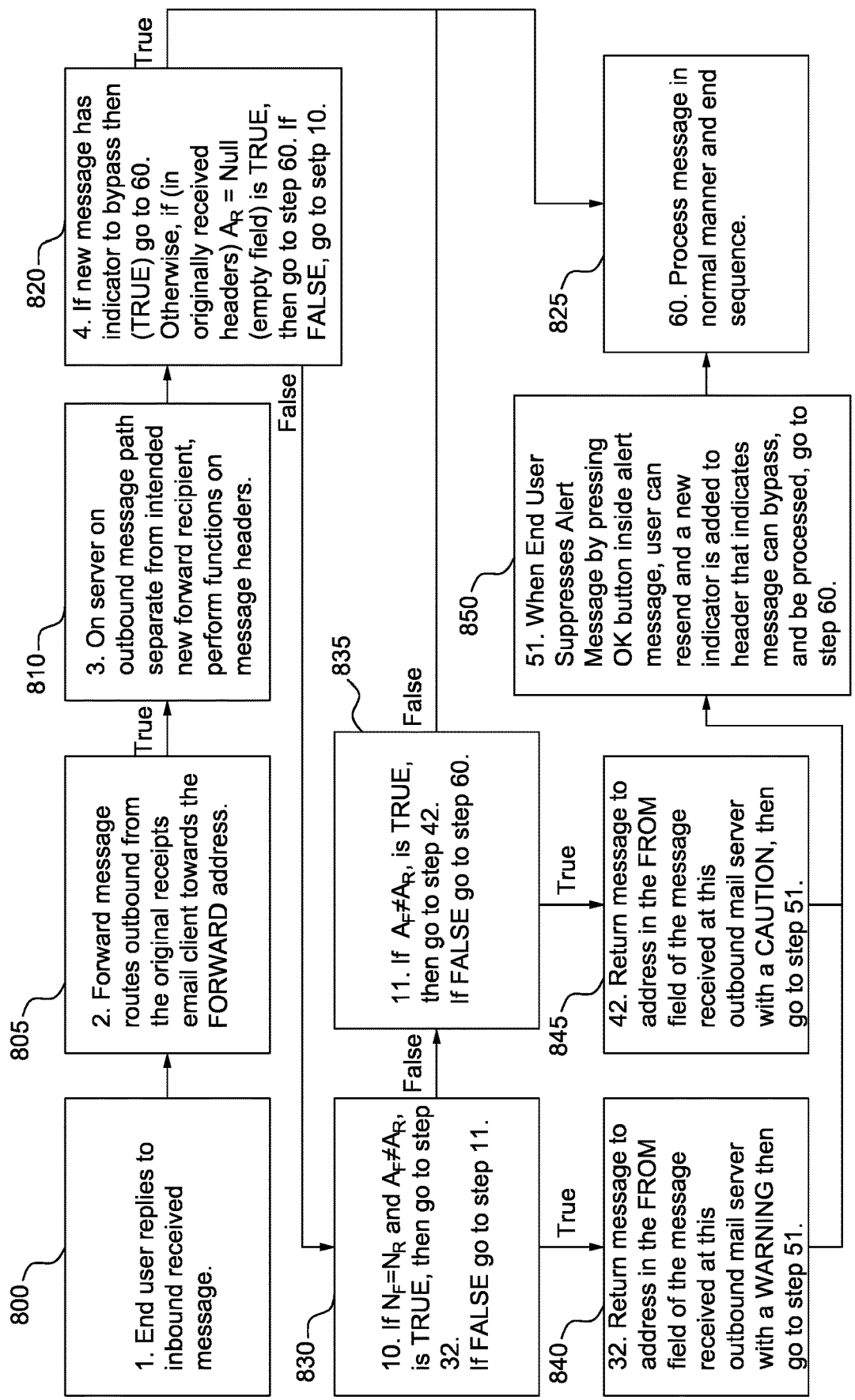
FIG. 15 is a flow diagram of an embodiment of the disclosure having a trigger being a review and parsing of headers of originally received inbound messages after forward on the outbound message path toward the forward recipient on a server separate from the forward recipient.

FIG. 15 is a flow chart illustrating an embodiment of the disclosure having a trigger being a review and parsing of headers of originally received inbound messages after forwarding the message on an outbound message path toward a forward recipient, on a server separate from the forward recipient.

In box 800, the End user replies to an inbound email received in their Inbox. The end user then forwards the message on routes outbound from the original recipient's email towards the Forward address in box 805. When the reply message is received by a server that is remote from the recipient of the forward message, the server, utilizing programming commands embodying various embodiments of the disclosure, analyzes the message headers in box 810. If the forward message possess a unique BYPASS indicator known to have been applied by an authorized outbound processing server, the receiving server understands that the BYPASS indicator was applied by the recipient to instruct the receiving server to bypass further review of the message due to the target recipient (who sent the reply) overriding a previously issued alert associated with the message in box 820, and the process then branches to box 825, where the message is processed in a normal manner and sequence and forwarded on to the intended recipient of the forwarded message. Alternately if the If the Reply-To email header "Email Address" is empty in box 820, the process then branches to box 825, where the message is processed in a normal manner and sequence and transmitted on to the intended recipient of the forwarded message.

If the result of the logic in box 820 is false, the process determines, in box 830, if the contents of the From email header "Friend Name" is equal to the contents of the Reply-To email header "Friendly Name" and if the contents of the From email header "Email Address" is not equal to the contents of the Reply-To email header "email Address", then the process determines whether the contents of the From email header "Email Address" is not equal to the contents of the Reply-To email header "Email Address" in box 835; and if that logic is false, the process terminates and the message is process in a normal manner and sequence in box 825.

If the logic in box 835 is true, the process returns the message to the address in the From field of the message received at the server, with a Caution message in box 845. The Caution message may include an "OK" button, which, when activated by the recipient, causes the process to branch to box 850 where the Caution message is suppressed, the user may resend the message and a new indicator is added to the header of the outgoing message indicating that message can bypass further review, and then processes the message in a normal manner and sequence in box 825.

Returning now to box 830, if the logic of the comparison in box 830 is true, that is, that the contents of the From email header "Friend Name" is equal to the contents of the Reply-To email header "Friendly Name" and if the contents of the From email header "Email Address" is not equal to the contents of the Reply-To email header "email Address", the process branches to box 840. In box 840, the process returns the message to the address in the From field of the message received at the server, and may include a Warning alert message with the returned message. When the returned message is displayed to the sender of the forwarded message, the Warning message may also include an "OK" button, which, when activated by the recipient in box 850, suppressing the message. The user may then resend the message and a new indicator is added to the header of the outgoing message indicating that message can bypass further review, and then processes the message in a normal manner and sequence in box 825.

In an embodiment of the present disclosure, a recipient maintains an exception list of From email addresses or Sender email addresses that, when detected by the analysis function of the various embodiments, would cause the programming commands of the embodiment to, depending on how the embodiment is configured, bypass the process or, alternatively, invoke the process yet cause the alert (whether Caution or Warning) to be overridden. In such a case, the alert or full processing would only occur on select inbound messages such as when the From or Sender email address was in the exception list. Conversely, the process may be configured to only process messages where the From or Sender email address was not contained in the exception list.

One objective of the system is to provide intimation to the user while replying or sending an email to an impostor/attacker/phisher who behaves/acts like a genuine/known person.

Typically, when an email is received by a trusted party, most of the time people respond to the email without verifying the email recipient and sometimes users forget to read the detailed address of the email address from when the address auto-populates in the TO field after typing the first few characters of the address for their email. Hence the user can send an email or react to the email and respond to the email without understanding the risk. Once the user clicks the send/reply button then there is no rollback process and this send can initiate the process for an email impostor to lure the sender into a back-and-forth email exchange that ends in an email compromise (financial loss) or it may cause the sender to send sensitive information embarrassingly or out of compliance, to an unintended recipient.

To avoid this problem, if unknowingly/mistakenly the user clicks the send button, or the reply button, or the reply button and then after composing the email the send button—but in all cases, the analysis should occur before the message sends (has the transmission initiated). Using the various embodiments of the disclosure, the system will check for the recipient details in a database which may consist of different databases with details like "Sensitive" Rule Database, Address Recency Database, Risk Rule Database, and Scoring Database.

The Sensitive Rule Database consists of the content or other indicators that are in the message that would deem that content to be sensitive in nature and should be transmitted with care (encrypted, with proof of delivery, email tracking, and the like).

The Address Recency Database consists of details about when the email recipient email address was last re-verified as a correct and acceptable email address to send sensitive content to. It can be set to retain the addresses that have been re-verified to send sensitive content for a duration such as 365 days, 180 days, 90 days (default), 30 days, 15 days, and No days, before the address drops out of the Recency Database.

The Risk Rule Database consists of the details of the rules for risk categories, such as if the domain associated with a recipient address is less than 90 days old, tag that domain as high risk and apply rules to color the email address red in a display for the sender.

The Storing Database consists of the details about the address/domain with the risk score based on, for example, pre-defined categories of domains or pre-defined risks for certain domains.

Figure 16:
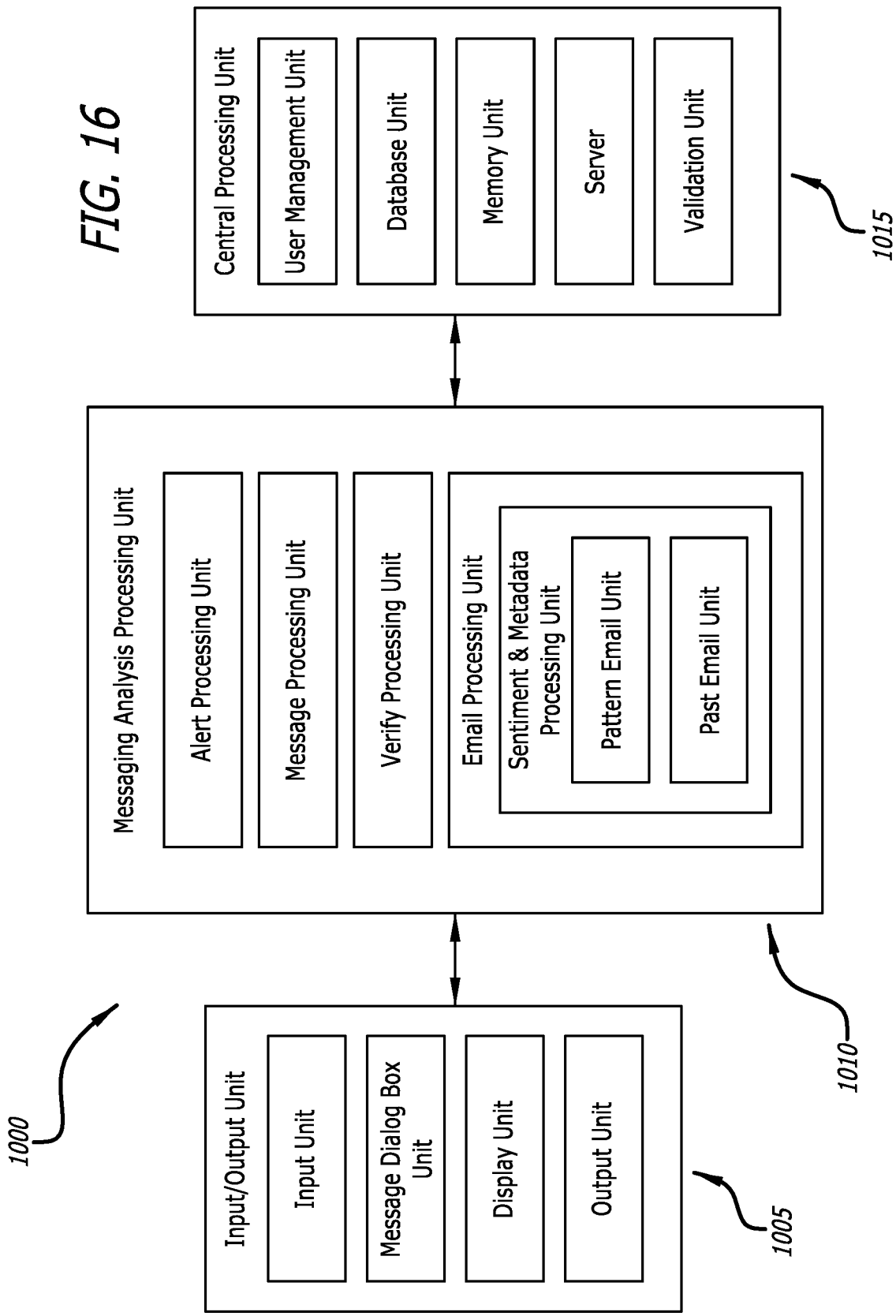
FIG. 16 is a graphical representation of a system incorporating various embodiments of the present disclosure and depicts various components on which the various embodiments of the present disclosure are carried out.

FIG. 16 is a schematic representation of an embodiment of a computer system 1000 running software commands to provide for a sentiment, an impostor email or human error risk analysis of in-coming or out-going messages and user activity that can be used to provide insights into the sentiment of the originator of the message underlying the content of the message. This exemplary system includes an input/output unit 1005, a messaging analysis processing unit 1010, and a central processing unit 1015. As will be set forth in more detail, it will be understood that each of the individual components of these units includes hardware and software, and is programmed using software commands, to carry out the functions of these units. Additionally, these units may be part of a centralized or network system or server, or they may be part of a remote system that is in communication with a centralized server or network system. Alternatively, one or more of the units may be present in a remote (or client) computer or system which is in communication with a centralized server or network system. The embodiments may include all of the parts or some of these components, or similar components.

As understood by a person of ordinary skill in the art, input/output unit 1005 includes an input unit, such as, for example, a keyboard or other input device; a message dialog unit which can be used to provide alerts or other messages to a user of the system, a display unit, such as a display screen or other device, and an output unit for transmitting any information inputted into the input unit to messaging analysis processing unit 1010.

The messaging analysis processing unit 1010 in one embodiment of the disclosure may include, but is not limited, to an alert processing unit, a message processing unit, a unit for verifying processing. Unit 1010 may also include a sentiment and metadata processing unit which may include an email pattern analysis unit and/or a past email analysis unit.

The central processing unit 1015 may include a user management unit, a database unit, a memory unit, a server, and a validation unit. The function of each of these units will be immediately understood by one of ordinary skill, and consistent with the description set forth above in relation to FIGS. 10 and 11. The function of each of these units may be installed to run within a messaging application on a computer, for example, with functions programmed to run (Messaging Analysis Processing Unit) run inside a Microsoft Outlook program using computing resources (Input/Output Unit and Central Processing Unit) of the computer.

In one embodiment of a sentiment analysis system, the system is programmed to provide real-time, in-the-moment analyses based on past activity of the user that has been recorded, and coupled by external data and presenting this information immediately after, or slightly afterward, sending a message, including providing an alert, or transforming a message in the timespan after the send email button is pressed, before the message leaves the messaging program to send the message to a recipient. Such real-time insights may be used to trigger an action or insight in the flow of a message composition, sending, receiving, or replying process.

While there are prior methods of using programs to scrape content from websites to glean information, such as, for example, the age of a domain, these various embodiments of this disclosure provide solutions to the formidable challenge of performing this external data automated capture and combining it with internal automated data analysis to generate an action visible to a user, all within a split second "in-the-moment-of-sending," which may be defined as the user acceptable time from the time a user clicks a send button in an email program to the time the email program conducts the send process which closes the compose pane and puts the message in the outbox for sending.

To accomplish this split-second data gathering, analysis, and action functions, the disclosure includes embodiments that are programmed to manage elements external to the system that are out of the control of the system. Such external elements can cause delays that need to be handled by the system to ensure the processing time "in-the-moment-of-sending" remains at a maximum, a split second.

For example, one example of a technical process of the system is to perform a telnet query to the WhoIs servers. Such process, as disclosed herein, must manage the variation of WhoIs server response content, response context, time delays to receive query responses, limitation of queries from a single originating IP address. In another example, the technical process of the system is set to adapt to limit the frequency of queries based on learning of past "re-verification" behavior of the sender or to remove duplication of queries based on repetition of identical domains in addresses of multiple recipients in the same message send process.

The embodiments of the system must programmatically consider the query process, manage for external anomalies among how the various WhoIs servers respond in different regions and by different top-level domain, and adapt to the system to ensure that the result is an action delivered to the user in within a timeframe "in-the-moment-of-sending" that is at a maximum time level, generally, that maximum user acceptable time span from clicking "Send" to analysis completion is a split second. Anything longer will cause use anxiety and likely lead to uninstall of the software functions or disabling of the features, function, or service.

Similar "in-the-moment-of-sending" maximum time (a split second) considerations apply when the system incorporates additional checks, including to identify if the message is a sensitive message, contains emotionally identified words (sentiment score) and other factors. The combination of all of programs related to these elements and for some of the elements, the multitudes of recipient addresses that must be verified for messages with multiple addressees, must be all completed "in-the-moment-of-sending" with a maximum combined time limit (a split second) consideration.

Figure 17:
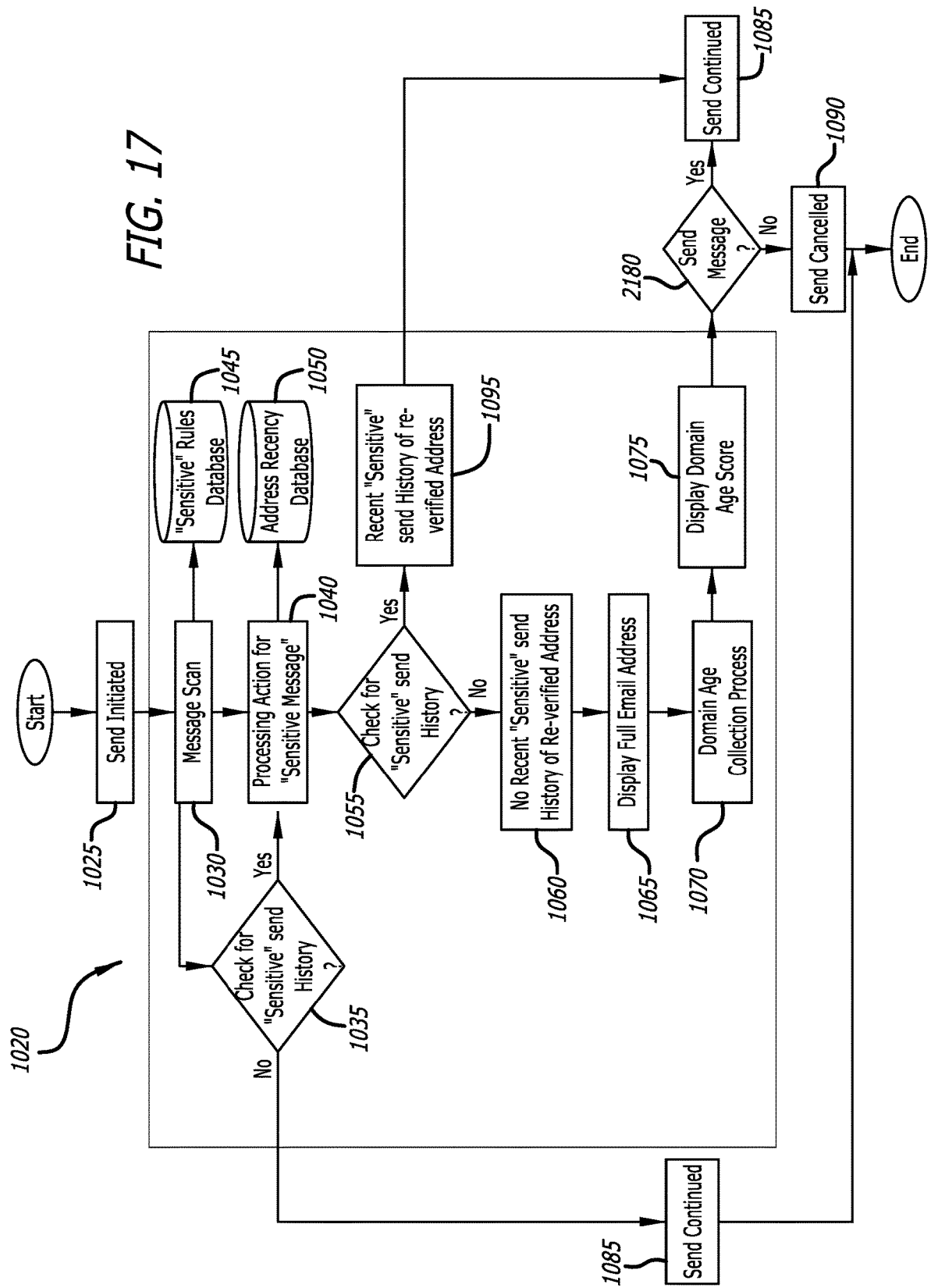
FIG. 17 is a flow diagram of an embodiment of the disclosure that provides for in-the-moment analysis of the risk of sending an electronic message, replying to an electronic message, or forwarding a received electronic message.

FIG. 17 is a diagrammatical illustration of an embodiment of a message risk analysis process 1020 in accordance with the present disclosure. The illustrated embodiment provides a means for a sender to "double check", "re-verify" that he or she is sending an email to an intended recipient, and not an email imposter or an auto-populated email address that looks similar to the intended recipient, but is not the address of the intended recipient.

In this embodiment, after the SEND button is clicked in box 1025 and before the email is sent, a program, in box 1030, scans the subject, message body, message headers, sender and/or recipient address information of the particular email, and/or past message traffic patterns associated between the sender and recipient or from the sender to any recipient, and/or past sentiment from message between the sender and recipient or from the sender to any recipient past sentiment of the past messages as compared or scored against the sentiment of the current message from the sender or between sender and the recipients ("Email Sentiment and Metadata") and triggers, box 1035, if the message is considered to relate to sensitive information, an action based on stored rules associated with patterns Email Sentiment and Metadata or comparisons between past Email Sentiment and Metadata (that is, for example, history). That action is taken, for example, if the Email Sentiment and Metadata indicates the email message is related to a financial transaction, to send a message encrypted with an option for the recipient to reply encrypted; if the Email Sentiment and Metadata indicates the email message is related to an invoice, to send the message with a method of sender authentication and invoice attachment validation. The process of box 1035 may access rules from a sensitive rules database (box 1045) or an address recency database (box 1050) to identify whether the proposed message contains sensitive information and if so, should have an action applied to it (box 1040).

In box 1055, the process checks to see if the sender has a history of sending sensitive messages to the specific recipients (or any of the recipients if there are multiple) of the current message. If the sender has not sent an email with content that is considered sensitive content (sensitive enough to call for sending it encrypted or to invoke a special action on the email message) in the recent past (recency being configurable) to the specific recipients (or any of the recipients if there are multiple) of the current message, then the program branches to box 1060 and presents, in box 1065, a message dialog pop-up to the sender before the transmission, which displays the entire email address of the recipient in a way that makes it easier for the sender to see, such as, for example, using color indicators to show risk, for example, but not limited to, that the message is about to be sent to someone with the same first name as the intended recipient but different last name and email address (thus accidentally about to send the email to a similar looking email recipient but not the intended recipient) or that the sensitive message is about to be sent to a free email service email address, thus providing the sender with a pause before the message is transmitted so that the sender may see if he or she is sending to an auto-completed email address of a similar name that is not the intended recipient, and/or re-verify that the address is correct.

As will be described in more detail below, the process may then continue to box 1070 where the age of the domain to which the message being sent to can be determined, and then to box 1075 where a score associated with the age of the domain can be displayed to the sender. At this point, the process may query the sender in box 1080 as to whether the sender continues to wish to send the message to the recipient, and if the sender indicates that the message should be sent, the process branches to box 1085 and the message is sent.

If the sender indicates that he or she does not wish to send the message, the process branches to box 1090, and the send action is cancelled.

Referring again to box 1055, if the sender does have a history of sending sensitive messages to the specific recipients (or any of the recipients if there are multiple) of the current message, as determined from the data stored in box 1035, the process branches to box 1085 to send the message.

Further, in an embodiment, the processor that creates the displays of the entire email address in a way that makes it easier for the sender to see, with color indicators to show risk, can include addition data to score risk, one being data related to the age of the domain of each recipient address. This program checks external sources for information on the age of the recipient domains and internal programmed sources related to domains to have known risk, to provide In-the-moment Insights about the age of the domain of each recipient destination address, understanding that if a sender knows that the business they are communicating with has been around for many years and this recipient email address domain age verification indicates that the recipient's domain has only been around for, for example, 90 days or less (domain age of 90 days or less), then the process may indicate or provide an alert by displaying that recipient address in red and provide an indication to the sender that they should re-verify the address that they are about to transmit the message to before transmission.

The program that provides the dialog and recipient risk score may be set in an embodiment to remember which addresses have been re-verified and alter the future risk score for that recipient based on the frequency of affirmative (continued to send) verifications with that recipient, cancels (send process terminated) verifications with that recipient and/or recency of last verification or cancelation, or via pre-set addresses that are known to have been listed in a database of verified recipient destinations or domains (for example, a domain of a recipient that matches the sender domain).

The above embodiment could be associated with other dialog messages other than recipient verification or could be invoked at other points of the send email processes, such as, based on the Email Sentiment and Metadata, the program could invoke an analysis after the receiver of an email clicks a reply or forward button or otherwise a reply or forward is invoked, or an auto-reply, and could assess the Email Sentiment and Metadata to assess whether the message is likely a message from an email impostor (a Business Email Compromise email), a phishing email, a marketing email, or other category, and display a dialog with a message related to the category of message determined, the dialog informing the message replier or forwarder before they compose their reply or forward message of the category of message that they are about to reply to (for example, phishing email, impostor email, marketing solicitation), so they can continue or terminate their reply or forward; and/or the program may automatically terminate a reply or forward, or an autoreply based on conditions. For example, if an out-of-office auto-reply is enabled and there is an inbound email set to trigger the out-of-office auto-reply, the auto-replying system could determine based on Email Sentiment and Metadata of the inbound message that the inbound message is a marketing message and suppress the out-of-office reply information or alter the content of the out-of-office reply for that particular inbound message.

The embodiments of the present disclosure may be considered to occur in two sub-processes, namely (1) the programmatic decision based on Email Sentiment and Metadata to pause the send process and display the recipient addresses for re-verification ("Recipient Address Display"); and (2) the programmatic process of capturing additional stored data or externally sourced data to display a dynamically determined and then displayed risk score associated with each recipient domain of the not-yet-sent message ("Recipient Risk Scoring").

As shown in FIG. 17, box 1040 queries a box 1050, which is a database titled address recency database which is a store for a copy of the recipient addresses associated with the deemed to be sensitive email (based on the above actions for example) in which the message was re-verified and sent; save the list of recipient addresses and the associated domains in a base-64 text file on the local machine in the local application folder or in a database on a machine remote from the sender. The list of saved addresses and domains stored for a configurable rolling period of time to indicate Address Recency of adding to the database, or to determine whether added as a permanently verified and safe recipient domain, with indicators of age of the addition of the address and domain to the database or text file. This "Address Recency" list is a list of recently re-verified good, or low risk scored, recipient email addresses or domains. Depending on whether the address of the intended recipient is contained in the recency database, the process will take different actions, as will be described below.

In various embodiments of the present disclosure, the sender device may have a programmed process to check the top level domain (TLD) of an unverified recipient(s) email address domain to see if the TLD is in pre-defined lists of Popular, Abused, and Inaccessible TLD that are stored in a table in the program or at a database on a server separate from the sender. If the TLD is in the Popular stored list, then the WhoIs server associated with that TLD is also stored in the table. If the TLD is in the stored Abused list, then the WhoIs server associated with that TLD is also stored in the table ("Predefined TLD Lists"). These predefined TLD lists may be updated using various methods through remote communications, updating a remote database, or updating the file with the stored table on the device. Another analysis that may be carried out is to determine the relative risk of the recipient email address based on the intended recipient's domain, from which a determination can be made regarding whether the TLD is one of the popular or abusive TLD stored in the pre-defined TLD lists.

After a sender initiates the email send or reply process, for example after clicking the send button, the program initiates and first assesses whether the recipient addressees or domains of the newly composed or replied to email are on the Address Recency list or the Domain Recency list ("Recency List").

If the recipient addresses are NOT on the Recency List then, then the software program begins a recipient risk scoring based on the domain age. This additional recipient risk scoring process, for example, assesses and displays the age of the recipient address domain with an applied risk score or risk color based on the recipient address domain age, by programmatically invoking the processes illustrated in FIG. 18.

Figure 18:
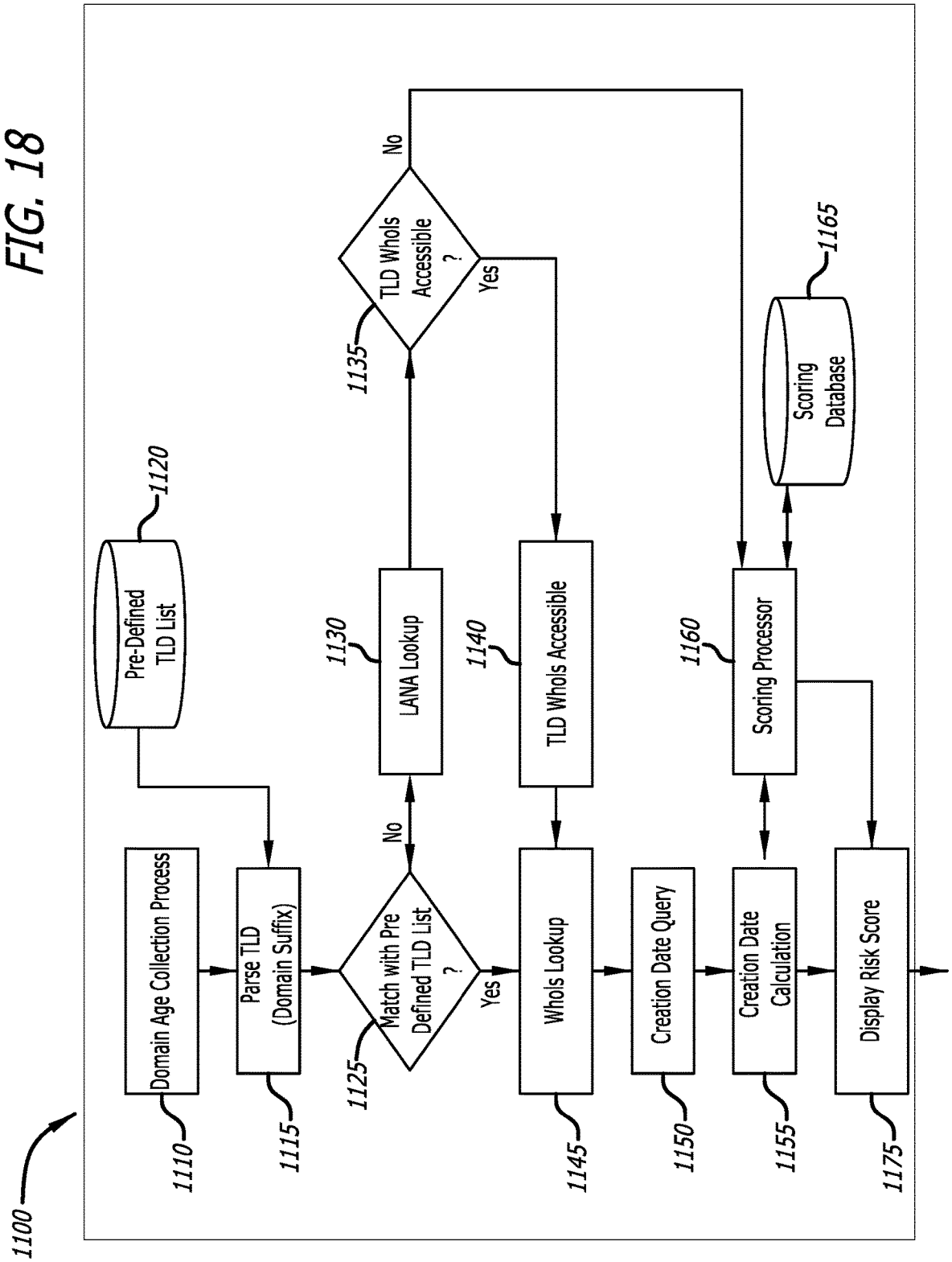
FIG. 18 is a flow diagram of part of the embodiment of the system of FIG. 17.

FIG. 18 is a schematic illustration of an embodiment 1100 of the present disclosure that provides for determining the age of the domain 1110 of an intended recipient of the message. For each recipient address of the message that is parsed from the message in box 1115, the process first determines, in box 1125, if the top level domain (domain suffix) is on a Pre-defined TLD List. If not, then the software branches to box 1130 and queries the IANA WhoIs server associated with the TLD in the Predefined TLD List to recursively look up the WhoIs server for the TLD associated with the recipient.

Where the recipient address of the message is not on the Predefined TLD List, a technical challenge is not knowing the WhoIs server for that TLD. A process is then invoked to look up the domain registrar for that TLD in the IANA database by programmatically following the path from IANA to the TLD to the registrar on the IANA website and then parsing the registrar records listed on that website to find the WhoIs server for the TLD. If the process cannot determine the WhoIs server for a TLD (for example, the ".bm" (Bermuda) TLD or the WhoIs service is inaccessible after a process attempts to determine the WhoIs server, that TLD is added to the Predefined TLD List within the category of "Inaccessible".

After the TLD for the previously unknown recipient domain is determined programmatically via the abovementioned IANA website scraping process, the Predefined TLD List is updated to add the known information in box 1135 (for example, WhoIs server if available) for the previously unknown TLD in one of the three categories, Popular, Abused, Inaccessible.

Once the Whois server for each TLD for each of the recipients of the message has been identified, the program then records, (i) for TLDs listed in the Predefined TLD List in the Abused TLD category (for example ".tw"), the program records that the Risk Score for that recipient shall be as predefined for that type of TLD, and for example, show the address with an "alarm" displaying the address with the domain in red, and showing the domain age as "unknown".

(ii) for TLDs listed in the Predefined TLD List in the Inaccessible TLD category (for example ".bm"), the program records that the Risk Score for that recipient shall be as predefined for that type of TLD, and for example, show the address with an "alarm" displaying the address with the domain in yellow, and showing the domain age as "unknown". It should be noted that a sender or sender organization may choose to alter the Risk Score setting display or terminology for the Abused or Inaccessible categories.

(iii) A further test is conducted for Abused and Inaccessible TLDs which overrides the abovementioned risk factors. The sender, sending organization or administrator may build a trusted domain age list. If for example the sender frequently communicates with recipients with the address domain gov.bm, sender, sending organization or administrator may add fixed domain age for that domain as "10+ years" and a Risk Score of Zero (no color) which would then be a fixed domain age for addresses with those domains.

(iv) Once the TLD WhoIs servers are programmatically determined (or determined to not be searchable or need to be searched considering the above scenarios), the program queries each of the WhoIs servers for Domain Creation data in box 1145 for each of the remaining domains associated with each recipient address of the message. The program includes a WhoIs server Query Translator which translates the text information returned from the WhoIs server site upon the domain query 1150 into a uniform text table format. For example, if the query line that starts with "Creation Date:" or other variation of the date about when the domain was first registered, the program parses the text after the creation date indicator to retrieve the date the domain was created. The TLD is in our list of "Popular" TLD's and we know the WhoIs server for the TLD. The Query Translator searches for key words in the WhoIs server query display and translates them into a standard format (as noted below). Variations of text for "Creation Date:" returned by querying WhoIs databases and checking for other translations for this query display in a hierarchical approach a series of key words that are associated with the query for Domain Creation Date:

Creation Date:
Created:
Created On:
Domain Create Date:
Registered:
Registration Date:

The program scrapes the content from the external WhoIs web page surrounding the key words for the date and takes the text line for the creation date and removes the text from the start of the line to the end of the "creation date:" text, and then removes all whitespace (spaces and tab characters) at the beginning and end of the text line, leaving the date as text that is put into a DateTime value.

(v) The program then calculates the days since the domain registration date, formatted as months or years, in box 1155, and scores information related to the creation date of the domain or email address in a scoring processor 1160.

(vi) In box 1160, the processor accesses data from the scoring database 1165 and the processor then assigns a risk score and risk display based on the number of days since domain creation in box 1175. For example: if days since domain creation is 0-90 days, the risk score is High, and a risk color display of the address is displayed to the sender in Red; If days since domain creation is 91-365 days, the risk score may be designated as Medium, the risk color display of the address may be in Yellow. If days since domain creation is >365 days, the risk score may be designated as low and no risk color will be assigned, and an "OK" indicator may be added. If days since domain creation is predefined by the sender, the sender's organization or administrator (as with the abovementioned gov.bm example), the risk score is as pre-defined, the risk color is as pre-defined.

Moreover, if the TLD is in the Abuse category in the Predefined TLD list and does not have pre-defined alternate domain age, the risk score may be designated as High, and the risk color display of the address may be Red. If the TLD is in the Inaccessible category in the Predefined TLD list and does not have a pre-defined alternate domain age, the risk score may be designated as Medium, and the risk color display of the address may be Yellow. Of course, other colors and text identifying the risk categories may be used without departing from the intent of the present disclosure.

In some embodiments, the program may display to the sender in the moment of sending (before transmission) and may also generate a repository report for the sender organization and administrator, the information related to the age of the domain of each recipient, the risk score, and risk color or other risk alert information, providing a real-time indication that the recipient destination address may not be the address that the sender is intending to communicate with (as it may be a newly created address that is created specifically to appear similar to a longtime vendor address).

In some embodiments, it may be necessary to normalize the domain name in cases where the name of a domain and/or a TLD are rendered in Unicode characters. In such a situation, the program converts the Unicode to "Puny code", which is an ASCII encoding of the Unicode characters. This returns to the process an expected character representation in queries to the IANA and TLD WhoIs servers.

For known WhoIS servers, as stored in the Predefined TLD Lists, use of these pre-defined lists speeds the overall processing time as it results in fewer WhoIs lookup calls to the Internet. If the TLD is not listed in the Pre-defined TLD lists, the process performs a look up and categorization of the TLD's and domains not listed in the Predefined TLD Lists. Each list entry in the "PopularTLDs", "OtherTLD's" and "CautionTLDs" Predefined TLD Lists has a TLD name (referred to in the list as a domain) and a WhoIs server URL. Below are some examples stored in the three Predefined TLD Lists This is an example of an entry in the domains List:

---

Domains><PopularTLDs><domain name="com"

whoisServer="whois.crsnic.net"/>

This is an example of an entry in the Popular TLD list:

```
</PopularTLDs><OtherTLDs><domain name="aarp"
whoisServer="whois.nic.aarp"/></OtherTLDs><CautionTLDs><domain
name="tw"
whoisServer="whois.twnic.net.tw"/>
.</CautionTLDs></Domains>
```

In one embodiment, the process uses a TCPClient to connect to the WhoIs server on Port 43 after the program determines the WhoIs server URL, and performs a data send of the domain name being checked for to that TCP connection. The return data is the text from the WhoIs server. This return data is then parsed for the text to find the creation date of the domain.

For example, the return text from a Danish WhoIs server when the program queries the WHOIS server for the "kolonihavejura.dk" domain is as follows:

"# Hello 24.181.195.82. Your session has been logged.\r\n#\r\n# Copyright (c) 2002-2022 by DK Hostmaster A/S\r\n#\r\n# Version: 5.0.1\r\n#\r\n# The data in the DK Whois database is provided by DK Hostmaster A/S\r\n# for information purposes only, and to assist persons in obtaining\r\n# information about or related to a domain name registration record.\r\n# We do not guarantee its accuracy. We will reserve the right to remove\r\n# access for entities abusing the data, without notice.\r\n#\r\n# Any use of this material to target advertising or similar activities\r\n# are explicitly forbidden and will be prosecuted. DK Hostmaster A/S\r\n# requests to be notified of any such activities or suspicions thereof.\r\n\r\nDomain: kolonihavejura.dk\r\nDNS: kolonihavejura.dk\r\nRegistered: 2022-01-26\r\nExpires: 2023-01-25\r\nRegistration period: 1 year\r\nVID: no\r\nDNSSEC: Signed delegation\r\nStatus: Active\r\n\r\nNames servers\r\nHostname: ns1.curanet.dk\r\nHostname: ns2.curanet.dk\r\n"

The process parses the returned text to find one of the many expressions used to denote the creation date. In this example, the text shows that "Registered:" was the creation date term. From this point, the process takes the date text and parses it into a date and then calculates the domain age.

In some cases, as noted above, it may be necessary to use the IANA method lookup when the TLD is not in one of the Predefined TLD Lists (for example, Popular, Other or Caution TLD's). The process may be programmed using software and/or hardware commands to fall back on the IANA method lookup if the process fails to match the TLD to a TLD in the Predefined TLD Lists. If the process receives an error when using a WhoIs server returned by the first method, then the program may then use the IANA lookup method as a fallback if the Predefined TLD List known WhoIs Server method fails for any reason.

A challenge is to ensure that the creation date is the creation date for the domain in the search, and not the creation date for the TLD itself. In such a case, there must be a check for such return data that is an invalid domain age when, for example, a TLD query to the IANA database does not return a WhoIs server and instead returns the age of the TLD, not the domain associated with the TLD. The TLD domain itself must be verified as not being the domain listed in the return data from the query.

In the above example, the return text from a Danish WhoIs server when the program queries the WHOIS server for the "kolonihavejura.dk" domain must include the domain for which information is being sought (for example, kolonihavejura.dk) and not the Domain of the TLD. This check may need to be performed, that the return text associated with the "Domain:" string includes the text of the domain being sought and/or not the text of the TLD domain.

In the IANA lookup method, the process, using appropriate hardware and/or software commands, connects to the IANA server at the URL "whois.iana.org". This is a fixed URL and should never change. If the IANA URL were to change or to be unavailable most or all traffic on the Internet and most or all email would fail to work. The program queries the IANA server for the URL of the WhoIs server for the TLD in question.

Missing IANA WhoIs server information occurs when the data returned from the IANA database for some TLD's does not include information about a WhoIs server. In those cases, the process cannot determine when a domain was created, and the program returns a default age value of "Unknown". Some examples of TLD data reported by IANA that do not provide any WhoIs server information are "PK" (Pakistan), "PH" (Philippines) and "BM" (Bermuda).

After the lookup, the text that comes back from the WhoIs server, as shown in the example above, contains a lot of information as well as various disclaimers. Additionally, the text used to indicate when a domain was created varies from WhoIs server to WhoIs server.

Due to the variation of terms used to identify the creation date of a domain or address, a list of "Creation Date Lookup Terms" may be saved by an embodiment of the processor of the present disclosure as a Base64 encoded text file. For example, such a list of Creation Date Lookup Terms may include, but are not limited to, terms such as "Creation Date:"; "Created:"; "Created Date:"; "Registered:"; "Registration Date:"; "[Creation Date]"; and the like. The Creation Date Lookup Terms list may be dynamic so that additional terms can be added as discovered.

As can be understood by one of ordinary skill in the art, the various embodiments of the present disclose are advantageous because they provide a technical solution to the problem of prior methods and systems for performing the various process and lookups described. The inventor has observed that using these embodiments, the processing speed and accuracy of the queries and lookups is significantly increased, which in turn provides for an enhanced user experience. It is important to note that the processing speed increase allows the various checks and lookups to be performed in real time, which is important since user tolerance for a delay in the send process after the SEND button is selected by the sender, before the message is sent (the message analysis processing time) is low. Significant lag in processing a send command is typically unacceptable to a user because it reduces the productivity of the user. The inventor has realized that the time from selecting SEND to the message actually being transmitted generally needs to be less than 1 second in time for a favorable user experience, and since some Whois servers limit lookups by originator IP address per second, per minute or per day, the process may take too long to complete to maintain a favorable user experience within the preferred less than 1 second analysis time.

To address these issues, the disclosure includes an embodiment where, before performing the Whois checking process, the processor is programmed using hardware and/or software commands to:

(i) verify if any of the domains are in a list of domains pre-verified or manually verified by the sender or sender administrator as safe (for example, domains imported into a manually verified domain library/database that includes the sender's domain, and any other manually imported customer, partner, client domains) and if any domains are on the list of domains in the manually verified domain library, exclude those domains from the domain lookup and indicate for those domains "Admin Verified" or with some other display;

(ii) determine if the remaining recipient domains have multiple recipients with the same domain, and if so, apply the WhoIs lookup domain age data from one domain to all equal domains in the specific send recipient list.

If during the Whois checking process the Whois server is slow to respond, for example, slower than a configurable time limit (for example, where the Whois lookup time is taking more than ½ second), the process then causes a termination of the Whois checking process due to timeout or inaccessible, unauthorized, or slow Whois server and indicates "Inaccessible" for the domain age risk score.

In another embodiment of the present disclosure, if the email is a reply, and the user has an identified emotional score from historical sentiment analysis, the process may use an iteration of the above to scrape content from a set of external web pages in a similar manner that it scraped content from the WhoIs server, so that there can be a verification in the message if key words scraped from the web page or server separate from the sender are words or word combinations that email impostors use to lure people. If so, the processor of the system may then display a message dialog generated by the process to alert the sender that the message may be responding to an email impostor.

For example, if in the above process, instead of connecting to a WhoIs server, the process connects to a programmed web page or web server with key words for phrases matching a phrase geography and phrase language to that of the sender, words such as "Kindly", a word not normally used in email in certain context of business email originating by native American English writers in the United States, or "Favor" in the context of a business email, and if those words on the web page are also in the message content, the process may display an alert to the sender such as, for example, but not limited to, "The message you are about to reply to contains phrases that are commonly found in impostor email. We suggest you reply with caution and re-verify the context and addresses to whom you are about to reply to."

In yet another embodiment, if the email is a reply, after the reply or forward has been initiated, but before the reply or forward transmission initiates; and in this embodiment but not a required factor, if the user has an identified emotional score from historical sentiment analysis, the process may access a pre-defined database on a local device or a server separate from the sender, to compare entries in the pre-defined database with:

(a) the sending company domain (domain of the sender) and
(b) the first and last names of key executives in the sending company, with
(c) the Friendly Name of the received email message header and
(d) the received address domain from the FROM address in the received message header, such that if (a) is not equal to (d) and (b) equals (c) then verify if the content associated with the values (a) to (d) are matching those values in a Verified Replies table, and if so, continue with the reply without any message dialog; if not, then the process may present a message dialog to the sender in the moment of replying, such as, for example, that "The message that you are replying to may appear to be from someone in your organization but may actually be from an impostor. Please examine the message closely before replying." The process may also provide buttons or the like to provide options such as, for the example, to "Verify & Send" or "Cancel" transmission of the message. If the sender activates the button to verify and send, the process may then be programmed using hardware and/or software commands to add the combination of data associated with the content of each value into a table titled such as "Verified Replies".

Once this process has been completed, the sender may decide, as in box 1080 (FIG. 17), to continue the send process in box 1085 (FIG. 17) by pressing the send button, or cancel the send process in box 1090 (FIG. 17).

Referring again to FIG. 17, the process, in box 1035, checks for "sensitive" send history, and if such history exists, branches back to box 1040 for further processing. Various sub-processes may be carried out if desired by the sender, or required by the sender's administration or organization.

Figure 19:
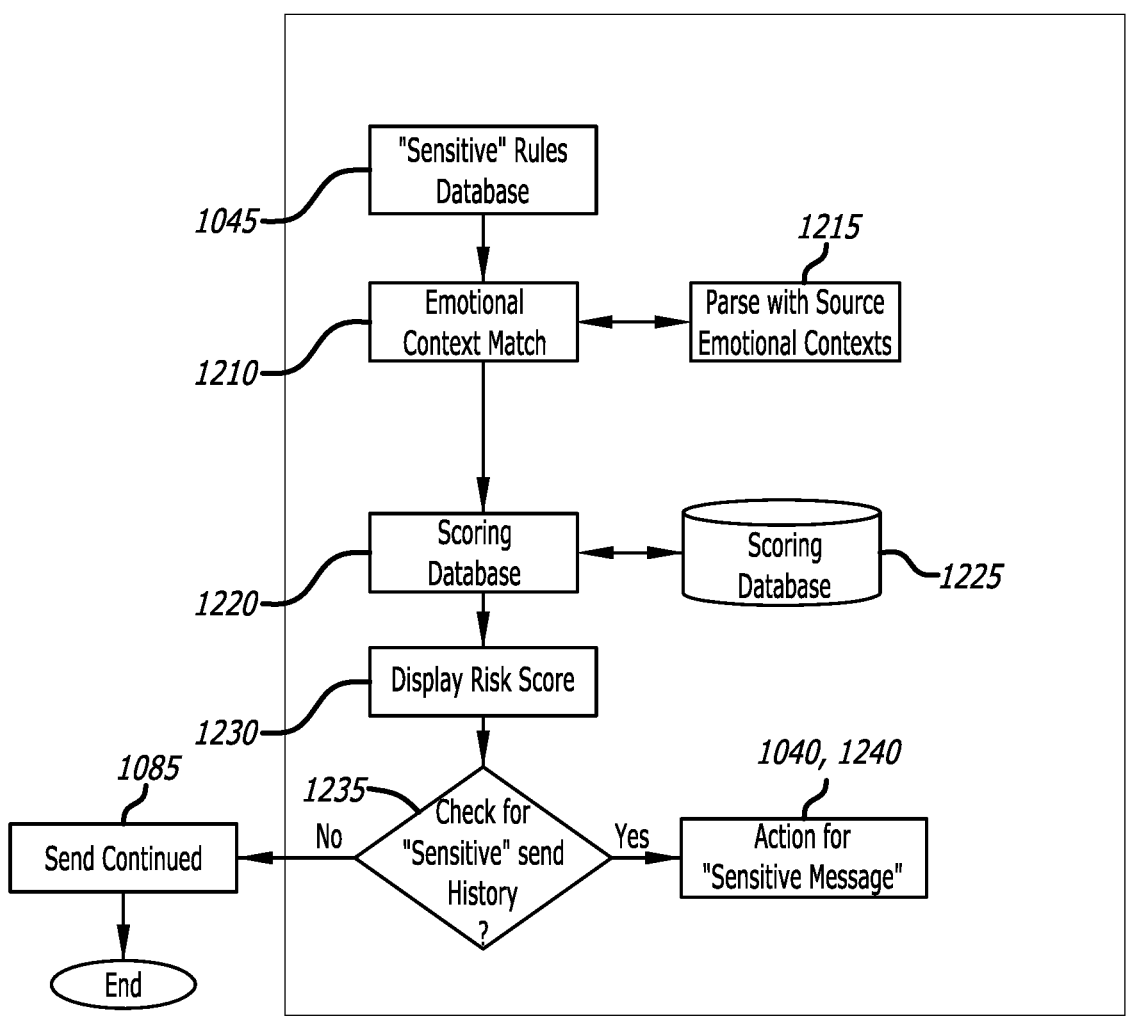
FIG. 19 is a flow diagram of part of an embodiment of the system of FIG. 17.

One embodiment of such a sub-process is illustrated in FIG. 19, which illustrates a method and system 1200 for analyzing producing a display risk score that can be used to inform the query of box 1035 (FIG. 17). Using a sensitive rules database 1045 (FIG. 17) which contains information related to what the sender, or sender's organization, considers to be "sensitive" information, the processor using software commands determines an emotional context match in box 1210 by parsing the content and context of the message with source emotional contexts in box 1215.

The process then determines a risk score in box 1230 by querying the results of the emotional context match with the results contained withing scoring database 1225. The determined risk score may then be displayed to the sender in box 1230. As shown in FIG. 19, and consistent with FIG. 17, if no sensitive send history is found, the process branches to box 1085 (FIG. 17); if sensitive send history is found, then the process branches of box 1240 (FIG. 17) for further processing.

Figure 20:
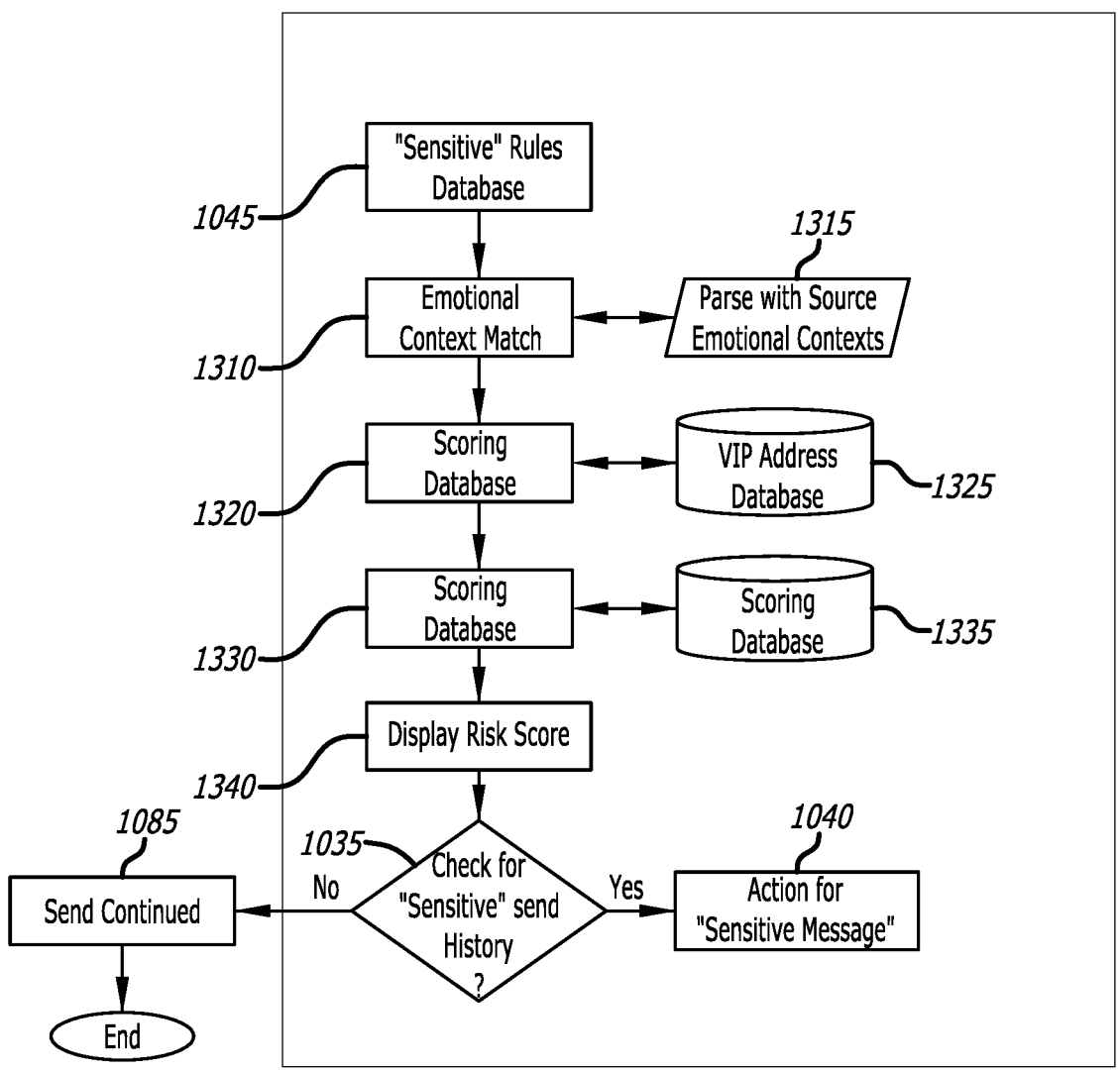
FIG. 20 is a flow diagram of part of an embodiment of the system of FIG. 17.

FIG. 20 is a schematic diagram illustrating an alternative embodiment similar to that described with reference to FIG. 19. In this embodiment, after the emotional context match of box 1310, the process proceeds to perform an address match in box 1320, which compares the address of the intended recipient in box 1320 with information contained in a VIP address database 1325. Depending on the results of this match, which may be displayed to the sender, the process then calculates a risk score in box 1330 by querying the scoring database 1335, and then branches to box 1035 (FIG. 17), and either allows the send process to continue as in box 1085 (FIG. 17), or branches to box 1040 (FIG. 17) for further processing.

Figure 21:
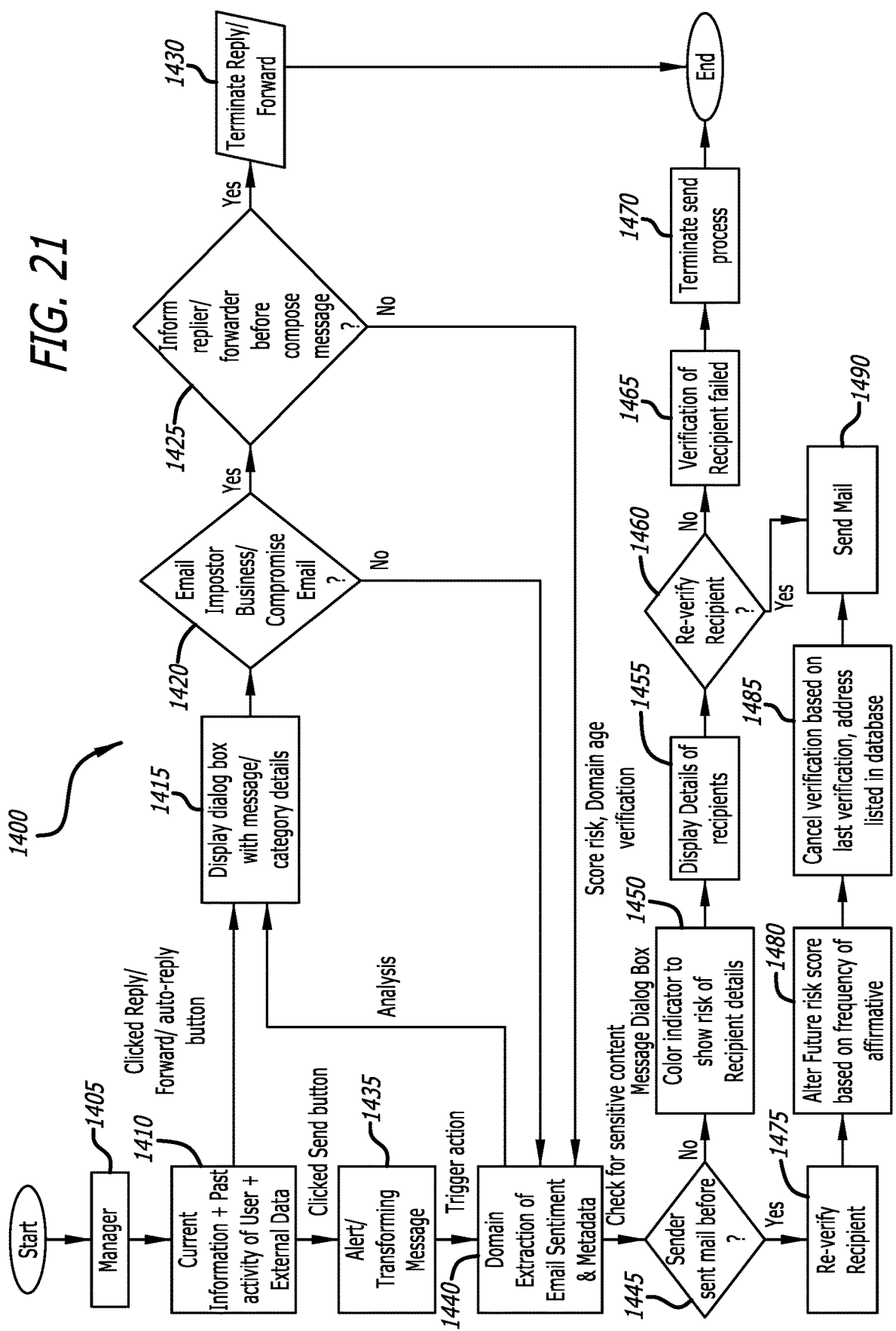
FIG. 21 is a flow diagram of an embodiment of a system in accordance with the present disclosure.

FIG. 21 is a schematic illustration of another embodiment of a system and method in accordance with the present disclosure. This embodiment describes various actions that may be carried out when a send either originates an electronic message, or when the sender is replying-to, or forwarding, an electronic message.

As shown, the process evaluates various information, such as current information, the past activity of the user of the system, and other external data in box 1410 under control of a process manager 1405, such as that described with reference to FIG. 16. Such information has been described more fully above.

If the sender has initiated a reply or forward button, or an auto-send action has been initiated by receipt of a message, the process branches to box 1415 and may display a dialog box or other messaging system or device to the sender with details related to the message or category of the message. The processor then determines, in box 1420, whether the email or message has been sent by an impostor or otherwise compromised in some way. If the message is determined to be compromised, the process informs the sender/replier/forwarder of the compromise in box 1425, preferable before the sender/replier/forwarder composes a reply or message. The process may then automatically terminate the reply/forward, as in box 1430, or wait for the sender/replier/forwarder to terminate the reply/forward.

Returning to box 1410, if the sender initiates a send action, the process branches to box 1435 and may analyze the information of box 1410 to determine if an alert should be displayed to the sender or if the message should be transformed. This may trigger an action that begins the extraction of the domain and email sentiment and metadata in box 1440 to check for sensitive content. As shown, the process of box 1440 may also include data generated by the processes of boxes 1415, 1420, and 1425.

When the process branches to box 1445, the process of box 1445 determines whether the sender has messages or emails to an intended recipient before. If the sender has not sent a message to the intended recipient previously, the process branches to box 1450, and assigns a color indicator related to the relative risk calculated from the recipients address or domain.

The process then displays the details for any and all intended recipients of the message in 1455. The sender may then decide whether to re-verify the intended recipient or recipients, or the process may do so automatically in box 1460. If the recipient cannot be re-verified, then verification of the recipient is indicated as failed in box 1465, and the send process is terminated in box 1470.

If the sender has sent messages to the intended recipient previously, the process branches to box 1475 and re-verifies the intended recipient. The process then may alter the risk score associated with the verified recipient based on the frequency of affirmative re-verifications in box 1485, or the process may cancel further verification based on a recent verification, and lists or updates the information associated with the verified recipient in a database in box 1485, and sends the message to the recipient in box 1490.

Figure 22:
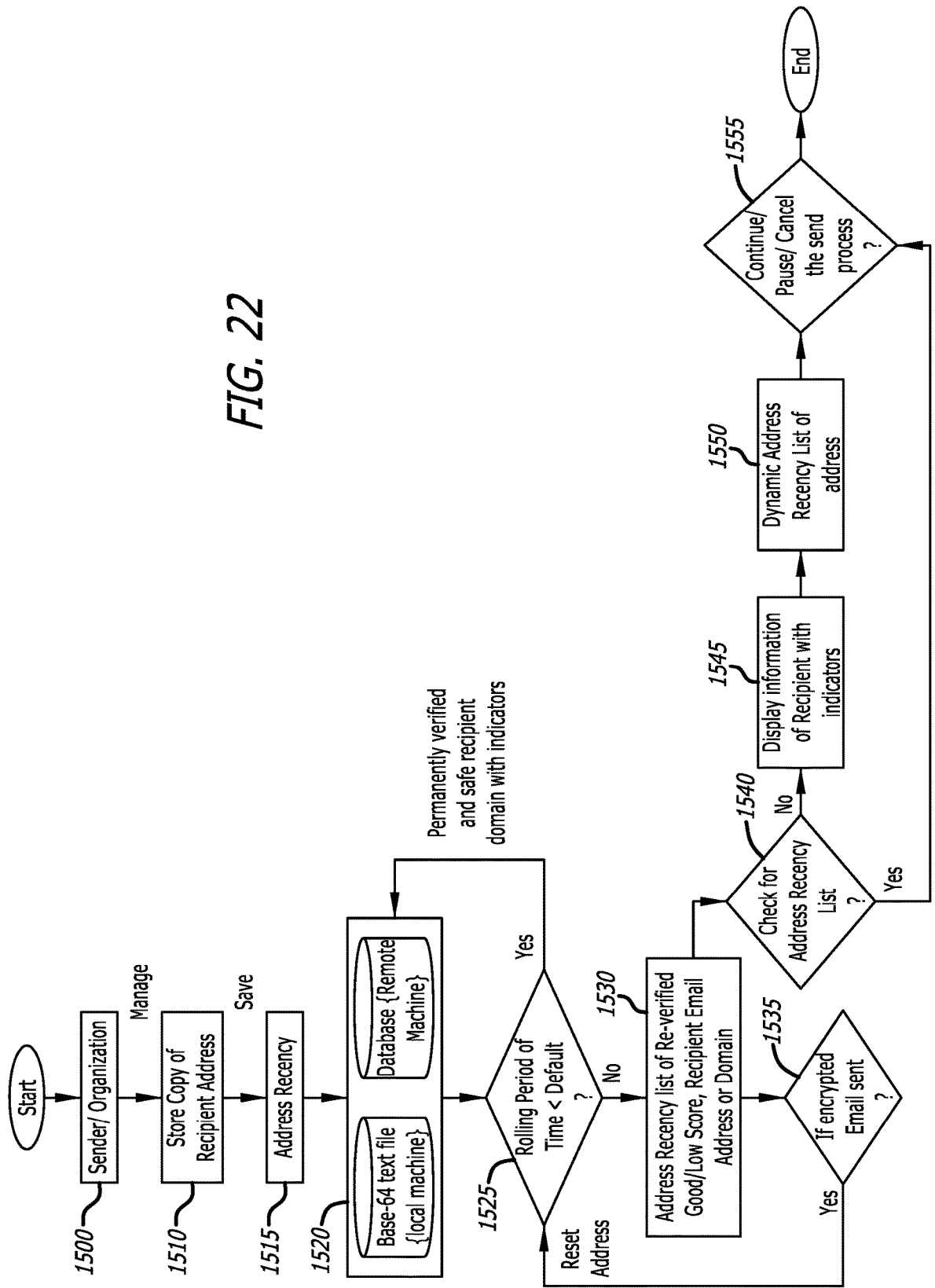
FIG. 22 is a flow diagram of an embodiment of a system in accordance with the present disclosure.

FIG. 22 is a schematic diagram of an embodiment of a system and method in accordance with the disclosure. The illustrated process provides for analyzing the email or message sentiment and metadata to pause the send process to display the recipient address or addresses for re-verification, and then capture and display additional stored data or externally sourced data to display a dynamically determined risk score associated with the recipient domain, and then display that risk score to the sender.

In this embodiment of the process that is performed by a processor programmed using software or hardware commands, a copy of the recipient addresses associated with an email or message deemed to be sensitive based on the above described actions. This information may also use information stored in the address recency database 1515. In box 1520, the process stores a list of recipient addresses and the associated domains in a base-64 text file on a local machine in a local application folder or in a database on a machine remote from the sender. The list of saved addresses and domains may be stored for a configurable rolling period of time, as indicated by box 1525, to indicate Address Recency of adding to the database, or to determine whether added as a permanently verified and safe recipient domain, with indicators of age of the addition of the address and domain.

This "Address Recency" list is a list of recently re-verified good, or low risk scored, recipient email addresses or domains. For example, as in box 1530, the address recency list may include, for example, but not limited to, the number of days since the address or domain was reverified, such as, for example: 365 days, 180 days, 90 days, which may be a default value, 30 days, 15 days, or zero days. If an address is on the list and an encrypted email is sent with the address after having been re-verified by the sender, as in box 1535, the period of Address Recency of last verification may be reset for that address as if it was newly added.

After a sender initiates the email send or reply process, for example after clicking the send button, the program initiates and first assesses whether the recipient addressees or domains of the newly composed or replied to email are on the Address Recency list, as in box 1540.

If the recipient addresses are not in the Address Recency list, the process displays a message dialog to the sender that displays information about the recipients with indicators as described previously in box 1545, for example, a message may be displayed such as "It looks like you do not normally send sensitive to the addressed recipient(s). Please double check the recipient addresses to ensure your sensitive info is going to your intended recipient(s)."

The process may then display a dynamic list of addresses for the current email or message that are not on the Address Recency list in box 1550, and invoke a process for the sender to continue, pause, or cancel the send process in box 1555. For example, at the bottom of the message dialog there may be, for example, but not limited to, a "Verified and Send" button and a "Cancel" button. The Verified and Send button continues the send process along with any other special message formatting that the message requires based on the message sensitivity Email Sentiment and Metadata, such as, for example, sending the message as an encrypted email. If the send process continues after the display of the message dialog, the recipient addresses and domains associated with that message are added to the Address Recency list. If the message send process is terminated or cancelled, then the recipient addresses and domains associated with that message are not added to the Address Recency list, and the user is returned to the message compose pane with the current message remaining as a draft and to be re-addressed as the sender deems appropriate.

In various embodiments, a sender or sender organization may have the option to clear the Address Recency list or change the time an address remains on the Address Recency list at any time, and if the time is shortened, for example, all email addresses and domains on the list that have been on the Address Recency list longer than the maximum time duration are removed from the Address Recency list.

Figure 23:
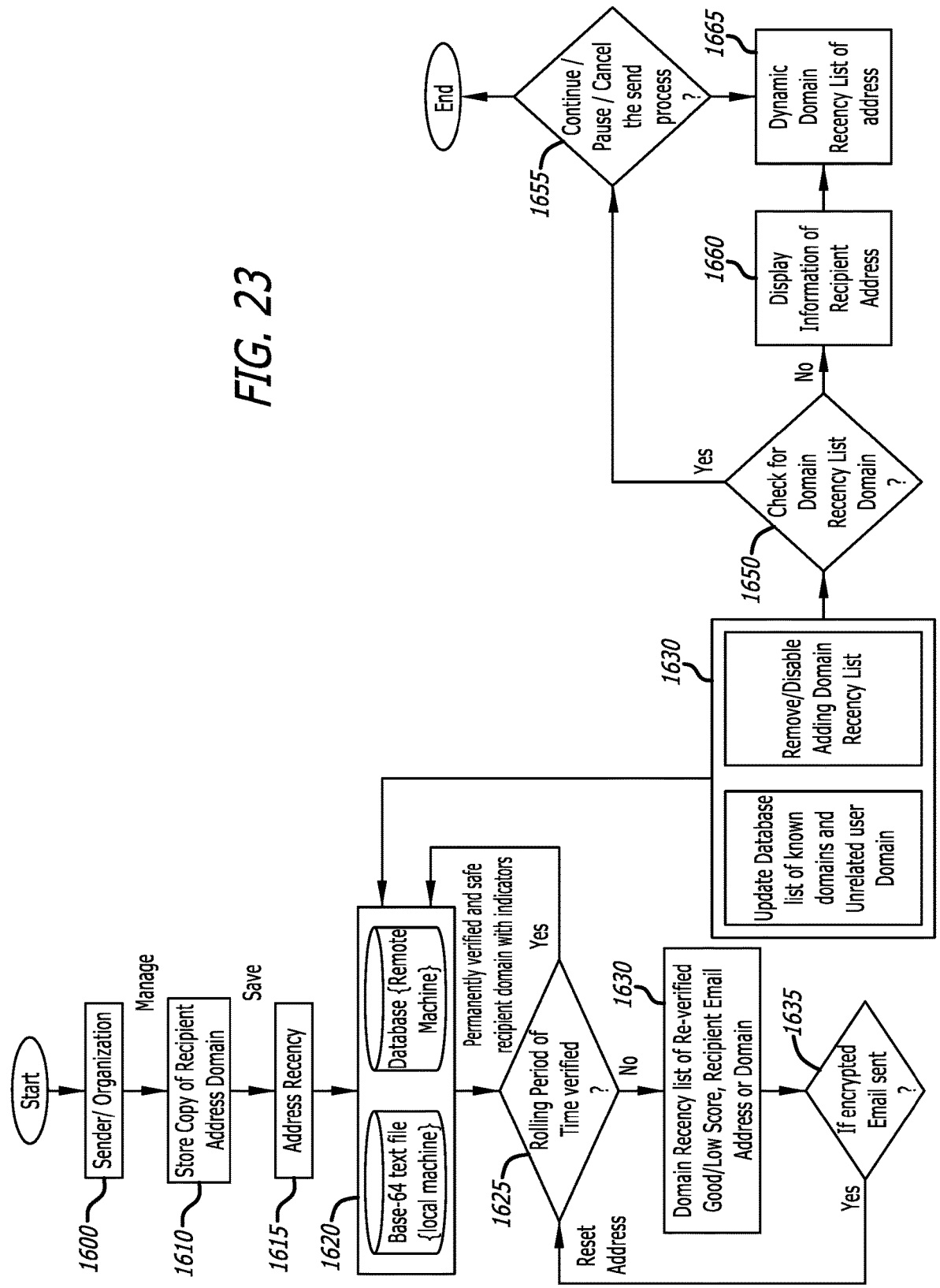
FIG. 23 is a flow diagram of an embodiment of a system in accordance with the present disclosure.

FIG. 23 is a schematic illustration of an embodiment of the system and method of the present disclosure for capturing additional stored data or externally sourced data to display a dynamically determination of a recipient risk score based on the recipient's domain.

In this embodiment of the process that is performed by a processor programmed using software or hardware commands, a copy of the recipient address domain is stored in box 1610. This information may also use information stored in the address recency database 1615. In box 1620, the process stores a list of recipient addresses and parses the associated address domains into a separate table, and saves the parsed domains in a base-64 text file on a local machine in a local application folder or in a database on a machine remote from the sender in box 1620.

The list of saved addresses and domains may be stored for a configurable rolling period of time, as indicated by box 1625, to indicate recency of adding to the database, or to determine whether added as a permanently verified and safe recipient domain, with indicators of age of the addition of the address and domain. This "Address Recency" list is a list of recently re-verified good, or low risk scored, recipient email addresses or domains. For example, as in box 1530, the address recency list may include, for example, but not limited to, the number of days since the address or domain was reverified, such as, for example: 365 days, 180 days, 90 days, which may be a default value, 30 days, 15 days, or zero days. If an address is on the list and an encrypted email is sent with the address after having been re-verified by the sender, as in box 1635, the period of Address Recency of last verification may be reset for that address as if it was newly added.

The process may then, in box 1645, store in a database a list of known domains that are associated with free email service provider or permit users unrelated or unassociated with one another to use the same domain such as, for example, and not limited to, yahoo.com, outook.com, gmail.com), and other "Unrelated User Domains", or the like. Additionally, the process may remove from, or disable adding to, the Domain Recency list any domains that are Unrelated User Domains.

After a sender initiates the email send or reply process, for example after clicking the send button, the process may then determine whether the recipient address domains of the newly composed or replied to email is on the Domain Recency list, as in box 1650.

If the recipient address domains are not on the Domain Recency list then, the process may display a message dialog to the sender in box 1660 that displays information about the recipients, such as, for example, but limited to, "It looks like you do not normally send sensitive to the addressed recipient(s). Please double check the recipient addresses to ensure your sensitive info is going to your intended recipient(s)."

The process may then display, as in box 1665, a dynamic list of addresses for the current email that have domains that are not on the Domain Recency list, and invoke a process for the sender to continue, pause, or cancel the send process, as in box 1655. For example, at the bottom of the message dialog there may be a "Verified and Send" button and a "Cancel" button. The Verified and Send button continues the send process along with any other special message formatting that the message requires based on the message sensitivity Email Sentiment and Metadata, such as, for example, sending the message as an encrypted email. If the send process continues after the display of the message dialog, the recipient addresses and domains associated with that message may be added to the Recency list. If the message send process is terminated or cancelled, then the recipient address domains associated with that message is not added to the Domain Recency list, and the user is returned to the message compose pane with the current message remaining as a draft and to be re-addressed as the sender deems appropriate.

In an embodiment, when the user initiates the Send Button, the system will check to determine if the message is a sensitive message using details which are available in the "sensitive" rules database. It will then process the message as a "sensitive message", tagging the message to be processed in a special manner during transmission, such as, for example, by sending the message in an encrypted form.

The system will then check for history for the "sensitive message" recipient addresses and if all of the addresses of the message are in the Recency Database, the message will be transmitted.

If any recipient address is not in the Recency Database, processing will proceed with the message analysis. If the recipient is not verified with the address recency database, then the processor will check the Risk Rule Database and display the complete address of the recipient and display the full name of the recipient.

Before the processor displays the full address of each recipient that is not in the Recency Database for that message, the processor checks for age of the domains for the recipient email addresses not in the Recency Database by parsing the top-level domain (TLD) and checks the pre-defined TLD list from the database to match the Parsed TLD with the Pre-Defined TLD list, and checks for the WhoIs information to determine if it is available or not. If the TLD is not in the Pre-Defined TLD list, the processor then accesses the IANA look up process to look up which TLD is associated with the recipient domains, and verify whether whoIS information is available for those recipient domains or not. If WhoIS information is accessible, then the processor collects the information from WhoIS and converts it to a uniform format, calculates the domain age, and compares the age with the domain age Risk Scoring database values.

The WhoIS content is gathered and key words are used to find the domain creation date (Creation Date Query display details returned by querying WhoIs information and checking for other translations for this query display in a hierarchical approach a series of keywords that are associated with the query for Creation Date, such as, for example, Creation Date, Created, Created On, Domain Create Date, Registered, Registration Date.

Once the domain age details are found and the risk score from the scoring database is determined, the risk score and/or risk color based on the recipient address domain age is displayed by the processor to the sender. The complete addresses and the domain age are then displayed to the sender to re-verify if the send should continue. If re-verified, the send process continues and message is transmitted, otherwise the send is cancelled.

Figure 24:
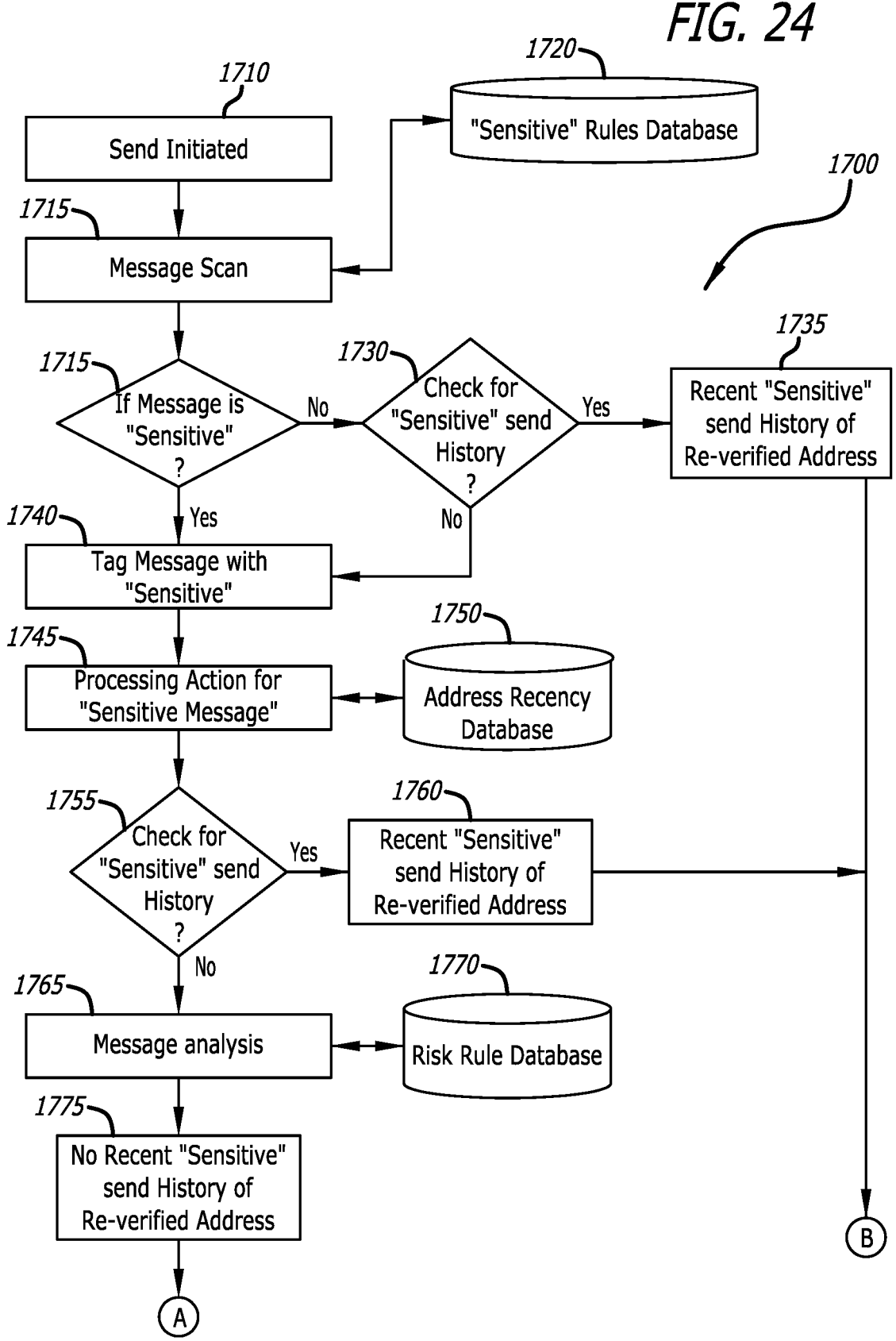
FIG. 24 is a flow diagram of an embodiment of a system in accordance with the present disclosure.
Figure 25:
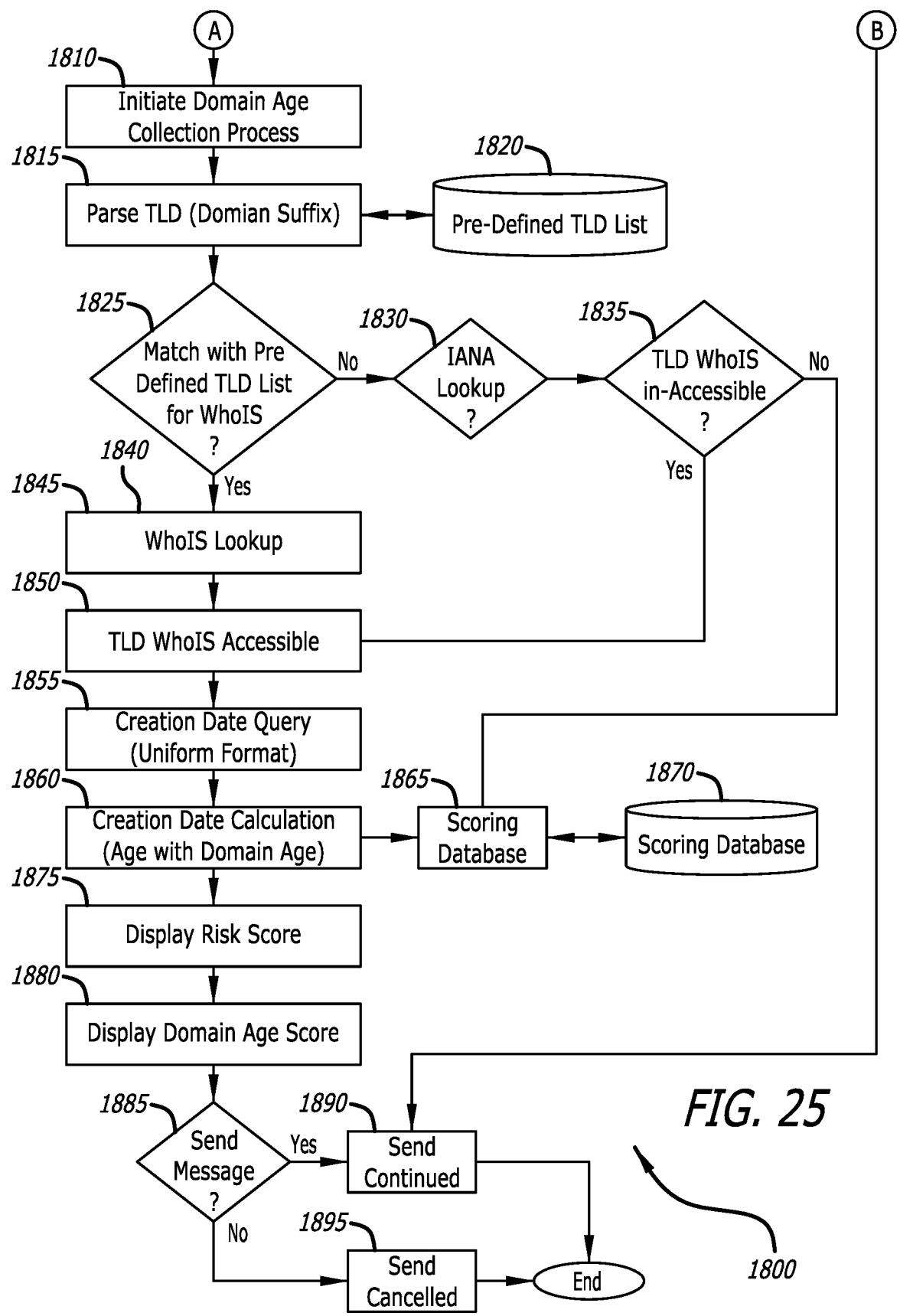
FIG. 25 is a continuation of the flow diagram of FIG. 24.

FIG. 24 is a flow diagram that illustrates another embodiment of the disclosure. In this embodiment, a send action is initiated in box 1710. The processor of the system, programmed using hardware and/or software commands, scans the message in box 1715, and accesses a sensitive rules database 1720 to determine if the message is sensitive. If the message is determined to be sensitive in box 1725, the message is tagged as being sensitive in box 1745. If the message is not sensitive, the processor checks to see if the sender of the message has a history of sending sensitive messages in box 1730. If the logic is true (that is, yes), then the processor branches to box 1890 (FIG. 25).

If the sensitive history check logic is false (no) in box 1730, the processor branches to box 1740 and tags the message as sensitive.

Once the message is tagged in box 1740, the processor initiates an action or actions to process the message in box 1745, and queries an address recency database 1760 to determine if the address of the intended recipient is in the database. The processor then, in box 1755 check for a sensitive send history. If the logic is true (yes) the processor adds the addressee of the sender and/or recipient to a recent sensitive send history of re-verified addresses database 1760, and the processor branches to box 1890 (FIG. 25).

If the result of box 1755 is false (no), the processor analyzes the message in box 1765 to determine if an entry in risk rule database 1770 applies to the message. If no recent sensitive send history of reverified address is found in 1775, the processor branches to box 1810 (FIG. 25).

Referring now to FIG. 25, the processor continues at box 1810 and initiates a domain age collection process, and parses the TLD of the message domain in box 1815 and may query a pre-defined TLD list 1820. In box 1825, the processor attempts to match the TLD of the message with the pre-defined TLD list for WhoIs. If the logic of the match is false (no), the processor initiates and IANA look up in box 1830 to determine, in box 1835, whether the TLD WhoIs is inaccessible. If the logic of box 1835 is false, the processor branches to box 1865. If the logic of box 1835 is true, the processor branches to box 1850.

Returning now to box 1825, if the logic of box 1825 is true (yes), the processor performs a WhoIs lookup in box 1840. If the look up indicates that the TLD is accessible, the processor continues to box 1850.

After box 1850, the processor continues to box 1855 to convert the WhoIs information creation data into a uniform form, and then calculates a creation date for the domain in box 1860, and determines the age of the domain. As noted in the figure, the processor may access a scoring database rules database 1865 and a scoring database 1870 to perform these calculations, and to determine a risk score based on the domain age, and other information, if available.

Once the processes of box 1860 are completed, the processor may display a domain age score to the sender of the message. When the sender has received this message, the send may decide, in box 1885, whether to send the message, or to cancel transmission. If the sender decides to send the message, the sender informs the processor to continue the send message, which is then transmitted in box 1890. If the sender decides that the risk associated with the message is too great, the sender informs the processor to cancel the send action, and the transmission is canceled in box 1895.

Figure 26:
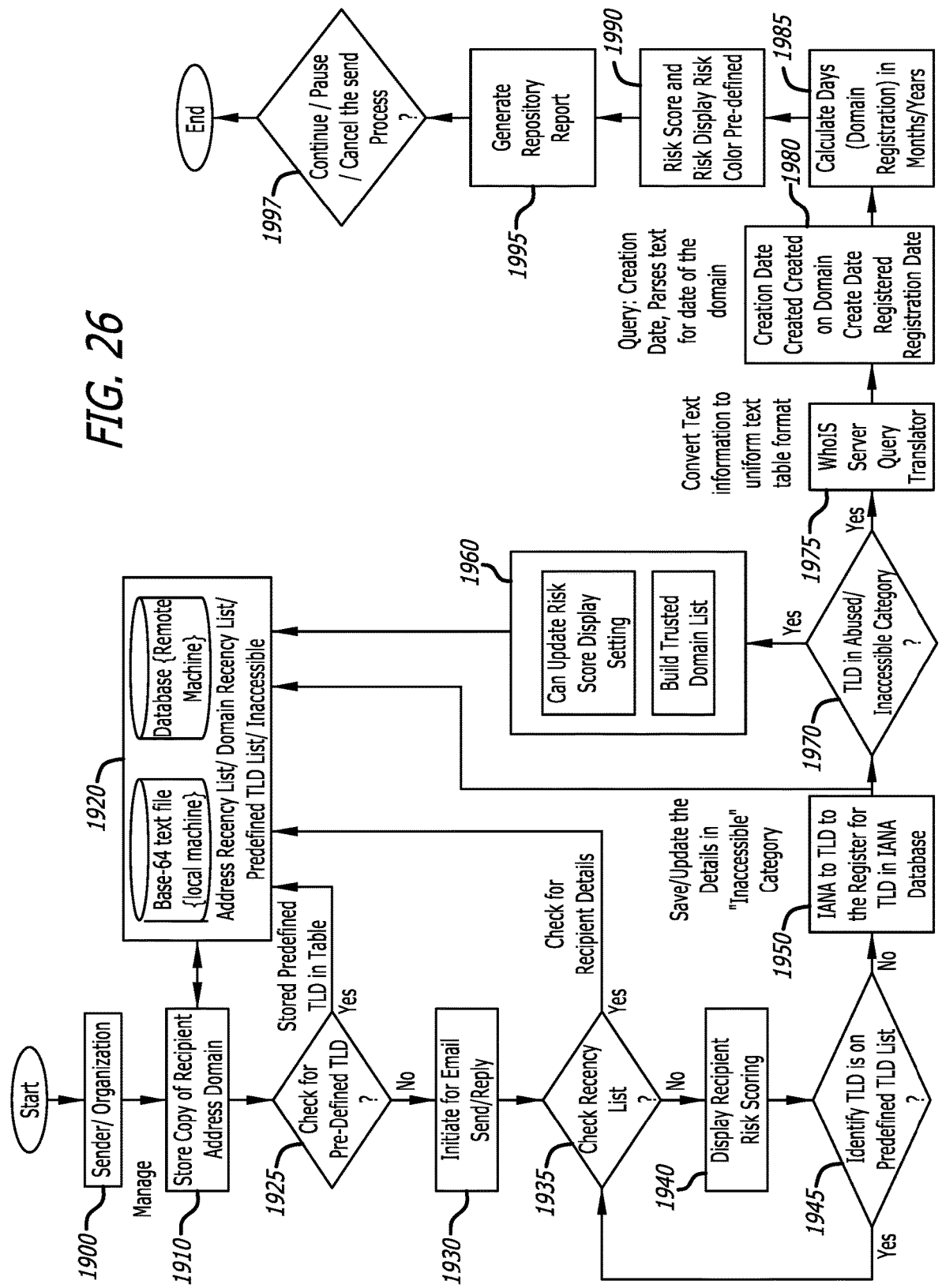
FIG. 26 is a flow diagram of an embodiment of a system in accordance with the present disclosure.

FIG. 26 is a flow diagram illustrating another embodiment of the disclosure. Using a processor that is programmed using hardware and/or software programming commands, when a sender initiates a send action to transmit a message to an intended recipient, the processor parses the TLD of the recipient's address in box 1910; the processor has access to a address recency database, domain recency database, database having a pre-defined TLD list, and a database containing a list of inaccessible TLDs, as shown in box 1920.

In box 1925, the processor checks to determine if the recipient's TLD is in the database of pre-defined TLDs. If the logic of box 1925 is true (yes), the processor stores the recipient's TLD in the database. If the logic of box 1925 is false (no) check a recency database in box 1935. If the logic of box 1935 is true, the processor may update the recency database with the information from the message. If the logic of box 1935 is false, the processor displays a risk score in box 1940. The processor then attempts to determine if the TLD of the intended receipt is on the TLD pre-determined TLD list in box 1945. If the logic of box 1945 is true, the processor returns to box 1935. Alternatively, the TLD is known, and the recipient address is on the recency list, the processor may branch directly to box 1997.

If the logic of box 1945 is false, the processor performs a search using the IANA search process in the IANA database. If the search is unsuccessful, the processor may update the Inaccessible database accordingly. In box 1970, the processor decides whether the TLD is in an abused/inaccessible category. If the logic of box 1970, the process may update the risk score, build a trusted domain list, or display the risk score to the sender in box 1960. The information may be used to update the databases of box 1920.

If the logic of box 1970 is false, the processor access a WhoIs translator 1975 to obtain WhoIs information, and convert text in that information to a uniform text table format. In box 1980, the processor parses text information to determine the creation date of the domain, and calculates a domain creation date in box 1985. In box 1990, the processor determines a risk score based on the calculated age of the domain, and displays the risk score to the sender using a preselected color or other artifice.

The processor may generate a repository report in box 1995. The processor then displays a message to the sender so that the sender, based on the risk score and other information to him, may decide continue, pause, or cancel the send process in box 1997.

While the various embodiments have been described with reference to electronic messages such as email, it will be understood that the term electronic message also pertains to other forms of electronic messaging such as text messages, messaging systems based on telephone numbers, usernames, or other direct messaging platforms. Accordingly, the various features and embodiments described in this disclosure are equally applicable to these messaging platforms and are within the contemplated scope of this disclosure.

These embodiments could also store and periodically, or in real time, transmit the results of the analysis, domain age, recipient risk score to a database server separate from the sender, which compiles information gathered from all users of the system, effectively crowd sourcing the results of data queries from many servers. For example, related to domain age, that gradually grows an aggregated new database of domain ages that is centralized and can eventually be a first check to source domain age for domains.

While these descriptions refer to email protocols and email message headers, the various embodiments of the disclosure may be implemented in any other electronic messaging protocols that have a reply function including, but not limited to, protocols for Short Message Service (SMS), Multimedia Messaging Service (MMS), Instant Messaging (IM), Extensible Messaging and Presence Protocol (XMPP), Real Time Messaging Protocol (RTMP), EDI Messaging Protocols (AS2, FTP, OFTP, HTTP/HTTPS, TLS, AMQP, MQTT, STOMP), and more.

While these descriptions of the various embodiments of the disclosure contemplate a number of iterations of when or on what server or email client performs the review, testing, parsing, or comparison of email message headers occurs, or in what order of operation, the various embodiments of the disclosure may include any number of iterations and combinations. The order and action is not important to the scope of the invention. A person skilled in the art would immediately understand that what is important is detecting in the email message to determine if at least in the originally received or inbound email headers $A_F \neq A_R$, and if True, performing some action associated with the message. Alternatively, detecting a more serious situation, whereby detecting in at least in the originally received or inbound email headers if $N_F = N_R$ and $A_F \neq A_R$, and if True, performing some action associated with the message.

The detection may occur on a server separate from the sender on the inbound message path towards the target recipient, at the target recipient's email client on their computer or device, or after reply on the outbound message path toward the originally received reply-to message header address, on a server separate from the reply-to recipient; or after forward on the outbound message path toward the forward recipient on a server separate from the forward recipient.

An advantage of the various embodiments of the disclosure is to mitigate risk of recipients falling prey to what we call herein as the "Reply-To Whaling" scheme. Thus, the various embodiments of the disclosure are designed to identify, alert, or otherwise cause action to block activity, or inform authentic senders of email of the fact that their identity is being used in an Internet criminal scheme to trick a recipient into taking some action, typically that action being to transfer money.

A further advantage of the various embodiments of the disclosure is to identify, alert, or otherwise cause action to block activity or inform authentic recipients of email that the email that they are replying to may not be transmitted to their intended recipient, but instead may be re-directed using standard Internet messaging protocols to an imposter who may continue to purport to be the authentic sender, through back-and-forth email and to prevent an Internet criminal from using message content and/or context to convince an authentic recipient to transfer money.

Still another advantage of the various embodiments of the disclosure is to identify, alert, or otherwise cause action to block activity or inform authentic recipients of email that the email that they are preparing to forward may not be from the authentic sender sending identified in the From address of the message that they are preparing to forward; and may be from an impostor.

While considerable emphasis has been placed herein on the particular features of the various embodiments and the improvisation with regards to it, it will be appreciated that various modifications can be made in the embodiments without departing from the principles of the disclosure. These and other modifications in the nature of the disclosure will be apparent to those skilled in the art from the disclosure herein, whereby it is to be distinctly understood that the foregoing descriptive matter is to be interpreted merely as illustrative of the disclosure and not as a limitation. It is understood that various different modifications within the scope and spirit of the disclosure are possible. The invention is limited only by the scope of the appended claims.

I claim:

1. A system determining a risk of sending a message to a recipient, comprising:
   a processor programmed using hardware and software commands to provide for composing and sending electronic messages, the processor, at the moment after initiation of the sending of an electronic message by a sender and before the message is transmitted to one or more intended recipient addresses, also programmed to:
   scan the electronic message for content,
   compare the content to indicators of sensitive information stored in a sensitive rules database in electronic communication with the processor,
   if the comparison indicates that the electronic message contains sensitive information, the processor identifies the message as sensitive, and
   determines if the sender has a history of sending sensitive messages to the one or more intended recipient addresses, and
   if the sender has a history of sending sensitive messages to one or more intended recipient address, re-verifies the one or more intended recipient addresses in a recency database in electronic communication with the processor, and
   if the sender does not have a history of sending sensitive information to an identified one or more intended recipient addresses,
   displays an alert to the sender to verify that the identified one or more intended recipient addresses are associated with a recipient to which the sender intends to send the electronic message to.

2. The system of claim 1, further comprising, the processor programmed to send a query to an external source of information, the external information source being a web page, and also programmed to receive the results of the query and analyze the query results to determine if an alert should be displayed to the sender.

3. The system of claim 2, wherein the external information source is a database.

4. The system of claim 2, wherein the external information is related to an age of a domain of a recipient address from within the message.

5. The system of claim 2, wherein the external information is related to indices of text combinations and emotional scores.

6. The system of claim 1, wherein if the comparison is no, the processor determines if an entry in a risk rule database in electronic communication with the processor applies to the electronic message.

7. The system of claim 6, wherein the processor is programmed to parse a header of the electronic message to determine a top level domain name of the one or more intended recipients whose address or addresses are not found in the sensitive rules database or the address recency database, and to compare the parsed top level domain name to a pre-defined top level domain name list stored in a memory in electronic communication with the processor.

8. The system of claim 7, wherein if the parsed top level domain name matches an entry in the pre-defined top level domain name list, the processor performs a WhoIS lookup, and if the WhoIS lookup provides results indicating that the top-level domain name is accessible, the processor converts selected WhoIS results to determine a creation data associated with the top level domain name and determines an age of the top level domain.

9. The system of claim 8, wherein the processor is also programmed to access a rules database and a scoring database in electronic communication with the processor to determine a risk score based on the age of the top level domain, and
display a domain age score to the sender of electronic the message, and upon display of the domain age score, the sender may decide to continue the send the electronic message to the one or more intended recipients, or may decide to cancel the send of the electronic message to one or more of the intended recipients.

10. The system of claim 8, wherein if the parsed top level domain name does not match and entry in the pre-defined top level domain list, the processor is programmed to perform an IANA lookup to determine whether the top level domain name is inaccessible.

11. The system of claim 10, wherein if the top level domain name is inaccessible, the processor is also programmed to access a rules database and a scoring database in electronic communication with the processor to determine a risk score based on the age of the top level domain, and
display a domain age score to the sender of electronic the message, and upon display of the domain age score, the sender may decide to continue the send the electronic message to the one or more intended recipients, or may decide to cancel the send of the electronic message to one or more of the intended recipients.

12. A system determining a risk of sending a message by a sender to an intended recipient or recipients based on an evaluation of an address of each recipient of the message and past history of sending various types of data by the sender, comprising:

a processor programmed using hardware and software commands to provide for composing and sending electronic messages to one or more intended recipients, the processor also programmed, before the sending of the electronic message to the one or more intended recipients is initiated by the processor to scan content included in the message and compare the scanned content with a set of rules stored in a sensitive rules database to determine if any of the content in the message is sensitive content, and then determine if there is a record of the sender of the message sending sensitive messages prior to composing the content in the message, and if the comparison is no, the processor sends the message to the one or more recipients, but if the comparison is yes, the processor determines if the sender has sent a past message with sensitive information within a pre-determined time period to each of the intended recipient or recipients, and if yes, the processor sends the message to the intended recipient or recipients, and if no, displays a full email address of the intended recipient or recipients to which a sensitive data message has not been sent during the pre-determined time period to the sender, and determines an age score related to how long a domain of the intended recipient or recipients has existed and displays the age score for each domain of each of the intended recipient or recipients to the sender; and either sending the message to each of the intended recipient or recipients or cancelling the sending, controlled by a decision of the sender.

13. The system of claim 12, wherein if the sender decides to send the message, then the processor, programmed using hardware and/or software commands, adds data associated with the age score of the domain of each intended recipient to a database.

14. The system of claim 12, wherein the processor is programmed using hardware and/or software commands to determine if extra analysis is required to be carried out on messages determined to be sensitive in nature because they are determined to contain sensitive, private, or high value content.

15. The system of claim 14, wherein extra analysis is carried out by the processor if the sender is determined to be a sensitive person who may be more emotionally susceptible to making errors or being lured by impostors.

16. The system of claim 14, wherein the extra analysis includes at least one action selected from the group of actions consisting of displaying a full recipient email address, performing other recipient domain risk analyses, transforming the message to encrypt, track, prove delivery of the message, and transforming a format of the message or transmission path display.

* * * * *